United States Patent
Holland

(10) Patent No.: US 11,933,147 B2
(45) Date of Patent: Mar. 19, 2024

(54) SYSTEM, METHOD, AND APPARATUS FOR GENERATING HYDROELECTRIC POWER FROM SUBSURFACE WELLS

(71) Applicant: David Holland, Humble, TX (US)

(72) Inventor: David Holland, Humble, TX (US)

( * ) Notice: Subject to any disclaimer, the term of this patent is extended or adjusted under 35 U.S.C. 154(b) by 0 days.

(21) Appl. No.: 17/718,391

(22) Filed: Apr. 12, 2022

(65) Prior Publication Data

US 2023/0323851 A1    Oct. 12, 2023

(51) Int. Cl.
*E21B 41/00* (2006.01)
*E21B 43/12* (2006.01)
*F03B 17/06* (2006.01)

(52) U.S. Cl.
CPC ........ *E21B 41/0085* (2013.01); *E21B 43/128* (2013.01); *F03B 17/062* (2013.01); *F05B 2240/12* (2013.01)

(58) Field of Classification Search
CPC .. E21B 43/128; E21B 41/0085; F03B 17/062; F05B 2240/12
See application file for complete search history.

(56) References Cited

U.S. PATENT DOCUMENTS

| | | | | |
|---|---|---|---|---|
| 3,672,448 A | * | 6/1972 | Hoyt | E21B 43/16 166/245 |
| 2015/0247382 A1 | * | 9/2015 | Murphree | E21B 41/0085 29/829 |
| 2022/0282695 A1 | * | 9/2022 | Peviani | E21B 41/0085 |
| 2022/0316304 A1 | * | 10/2022 | Mick | E21B 43/164 |
| 2023/0029941 A1 | * | 2/2023 | Elder | F01K 15/00 |

* cited by examiner

*Primary Examiner* — Brad Harcourt
(74) *Attorney, Agent, or Firm* — Kirby Drake

(57) ABSTRACT

A system, method, and apparatus for generating hydroelectric power from subsurface wells penetrating or terminating in fluid-bearing, subterranean zones or intervals containing gas, oil, water, or any combination of these fluids. The system involves methods and apparatus summarized in a five-step process that includes: Phase 1—Fluid Production, Phase 2—Fluid Gathering and Combination, Phase 3—Hydropower Electricity Generation, Phase 4—Fluid Processing, and Phase 5—Fluid Pumping, Distribution, and Injection.

20 Claims, 29 Drawing Sheets

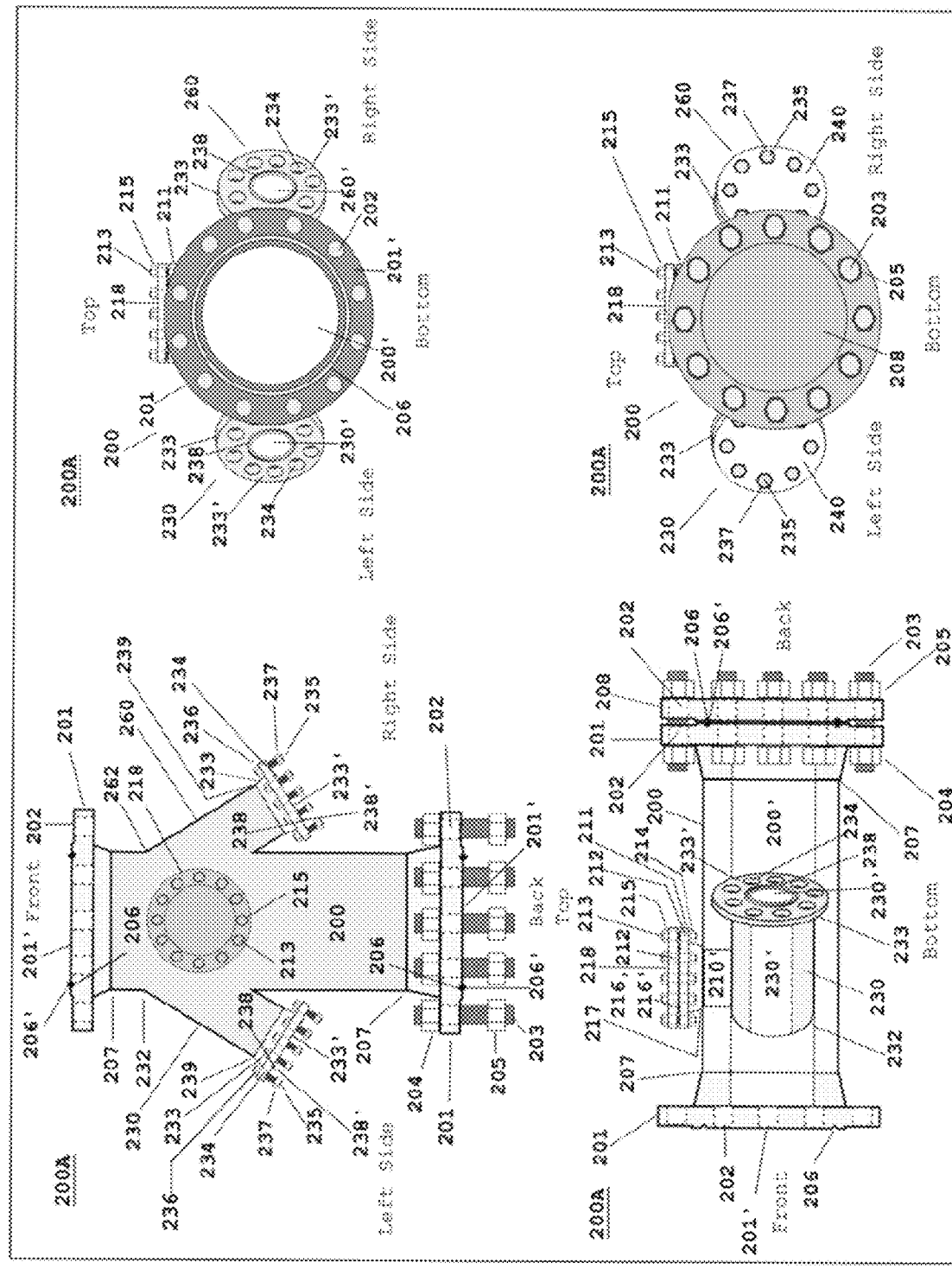

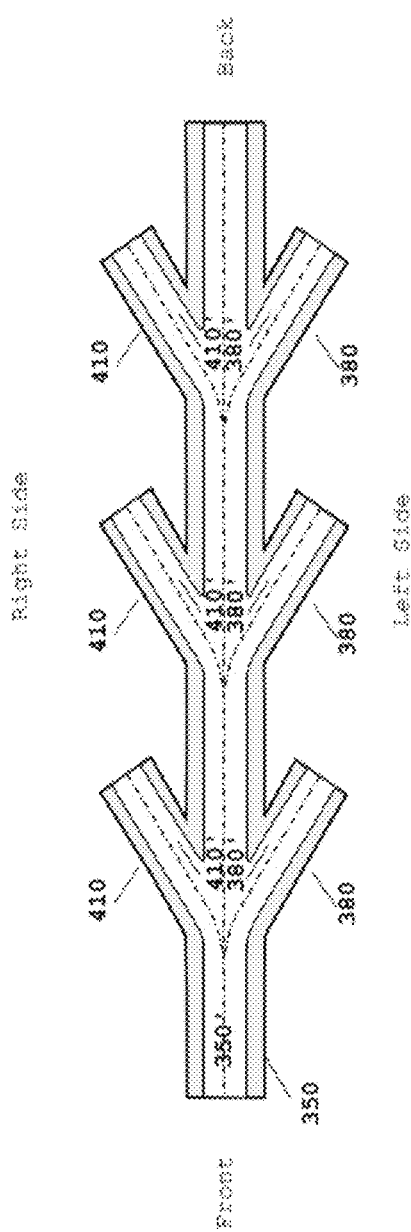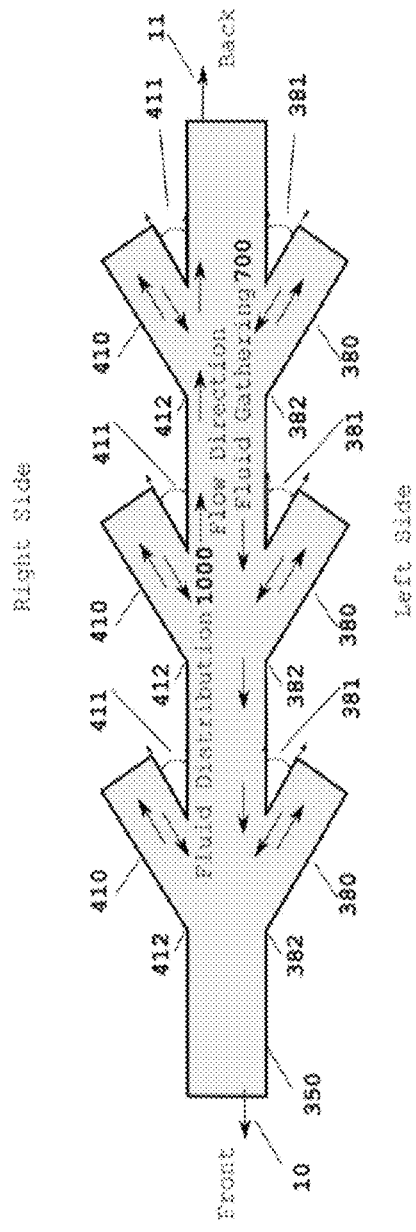

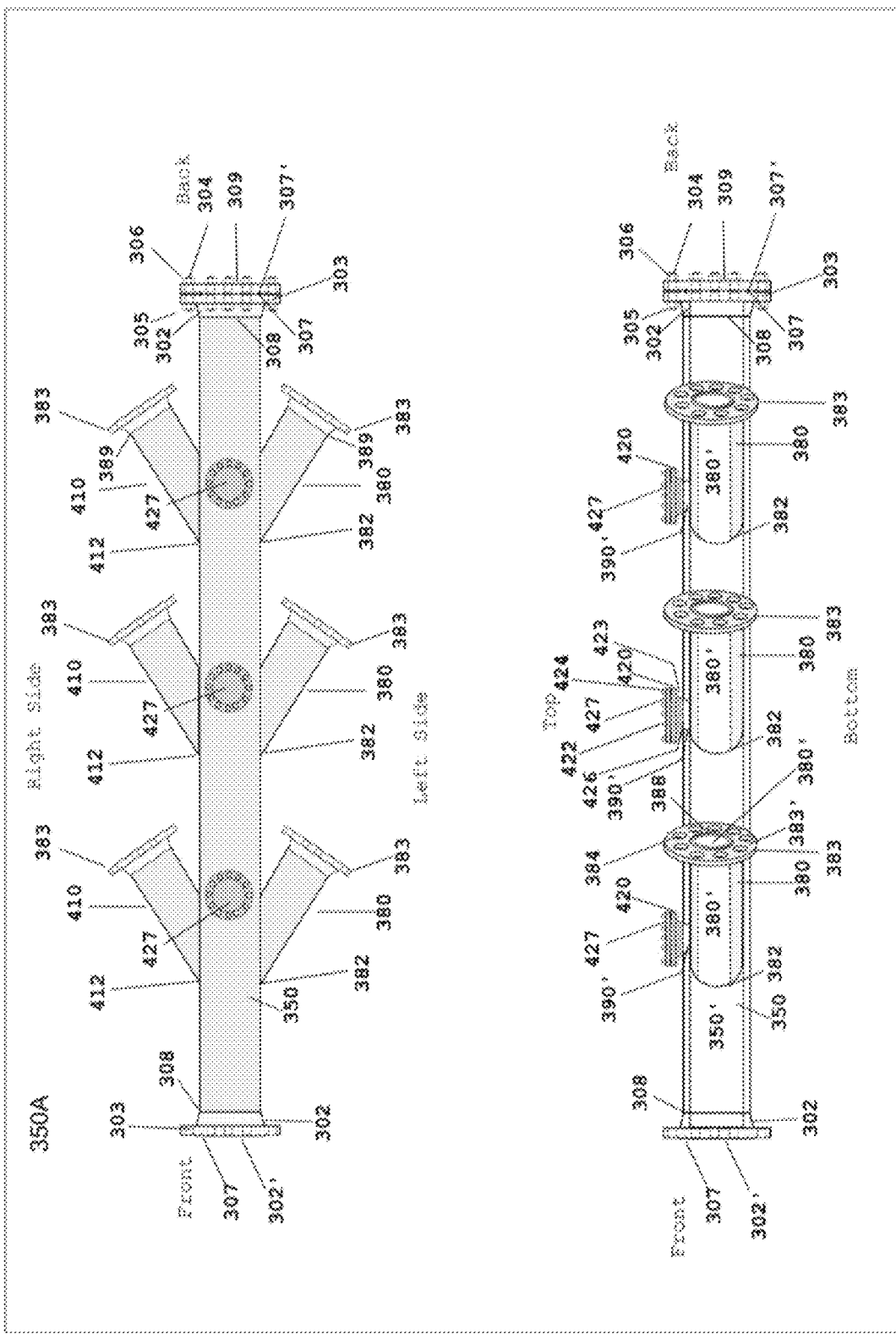

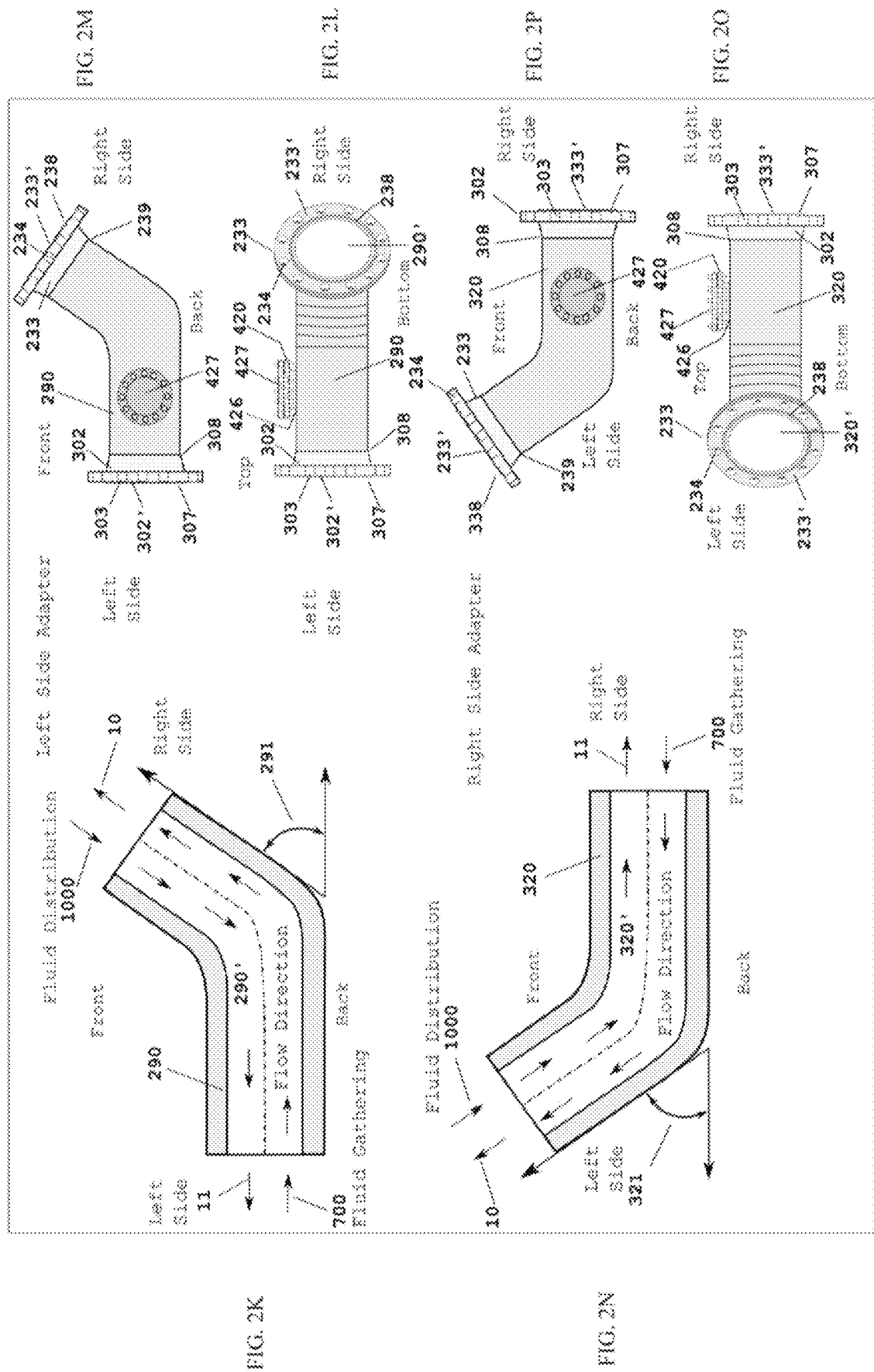

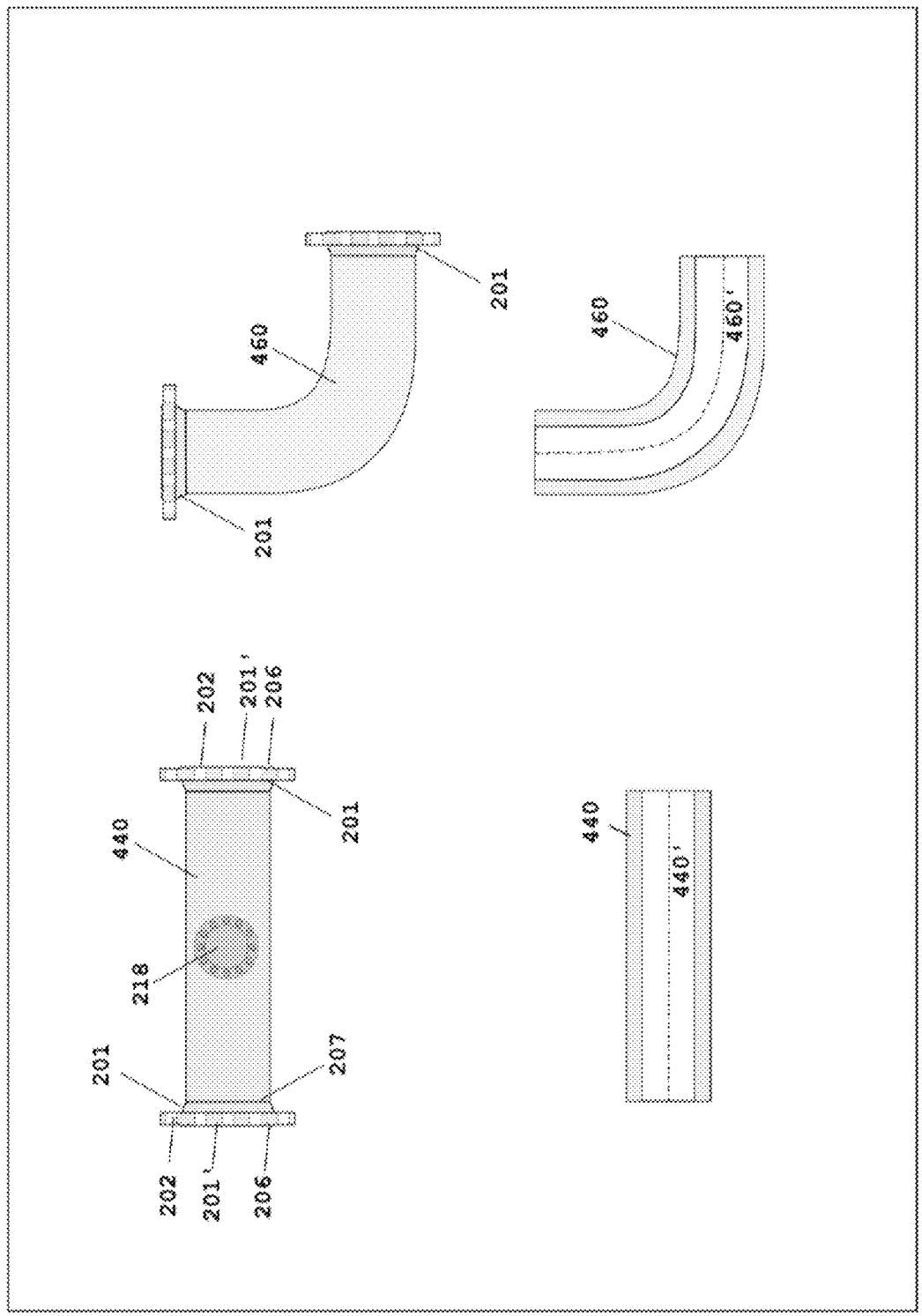

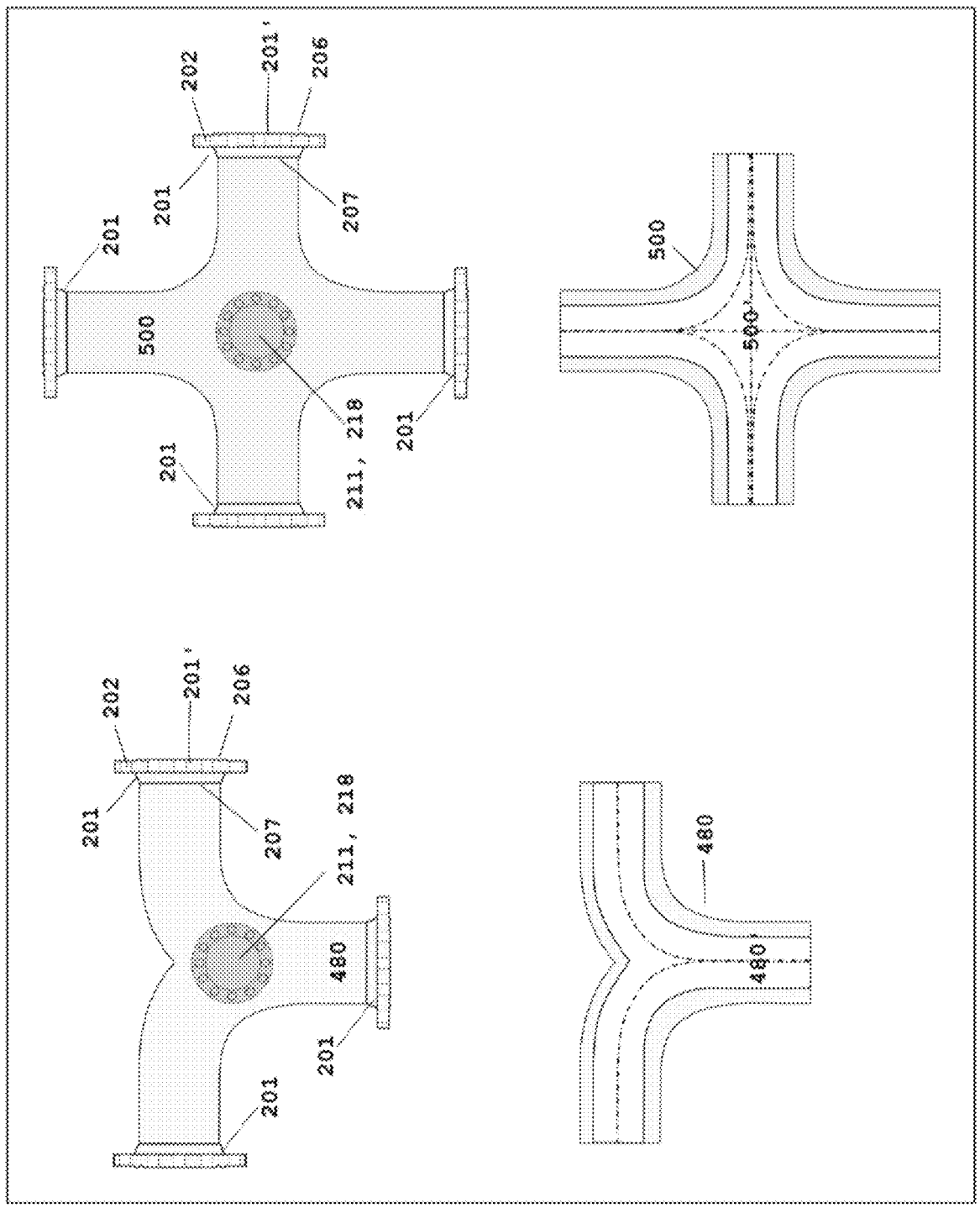

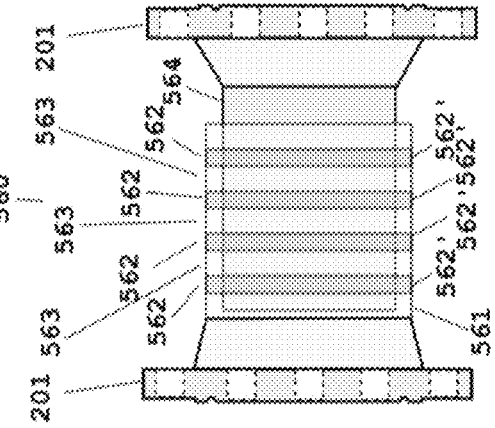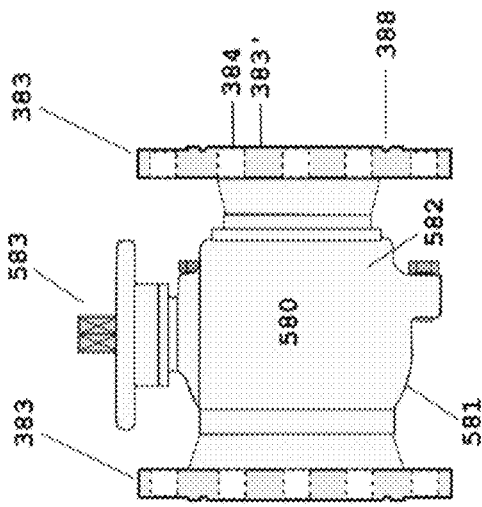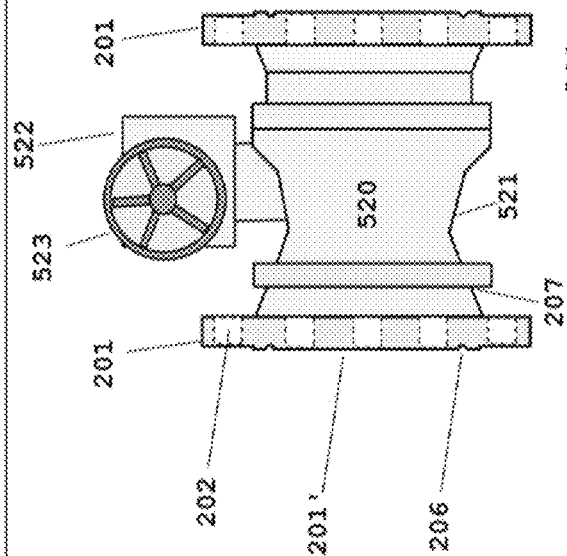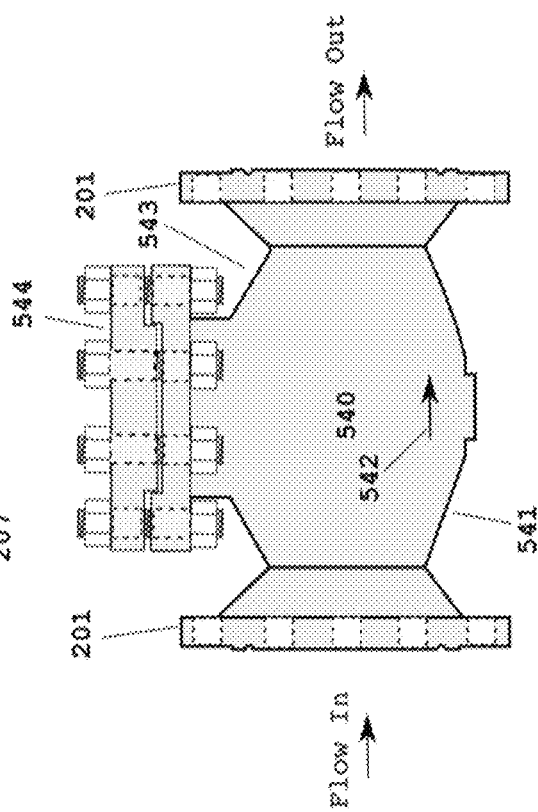

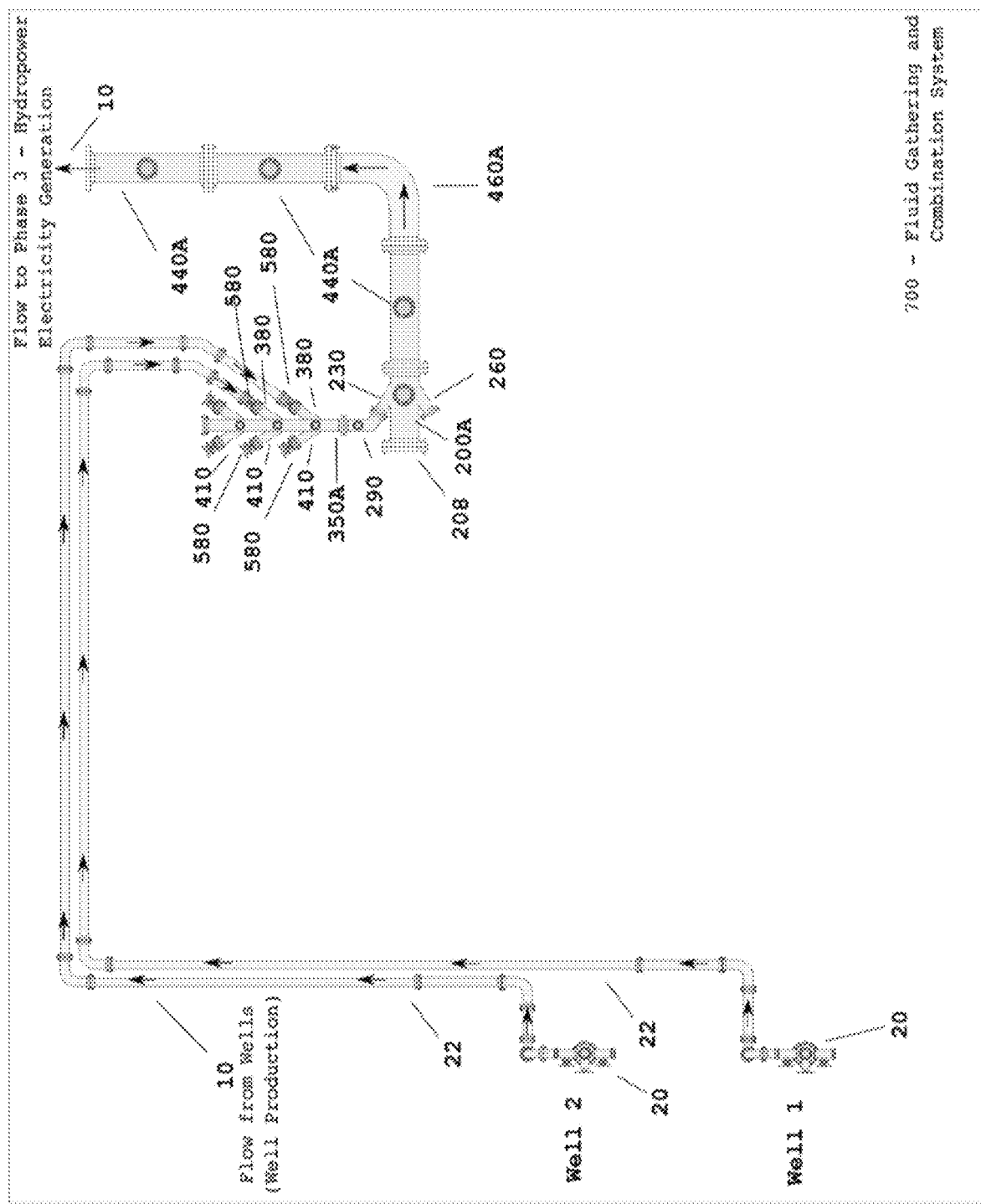

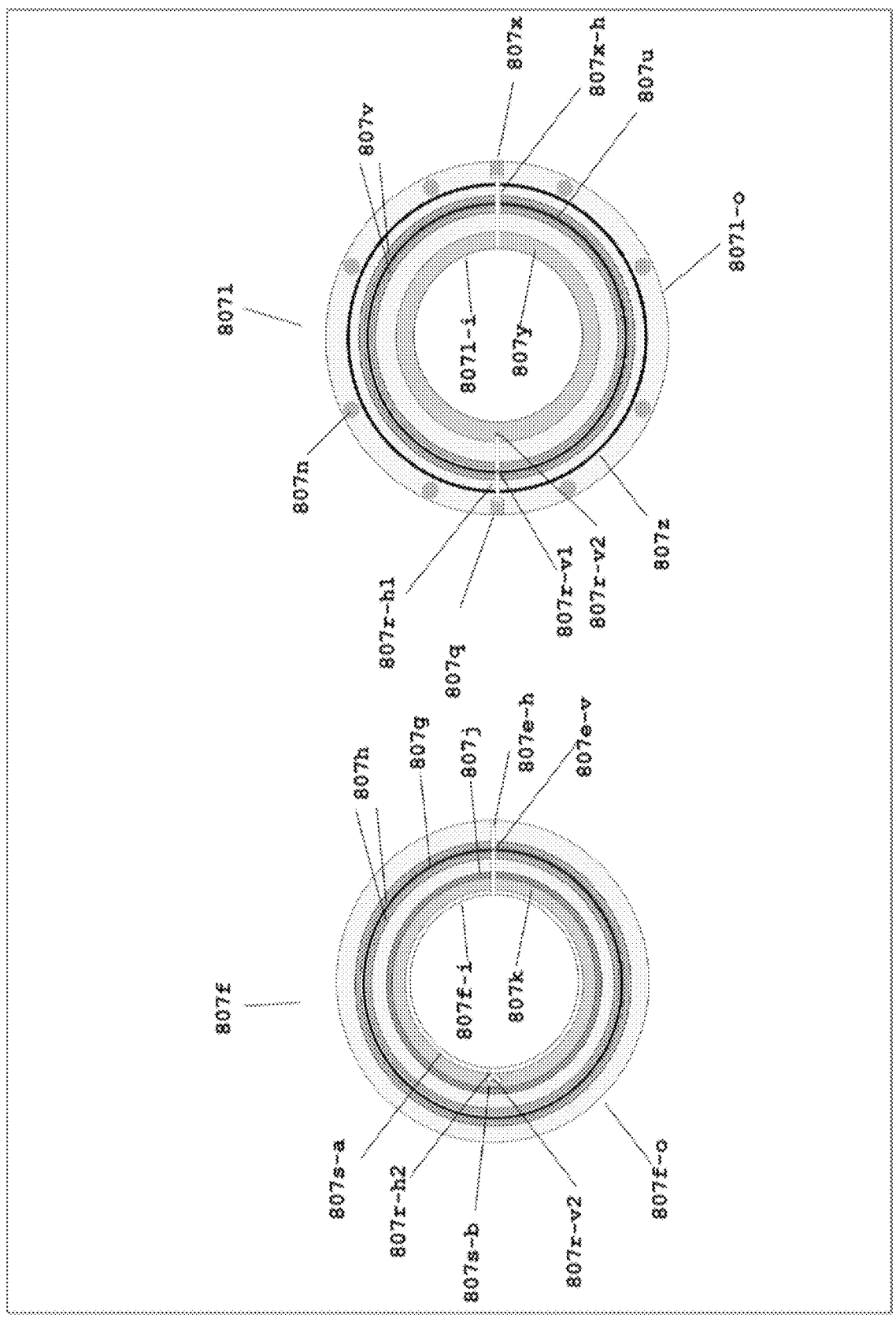

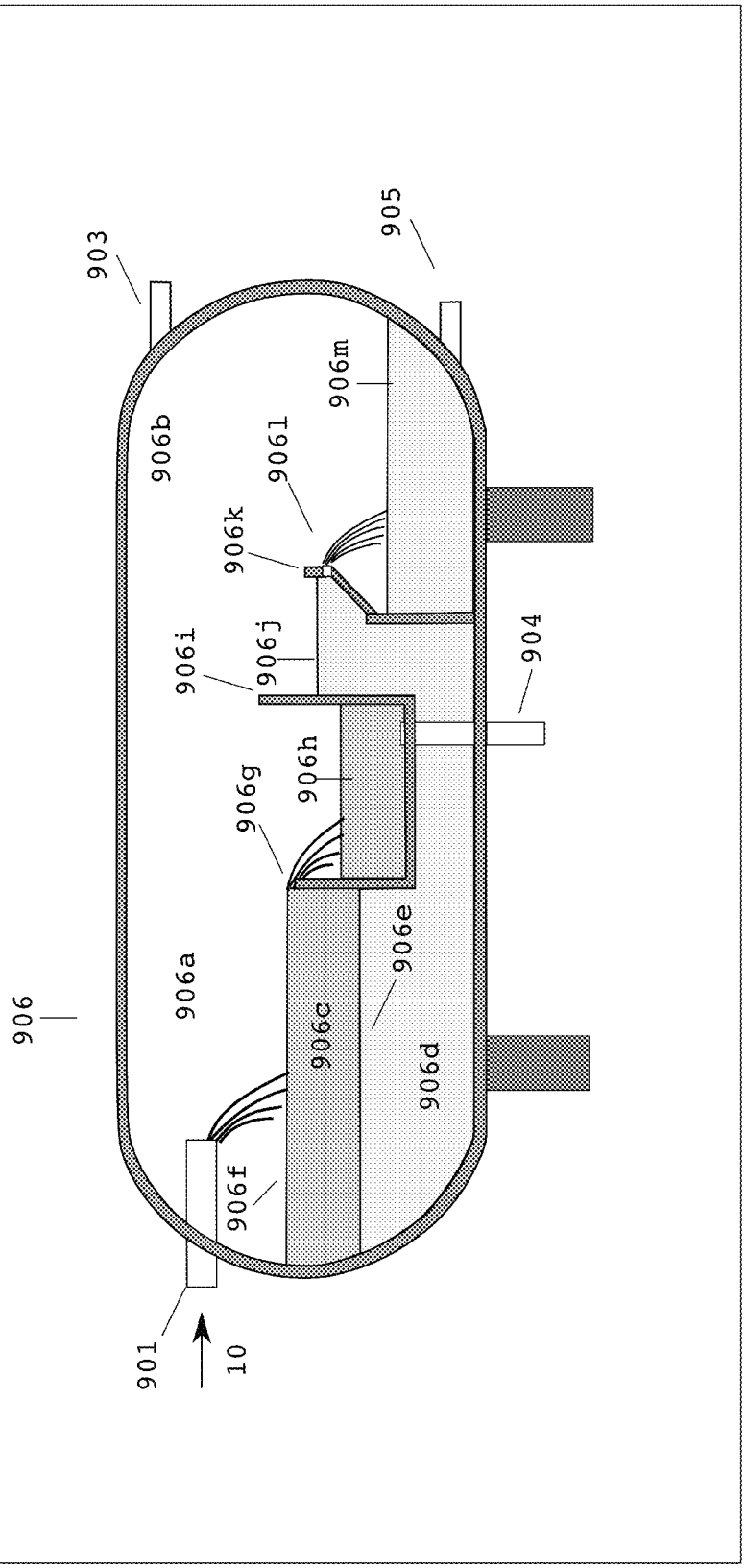

SYSTEM, METHOD, AND APPARATUS FOR GENERATING HYDROELECTRIC POWER FROM SUBSURFACE WELLS

FIELD OF THE DISCLOSURE

The present disclosure generally relates to electric power generation and, more particularly, to a hydroelectric power generating method and apparatus for generating hydroelectric power from subsurface wells.

BACKGROUND

Energy production and use have emerged as critically important issues facing the United States and other developed countries. As recoverable fossil fuels are depleted and negative externalities associated with their use continue to mount, governments and others increasingly focus on renewable energy resources as a means of reducing our reliance on fossil fuels. Renewable energy is energy derived from resources that are regenerative or, for all practical purposes, cannot be depleted. For this reason, renewable energy sources are fundamentally different from fossil fuels and do not produce as many greenhouse gases and other pollutants as fossil fuel combustion. Mankind's traditional uses of wind, water, and solar energy are widespread in developed and developing countries, but the mass production of electricity using renewable energy sources has become more important recently, reflecting the major threats of climate change due to pollution, exhaustion of fossil fuels, and the environmental, social, and political risks associated with fossil fuels and nuclear power. It is known that energy present in water (in the form of motive energy or temperature differences) can be harnessed and used. Since water is about a thousand times denser than air, a flowing stream of water can yield considerable amounts of energy.

There are many forms of water energy production, some of which include, large-scale energy production from dams, smaller scale run-of-the river open-water type installations, stored reservoir systems, micro-hydro systems generating electric power from municipal water supply piping systems or tidal-motion energy production systems. A huge amount of water exists in the form of groundwater contained within water-bearing subterranean zones, strata or reservoirs which are known as aquifers. Aquifers are porous, permeable water-bearing formations. These formations may be hydro-pressured or geopressured.

Hydropressured aquifers are porous, permeable water-bearing formations in which the interstitial fluid pressure reflects the weight of the superincumbent fluid column, unconfined above, and open to the atmosphere. The pressure in the fluid-bearing zone is approximately equal to the hydrostatic pressure at the depth of the zone. The depth-pressure gradient is mainly a function of the dissolved solids content of the formation water and may range from approximately 0.3 to 0.5 pounds per square inch per foot of depth (psi/ft.).

The term "geopressure" was introduced in late 1950s by Charles Stuart of Shell Oil Company and refers to reservoir fluid pressure that significantly exceeds hydrostatic pressure at the depth of the zone, is not open to the atmosphere and the reservoir is isolated or compartmentalized by subsurface faulting (Society of Petroleum Engineers, 2019). The fluid pressure reflects a part, or all of the weight of the superincumbent rock deposits. Aquifers are huge storehouses of water and geopressured accumulations have been observed in many areas of the world (U.S. Geological Survey, 2018).

Hydrocarbon-bearing formations also contain water, in addition to oil and/or gas and can have pore pressure that is normal, abnormal, or subnormal. The subsurface or overburden pressure of these formations is a result of gravitational forces acting on superincumbent formations and the fluids contained within these formations. The total stress imposed by the overburden on a subsurface formation is called the geostatic, lithostatic, or total overburden pressure. The overburden pressure is equal to the total pressure from the weight of sediments plus the pressure from the weight of fluids that exist above a particular formation, and which must be mechanically supposed above the formation. Sediment bulk densities vary from area to area and with depth, is usually taken as 144 pounds per cubic foot, or specific gravity of 2.3, therefore, the geostatic or overburden gradient is 1 psi/ft. Total overburden pressure is supported by rock in two ways. The first is through inter-granular pressure, a matrix stress caused by the force transmitted through grain-to-grain mechanical contact. As formations are compacted by the overburden with increasing burial depth, pore water escapes so that pore pressure is equal to the hydrostatic pressure of the pore water density. Therefore, total overburden pressure is equal to the sum of the inter-granular pressure and the pore pressure. Pore pressure is the pressure of the formation fluids, which may be water alone, or water with oil and/or gas. The pore pressure gradient is affected by the concentration of salt in the fluid density of the fluid column. Pore pressure defined as Normal, therefore, will have different values in the depositional environment of a particular geological region based upon the salinity of the water in that region.

A "normally" pressured formation has a pore pressure equal to the hydrostatic pressure of the pore water and is characterized by saltwater weighing 8.95 pounds per gallon with a pressure gradient equal to 0.465 psi/ft. Any deviation from the normal hydrostatic pressure environment is referred to as abnormal and may be geopressured (over-pressured) as discussed above, or subnormal (under-pressured). Subnormal or low pressures are encountered in zones with pore pressure lower than the normal hydrostatic pressure. Abnormally low-pressured formations are defined as depleted formations. Depleted formations are found most frequently in reservoirs from which the reservoir fluids have been produced and are defined as mature formations.

As oil and/or gas are produced from mature formations, water is the primary produced fluid. Since the late 1850s, when Edwin Drake drilled the first oil well, demand for petroleum has continued to rise. It is estimated that world daily petroleum consumption would increase from 85 million barrels in 2006 to 106.6 million barrels by 2030. Despite its significance, petroleum is produced with large volumes of waste, with wastewater accounting for more than 80% of liquid waste and as high as 95% in ageing oilfields. Generally, the oil/water volume ratio is 1:3. Globally, ~250 million barrels of water are produced daily from both oil and gas fields, and more than 40% of this is discharged into the environment (Igunnu, 2014).

When the cost of operating an oil and gas lease exceeds the revenue generated from hydrocarbon production, facility equipment, structures and pipelines must be permanently plugged and abandoned. A large percentage of the operating costs inferred above, are attributed to the cost of treating, handling, transporting and/or disposing of the massive volumes of wastewater or produced water. In the U.S. Gulf of Mexico (GOM) alone, it is estimated ~29,000-30,000 wells have been permanently abandoned. The abandonment cost, on average, is estimated at ~$10 million U.S. per GOM deep-water well, and $500,000 per shallow well with a decommissioning expenditure estimated at ~$5.7 billion in the U.S. and ~$42 billion U.S. globally through 2024 (World Oil, 2021), (Rystadenergy, 2020). Presently, the produced water has marginal value and is considered a liability regarding operating costs.

Consistent with fluids produced from subsurface wells for the purpose of generating hydroelectric power, produced fluids consisting of hydrocarbon-based fluids or high salinity fluids that may contain aqueous or gaseous corrosive components whereby, fluid contact with surfaces of inlet pipes used for the purposes of fluid transportation, hydraulic turbine equipment used for the purpose of electric power generation, processing equipment used for the purpose of fluid separation of combined fluid components into individual components, and outlet pipes used for fluid distribution and injection, may initiate corrosion in general and internal corrosion specifically to component and/or apparatus surfaces, resulting from fluid contact. Corrosion related to hydrocarbon-based fluids is generally caused by water, high salinity water, carbon dioxide ($CO_2$) and hydrogen sulfide ($H_2S$), with flow regimes of multiphase fluids greatly influencing the corrosion rate. At high rates, flow-induced corrosion and erosion-corrosion may occur, whereas at low flow rates, pitting corrosion is more common.

Combating corrosion from fluids originating from subsurface wells is paramount since economic loss and/or the potential safety impact, for personal in industries utilizing these fluids for various economic means, could potentially be extremely high. A 1975 benchmark study by Battelle-NBS pointed out the severe impact corrosion related failures had on the U.S. economy citing the cost of corrosion alone was approximately $70 billion, which was 4.2% of the gross national domestic product (GDP) at that time. A limited study in 1995, by CC Technologies, Inc. and reported by the National Association of Corrosion Engineers (NACE), updating the 1975 figures, estimated the total cost of corrosion at approximately $300 billion, approximately 3.1% of the nation's GDP, with $47.9 billion attributed to the utilities sector and $17.6 billion to the Production and Manufacturing sector (Koch, 2002).

Due to their excellent corrosion resistance and good mechanical properties, special nickel-based alloys are used to mitigate corrosion in a broad range of industries employing an equally broad range of applications that include industries specializing in fluid production originating from subsurface wells. The alloy's versatility and reliability make them prime materials for components and applications designed for service in aqueous, gaseous and high-temperature corrosive environments. Problems, related to metallic corrosion, can be found in many forms as subsequently described below. Metallic corrosion, under aqueous conditions, can take place by many variable mechanisms that may include general corrosion, localized corrosion, pitting, crevice corrosion, microbial influenced corrosion, environmentally assisted cracking, corrosion fatigue, stress corrosion cracking, liquid metal cracking, hydrogen embrittlement, intergranular corrosion, erosion corrosion, galvanic corrosion and dealloying with general descriptive definitions subsequently provided. General corrosion is a uniform attack and is the most encountered type of corrosion characterized by a chemical or electrochemical reaction that proceeds uniformly over the entire exposed surface area. Localized corrosion may exist in a specific location or under specific conditions and may be defined as pitting, crevice attack and microbial influenced corrosion. Pitting corrosion is a form of a very localized attack that results in the formation of holes in the metal. The holes formed are generally small but can propagate very quickly leading to material penetration and failure in a short period of time. Crevice corrosion generally takes place in small clearances between two surfaces and is similar to pitting whereby the autocatalytic microenvironment within the crevice, or hole for pitting, varies significantly from the general medium, resulting in rapid corrosion progression. Microbial influenced corrosion is a crevice-type attack on a metallic material. Certain types of bacteria form dome-shaped colonies on the metallic surface whereby the interior structure is sealed from the outside environment. The life cycle of the bacteria produces a corrosive environment within the colony resulting in a crevice attack of the metal and generally is associated with fresh or brackish fluids. Environmentally assisted cracking is a result of chemical conditions within the environment and the mechanical condition of the metal itself. Both conditions must be present for corrosion initiation. Corrosion fatigue, stress corrosion cracking, liquid metal cracking and hydrogen embrittlement are all forms of environmentally assisted cracking. Corrosion fatigue is a metallic failure mechanism whereby a reduction of fatigue resistance of the metal results from the presence of a corrosive medium and is generally not a visible metallic degradation and is classified as a premature failure of a component under cyclic conditions. Stress corrosion cracking is a metallic failure mechanism whereby fine linear cracks progress through the metallic material resulting from the simultaneous presence of tensile stress and a specific corrosive medium. Chloride stress cracking of stainless steel and ammonia stress cracking of nickel-copper alloys are examples. Liquid Metal Cracking originates from a liquid metal with low melting point attacking the base metal resulting in stress corrosion cracking. An example is aged Ni—Cr—Fe alloy cracking by silver-base braze alloy exposure during the fabrication process. Hydrogen Embrittlement takes place due to the penetration of the surface of susceptible metals by elemental hydrogen forming metallic hydride compounds or by the interaction of dissolved hydrogen atoms resulting in the formation and propagation of fine cracks and voids in the metallic structure. Intergranular Corrosion is the selective attack of a metallic component at the grain boundary by a corrosive medium. Metals are made of atoms that are arranged in metallic crystals called grains whereby grain boundaries are defined as zones that have short-range disorders that determine different properties of engineering materials. Metallic compounds exposed to thermal mechanical processing may precipitate and migrate to the grain boundary. Grain boundaries have less density on the atomic scale, a property that implies the presence of atomic holes, which atoms can diffuse, whereby oxidation and subsequent corrosion result. Erosion Corrosion is the acceleration or increased rate of metallic deterioration resulting from relative movement between a corrosive medium and the metallic surface. Generally, the movement is rapid whereby metal is removed as dissolved ions and are swept away from the metallic surface. Galvanic Corrosion occurs through electrical coupling of two dissimilar metals in a corrosive medium, known as an electrolyte, resulting in the attack of the less resistant metal. The less noble material becomes anodic, dissolving in the electrolyte, leading to its accelerated decay, while the more noble material becomes cathodic whereby the anodic material beneficially protects the cathodic material through its decay. Dealloying, also referred to as selective leaching, is the selective removal of one element of a solid alloy by a corrosion process resulting in deterioration of its essential properties (Special Metals).

Material composition of corrosion resistant materials, specific to energy production utilizing primarily surface sourced aqueous fluid with hydraulic turbine machines, apparatus and/or component discussion related to material use, has been limited to utilizing specific chromium-based stainless-steel materials, namely, 13Cr5Ni, or other chromium-base stainless-steel materials.

Conventional, surface water sourced hydropower technologies divert the force of moving water through a closed conduit or pipe, known as a penstock, to a scroll case that houses a hydraulic turbine. The moving water causes the turbine blades or runner assembly to rotate, which in turn propels a shaft attached to a generator to produce electricity. Utilizing sources of surface water in all regions of the world, hydropower has been one of the most prominent renewable energy sources utilized for producing electricity. Where water, air and metal combine, corrosion is likely to follow. With a useful life of 30-50 years, implementation of corrosion control measures becomes specifically vital to the surface water sourced hydropower industry and more specifically vital to hydropower generated by fluids originating from subsurface wells.

Chromium-based stainless-steel alloys, presently utilized with surface sourced water supplies applicable to the hydropower industry, provide minimal corrosion resistance and strength. Components, specifically turbine runners, often become corroded or cavitated resulting from routine function and water submersion over long periods of time. Corrosion and cavitation affect other metal components of both small and large hydropower facilities, such as intake piping, spiral casing, and wicket gates. Chromium-based stainless-steel alloys lack the moderate corrosion resistance and strength required resulting from subsurface sourced fluids that may contain gaseous mixtures of carbon dioxide, hydrogen sulfide and/or other corrosive components that may be contained within these fluids. With emphasis related to highly corrosive fluid composition, consisting primarily of carbon dioxide, hydrogen sulfide, salt water and/or other aqueous or gaseous corrosive components, and recognizing that chromium-based stainless steel materials are somewhat beneficial in reducing corrosive component damage in certain applications, chromium-based stainless steel materials may not provide the higher level of corrosive resistance required for materials that may be exposed to a higher level corrosive environment resulting from fluid exposure originating from subterranean zones within subsurface wells.

SUMMARY

Embodiments of the present disclosure may provide systems and methods to develop alternate fluid sources for hydropower energy production that does not rely on surface fluid sources to renewably generate hydroelectric power. Methods may reduce the environmental impact resulting from oil and gas operation produced water, offset the operating costs associated with handling, treating, transporting, and disposing of massive volumes of production water associated with mature, late-life oil and gas operations, and permit the extension of the useful life of those operations, by transitioning produced water into a revenue-generating commodity. Systems and methods also may mitigate the risk of component and/or apparatus damage that may result through exposure to potentially damaging corrosion from aqueous or gaseous corrosive elements frequently found in fluids originating from subterranean zones and produced from subsurface wells.

Embodiments of the present disclosure may provide a system and method for hydroelectric power generation that does not rely on distance, elevation, the length of a river or stream and/or any other surface water channel required for power generation. Systems and methods may permit utilization of sources of subterranean fluids accessed by subsurface wells to renewably generate hydroelectric power. Systems and methods also provide a means of environmental sustainability, whereby produced water is beneficially reused reducing the negative impact resulting from produced water applicable to oil and gas industry operations, by implementing a renewable energy technology permitting its beneficial use, whereby the negative environmental impact associated with produced water is reduced. Systems and methods may extend the useful life of oil and gas industry operations by developing a revenue generating useful purpose for high volumes of produced water associated with mature, late-life oil and gas operations. Systems and methods also may utilize materials that increase corrosion resistance to potentially corrosive aqueous or gaseous components that may originate from subsurface wells.

The present disclosure relates to hydroelectric power generated from fluid originating from subsurface wells, that could be flowing at high velocities whereby, hydrocarbon-based fluids or fluids originating from subsurface wells could contain corrosive components consisting of water, high salinity water, $CO_2$ and/or $H_2S$ and/or other corrosive components, resulting in an environment that could initiate aqueous, gaseous and/or flow-induced erosion corrosion on contacted surfaces. Materials composed of primarily nickel-base alloy elements consisting of nickel, iron, chromium, molybdenum, copper, niobium, titanium, and aluminum, when combined in specific weight percentages, provide materials with improved corrosion resistance for use to construct, build or manufacture hydraulic turbine machine apparatus and/or components for energy production utilizing primarily subterranean sourced aqueous fluid with hydraulic turbine machines.

BRIEF DESCRIPTION OF THE DRAWINGS

For a more complete understanding of this disclosure, reference is now made to the following description, taken in conjunction with the accompanying drawings, in which:

FIG. 2B depicts a plan view of the main body assembly according to an embodiment of the present disclosure;

FIG. 2D depicts an elevation view of the main body assembly according to an embodiment of the present disclosure;

FIG. 2I depicts a left-side view of the lateral body section assembly according to an embodiment of the present disclosure;

FIG. 2K depicts a cross-sectional view of a main body left lateral side junction according to an embodiment of the present disclosure;

FIG. 2L depicts a side view of the main body left lateral side junction according to an embodiment of the present disclosure;

FIG. 2M depicts a plan view of FIG. 2L according to an embodiment of the present disclosure;

FIG. 2N depicts a cross-sectional view of the main body right lateral side junction according to an embodiment of the present disclosure;

FIG. 2O depicts a side view of the main body right lateral side junction according to an embodiment of the present disclosure;

FIG. 2P depicts a plan view of FIG. 2O according to an embodiment of the present disclosure;

FIGS. 2Q-2X depict cross-sectional and plan views of apparatus components for fluid gathering and combination system and pumping, distribution and injection system according to an embodiment of the present disclosure;

FIGS. 2Y-2AA depict side views of fluid control apparatus components for fluid gathering and combination system and pumping, distribution and injection system components according to an embodiment of the present disclosure;

FIG. 2BB depicts a side view of a secondary control valve according to an embodiment of the present disclosure;

FIG. 2CC depicts a plan view of a fluid gathering and combination system and a fluid pumping, distribution, and injection system according to an embodiment of the present disclosure;

FIG. 2DD depicts a plan view of a well system according to an embodiment of the present disclosure;

FIG. 2EE depicts a plan view of variability provided for a fluid gathering and combination system and pumping, distribution, and injection system according to an embodiment of the present disclosure;

FIG. 2FF depicts a plan view of variability provided for a fluid gathering and combination system and pumping, distribution, and injection system according to an embodiment of the present disclosure;

FIG. 2GG depicts a side elevation view of a fluid gathering and combination system and pumping, distribution, and injection system according to an embodiment of the present disclosure;

FIG. 2HH depicts a side elevation view of FIG. 2GG according to an embodiment of the present disclosure;

FIG. 2JJ depicts a main body section of a fluid gathering and fluid distribution system according to an embodiment of the present disclosure;

FIG. 4B depicts a side view of a fluid separation processing system according to an embodiment of the present disclosure;

DETAILED DESCRIPTION

Figure 6:
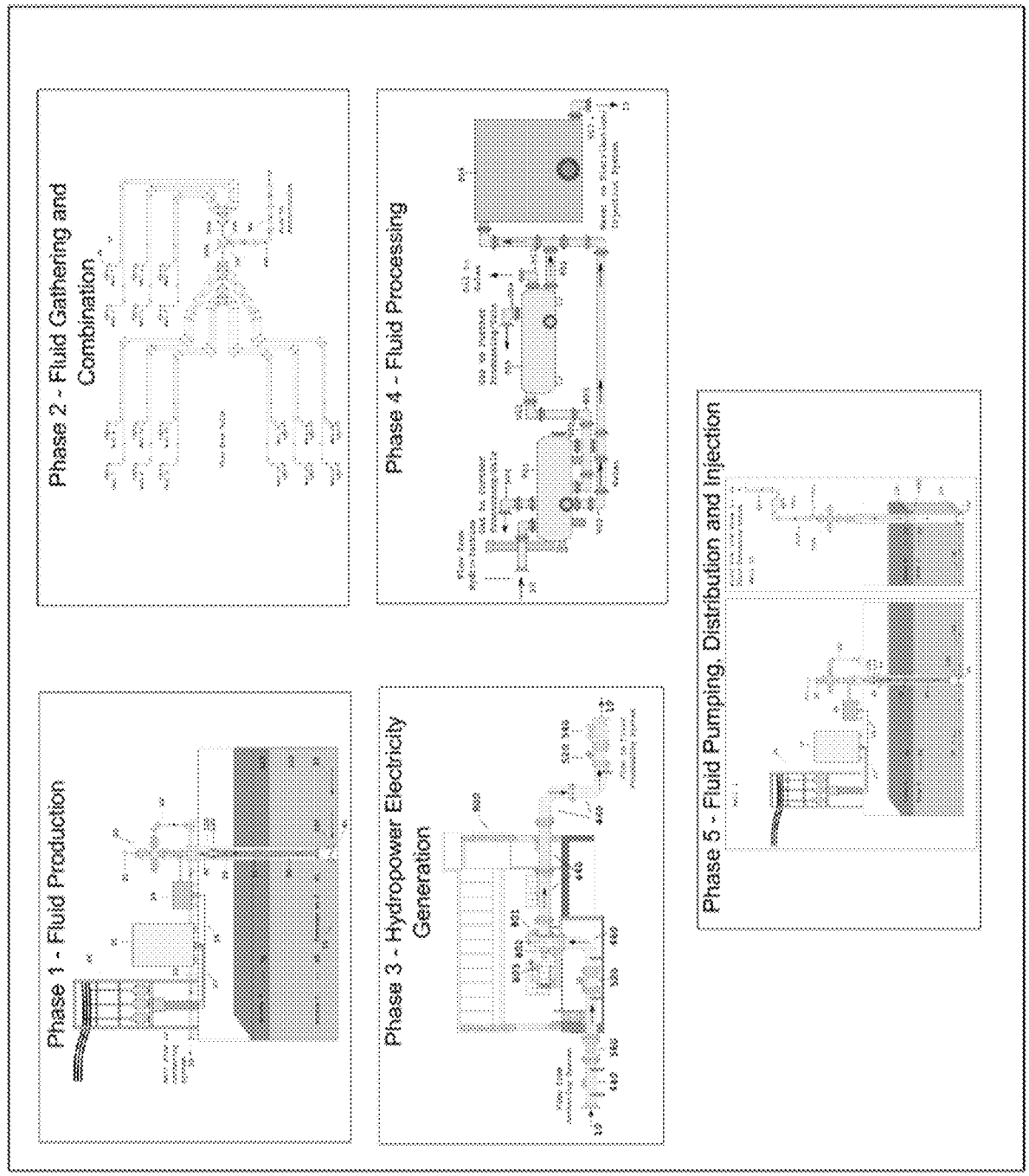
FIG. 6 depicts a process for generating hydroelectric power from produced fluids in subterranean zones, strata, or reservoirs according to an embodiment of the present disclosure.

Embodiments of the present disclosure may provide a system encompassing methods and apparatus for generating hydroelectric power from produced fluids in subterranean zones, strata, or reservoirs, summarized in a five (5) phase process (FIG. 6) using subsurface wells that penetrate or terminate in fluid-bearing intervals containing water alone or any combination of gas, oil and/or water. The 5-phase process includes the following methods: Phase 1—Fluid Production, Phase 2—Fluid Gathering and Combination, Phase 3 Hydropower Electricity Generation, Phase 4—Fluid Processing, and Phase 5—Fluid Pumping, Distribution, and Injection. For the sake of conciseness, all features of an actual implementation, as in any engineering or design project, may not be described or illustrated.

In Phase 1 (fluid production), fluids are produced from one or more subterranean zone(s), strata, or reservoir(s) to the surface. In step A, a new well may be drilled that penetrates through or terminates in subterranean fluid-bearing zone(s), strata or reservoir(s) or utilize an existing well that has been drilled, penetrates through or is terminated in a fluid-bearing zone(s), strata or reservoir(s) that contain one or more inlet pipes interconnected to one or more inlet feed lines. In step B, access may be provided for fluids contained in the subterranean fluid-bearing zone(s), strata, or reservoir(s) to enter the well containing one or more inlet pipes. Access may be provided from a well that is cased or uncased. For uncased wells fluids flow directly from the subterranean fluid-bearing zone(s), strata, or reservoir(s)

into the well and inlet pipes. Cased wells require penetrations or perforations through the pipes to permit fluid entry into the well and access to the inlet pipes contained within the well. Access is not restricted to a single subterranean zone, subsurface strata, or reservoir. Access may be provided from one or any number of subterranean fluid-bearing zones, strata, or reservoirs and may flow simultaneously into the well into one or more inlet pipes contained within the well. In step C, reservoir fluids may be produced to the surface. Reservoir fluids flow naturally into a well when the formation pressure is considered normal or geo-pressured. In normally pressured or geopressured reservoirs, the reservoir pressure is greater than the hydrostatic fluid column in the well and the pressure is sufficient to produce the fluid(s) to the surface. Artificially induced flow, defined as artificial lift, is required to produce fluids to the surface in reservoirs with subnormal, low or depleted pressure. In pressure-depleted reservoirs, reservoir pressure is less than the hydrostatic pressure of the fluid column in the well. Artificial lift is a method used to lower the hydrostatic pressure in a well to a pressure that is less than the pressure in the reservoir. When the reservoir pressure becomes greater than the pressure of the hydrostatic fluid column in the well the reservoir fluids will flow to the surface. With increased reduction of hydrostatic pressure of the fluid column in the well, the differential pressure between the reservoir pressure and fluid column pressure increases. Increased differential pressure, between the reservoir and hydrostatic fluid column will usually result in a higher flow rate. This pressure differential permits fluids contained within subsurface zones, strata, or reservoirs to enter the well, flow into the inlet pipes contained within the well, into interconnecting inlet pipes at the surface, if on land, or the subsea surface, a fixed structure attached to the subsea surface, or a floating structure, if in water.

In Phase 2 (Fluid Gathering and Combination), produced fluids may be gathered from one or more wells and combined in a system of interconnected pipes. In step A, fluids flowing or produced from individual wells enter an interconnected pipe, flow line, or pipeline leading to a gathering system of interconnected pipes that include a modular system of lateral lines and a modular system of main lines that include a system of safety, flow control and monitoring devices permitting one or any number of wells being connected, controlled and monitored within the system of interconnected lines and pipes. In step B, one or more flowing or producing wells connected to a gathering system of interconnected pipes, combined with the normal or geo-pressure originating from the subterranean zone(s), strata or reservoir(s), contained within the well or for wells with subnormal, depleted pressure, an induced pressure created from artificial lift equipment, required for well production and inserted in the well(s), create the pressure or head and flow rate required to turn a rotor or impeller for a hydro-turbine.

Phase 3 is hydropower electricity generation. In step A, accumulated fluid from one or more wells flowing into a gathering system of interconnected lateral and main lines flow into interconnected pipes connected to one or more hydro-turbines modified to permit operation with pressurized, freshwater fluids, hydrocarbon-based fluids, sodium-based fluids, corrosive fluids, or any combination of these fluids. In step B, the fluid flow rate, combined with the well pressure, (normal pressure, geopressure or artificially induced pressure), originating from the subterranean zone(s), strata or reservoir(s) contained within the well create the pressure or head and flow rate resulting from one or more subsurface wells flowing into the gathering system of interconnected pipes. This pressure and combined fluid volume create the required flow rate and head pressure necessary to turn the turbine runner or impeller connected to a shaft connected to an electric generator used to produce electricity.

Phase 4 is fluid processing. In step A, produced fluids are discharged from the hydro-turbine into one or more outlet pipes containing equipment or apparatus preventing back flow to the hydro-turbine and leading to fluid processing equipment and/or apparatus utilized, if required, to separate the combined fluid stream into individual components of gas, oil, and water. In step B, the separated fluids of oil and/or gas flow into individual outlet lines for additional processing, storage and/or sale. The separated fluid of fresh or sodium-based water flows from the processing equipment into one or more outlet lines leading to a containment system of one or more tanks, or a fluid distribution system composed of one or more interconnected lines or pipes.

Phase 5 (Fluid Pumping, Distribution, and Injection) includes the steps to pump processed fluids, distribute into a fluid distribution system of one or more lines, and inject fluid into one or more subterranean zone(s) strata or reservoir(s). In step A, a new well may be drilled that penetrates or terminates in subterranean fluid-bearing zone(s), strata, or reservoir(s), or utilize an existing well that has been drilled, penetrates through or is terminated in a subterranean fluid-bearing zone(s), strata or reservoir(s) that contains one or more injection pipes interconnected to one or more outlet feed lines from the fluid distribution system. In step B, access may be provided to subterranean fluid-bearing zone(s), strata, or reservoir(s) from one or more interconnected pipes within the well for processed fluids contained in a distribution system of one or lines, connected to one or more pumps to permit pumping the processed fluids into the subterranean fluid-bearing zone(s), strata, or reservoir(s). Access may be provided from a well that is cased or uncased. For uncased wells, fluids flow directly from one or more outlet lines or pipes contained in the well into one or more subterranean fluid-bearing zone(s), strata, or reservoir(s). Cased wells require penetrations or perforations through the pipes to permit fluid exit from one or outlet lines or pipes into one or more subterranean fluid-bearing zone(s), strata, or reservoir(s). Access for injection is not restricted to a single subterranean fluid-bearing zone, strata, or reservoir. Access may be provided to one or any number of subterranean fluid-bearing zone(s), strata, or reservoir(s) and may be injected into simultaneously from one or more injection lines contained within the well. In step C, the fresh or saltwater fluid containment system, lines, or pipes from the fluid processing system are connected to a fluid pumping system composed of one or more fluid injection pumps. The fluid pumping system is connected to a fluid distribution system composed of one or more injection lines or pipes. The fluid distribution system is connected to one or more injection lines leading to one or more subsurface wells. In step D, the injection pump system is composed of one or more pumps that are connected to a distribution system of one or more interconnected pipes connected to one or more subsurface wells with injection lines or pipes that penetrate or terminate in one or more fluid-bearing zones. The fresh or sodium-based water from the containment system or system or one interconnected lines or pipes is pumped into one or more injection lines or pipes of the distribution system leading to one or more wells. The well(s) may contain one or more lines penetrating through or terminating in one or more subterranean fluid-bearing zone(s), strata or reservoir(s) with access, penetrations or perforations into the subterranean fluid-bearing zone(s), strata or reservoir(s) that permit injection into one subterranean zone, strata or reservoir or injection into multiple zones, strata, or reservoirs simultaneously. In step E, the fluid injected into one or more fluid-bearing subterranean fluid-bearing zone(s), strata, or reservoir(s) is then recycled and reproduced and the renewable energy production process continues again with Phase 1 of the method described above.

In the subsequent drawings and description, like parts are identified by the same reference numerals. Certain conventions have been adopted to facilitate the description of the novel systems that typically include large numbers of components. For example, as discussed below, main body section, 200, when connective unions are fused, joined, or attached to a body section, the reference made to the body becomes a body assembly with an "A" added after the reference numeral, as in main body assembly 200A, which includes the connective unions attached to the body section. In addition, for Phase 2, Fluid Gathering and Combination and Phase 5, Fluid Pumping, Distribution and Injection, there is a three-level component hierarchy wherein for Phase 2 fluid processing, level one includes components from each individual well, related to a single fluid stream, from the well to lateral body section, 350, level 2 includes components required to gather multiple fluid streams together whereby, multiple inlets are required for each individual well, and include components from lateral body section 350 to the main body section adapters 290 and 320 and level 3 includes components that combine the gathered fluids from multiple well streams into a combined singular fluid stream for further processing in Phases 3 and 4 and include components from the main body section adapters 290 and 320 through main body section 200 and beyond. For Phase 5 Fluid Pumping, Distribution and Injection, the hierarchy is reversed starting at the combined fluid level, followed by separating or distributing the combined fluid stream and finally level three with the fluid stream back to the individual well level for injection.

Embodiments of the present disclosure may provide a system, method, and apparatus for generating hydroelectric power from subsurface wells penetrating or terminating in fluid-bearing intervals containing water alone or any combination of gas, oil, and water. The flow or production of these fluids from one or more wells, designated as fluid production 10 in FIGS. 1-1D, is gathered into a gathering system of interconnected pipes, designated as system 700 in FIG. 2FF, leading to a hydroelectric turbine, designated as Hydropower Electricity Generation System 800 in FIG. 3F, where electricity is generated. The fluids then continue to flow into fluid processing equipment, designated as system 900, in FIG. 4B, or apparatus where, if required, the fluids are separated into the individual fluids of gas, oil and/or water. The separated water is then contained and/or pumped into a distribution system, designated as system 1000 in FIGS. 5 and 5A, including one or more interconnected pipes leading to one or more wells penetrating or terminating into one or more fluid-bearing intervals containing water alone or a combination of oil, gas and/or water where it is injected into the subsurface zone, strata, or reservoir for recycling and further production.

Figure 1A:
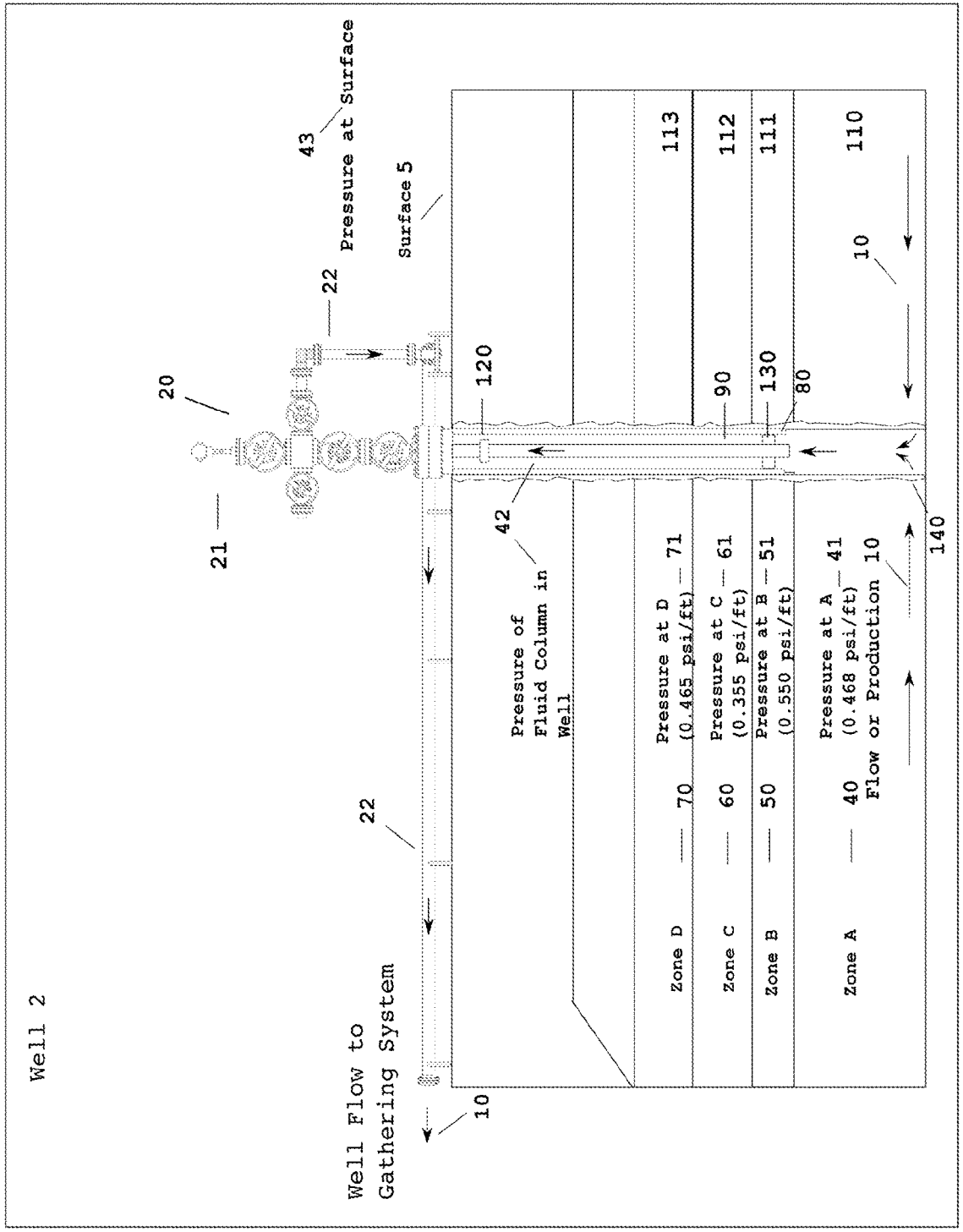
FIG. 1A depicts a side view of a normal or geo-pressured cased well according to an embodiment of the present disclosure.
Figure 1B:
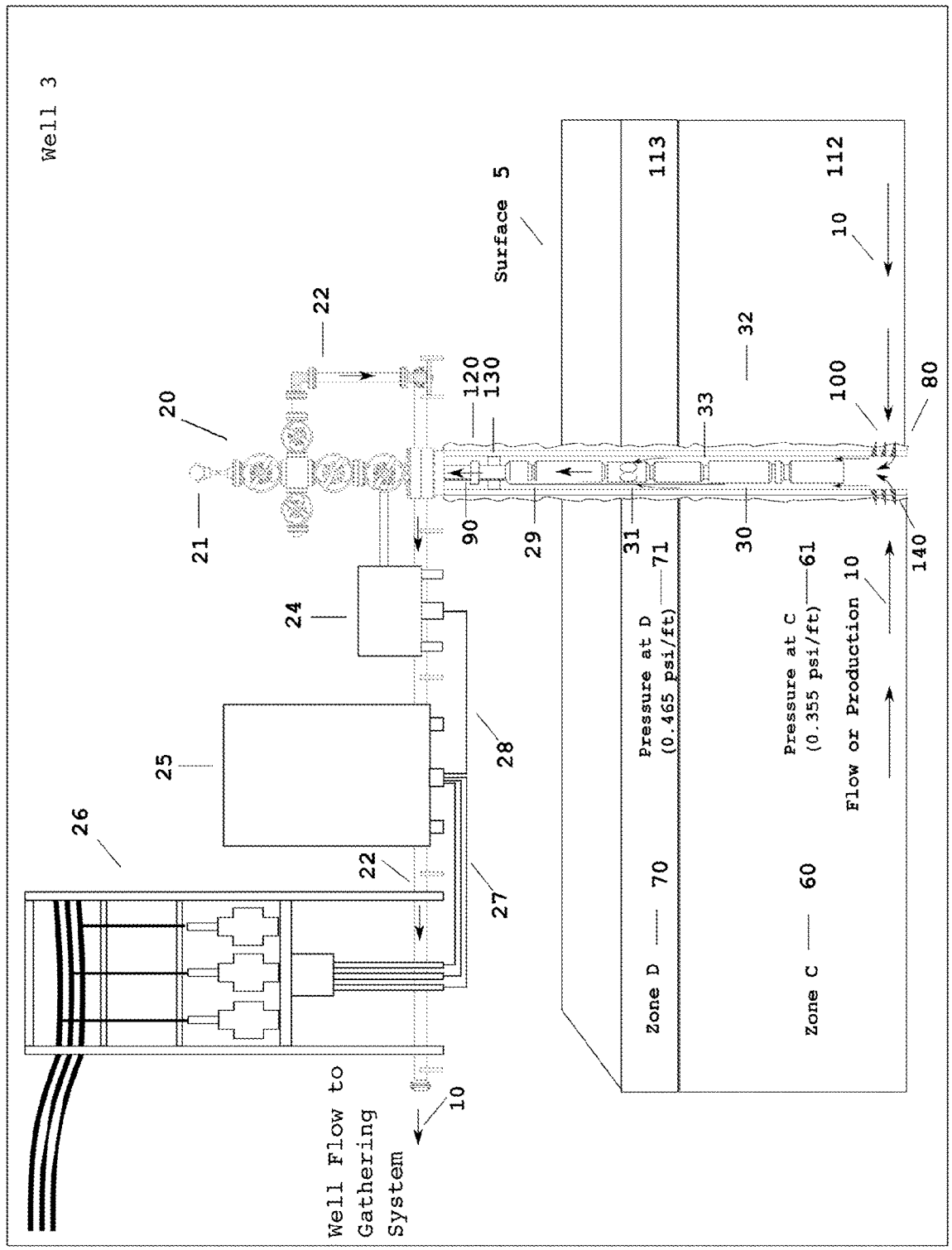
FIG. 1B depicts a side view of a subnormal or pressured-depleted cased well according to an embodiment of the present disclosure.
Figure 1C:
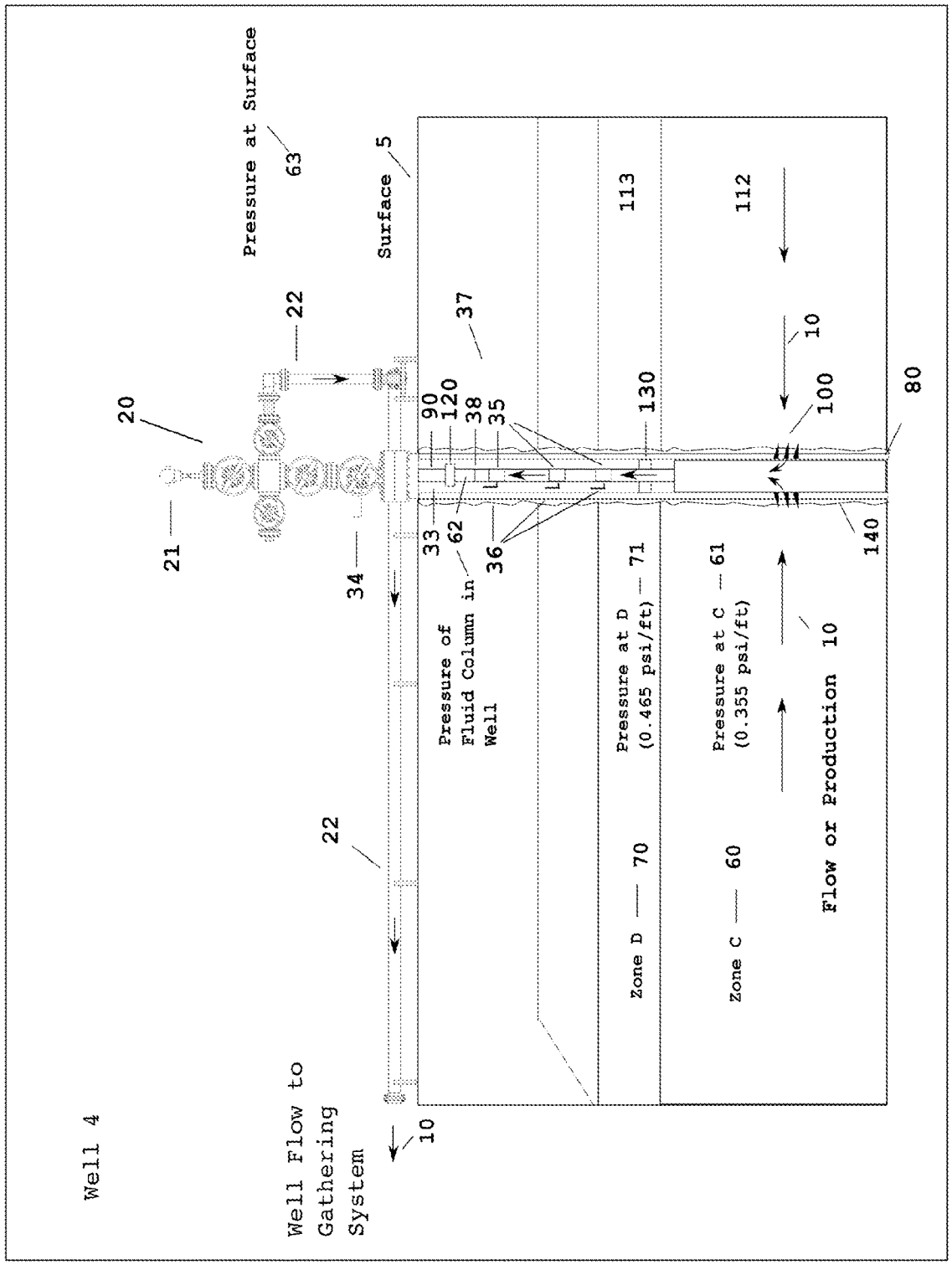
FIG. 1C depicts a side view of a subnormal or pressured-depleted cased well according to an embodiment of the present disclosure.
Figure 1D:
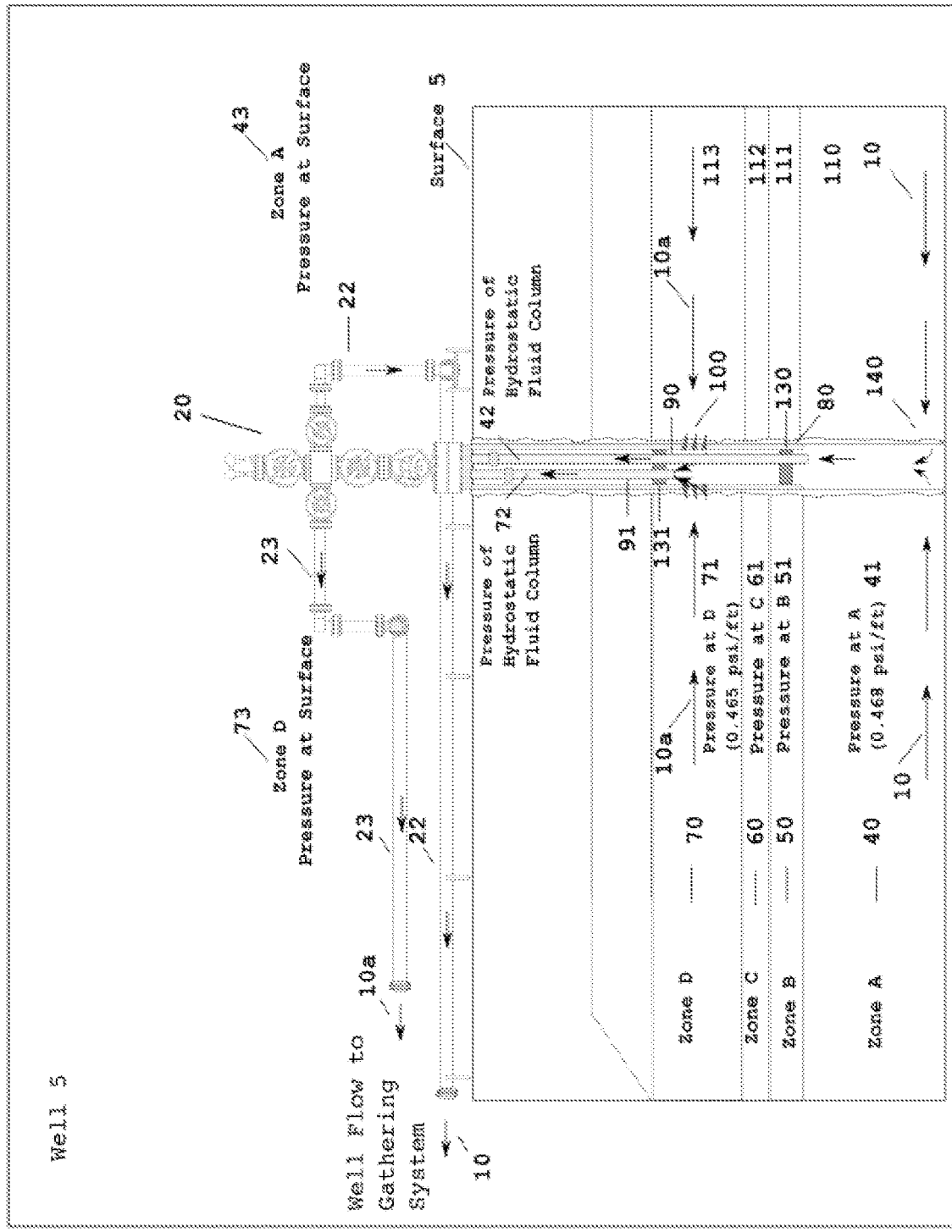
FIG. 1D depicts a side view of a well producing from more than 1 subterranean zone, strata or reservoir according to an embodiment of the present disclosure.
Figure 1E:
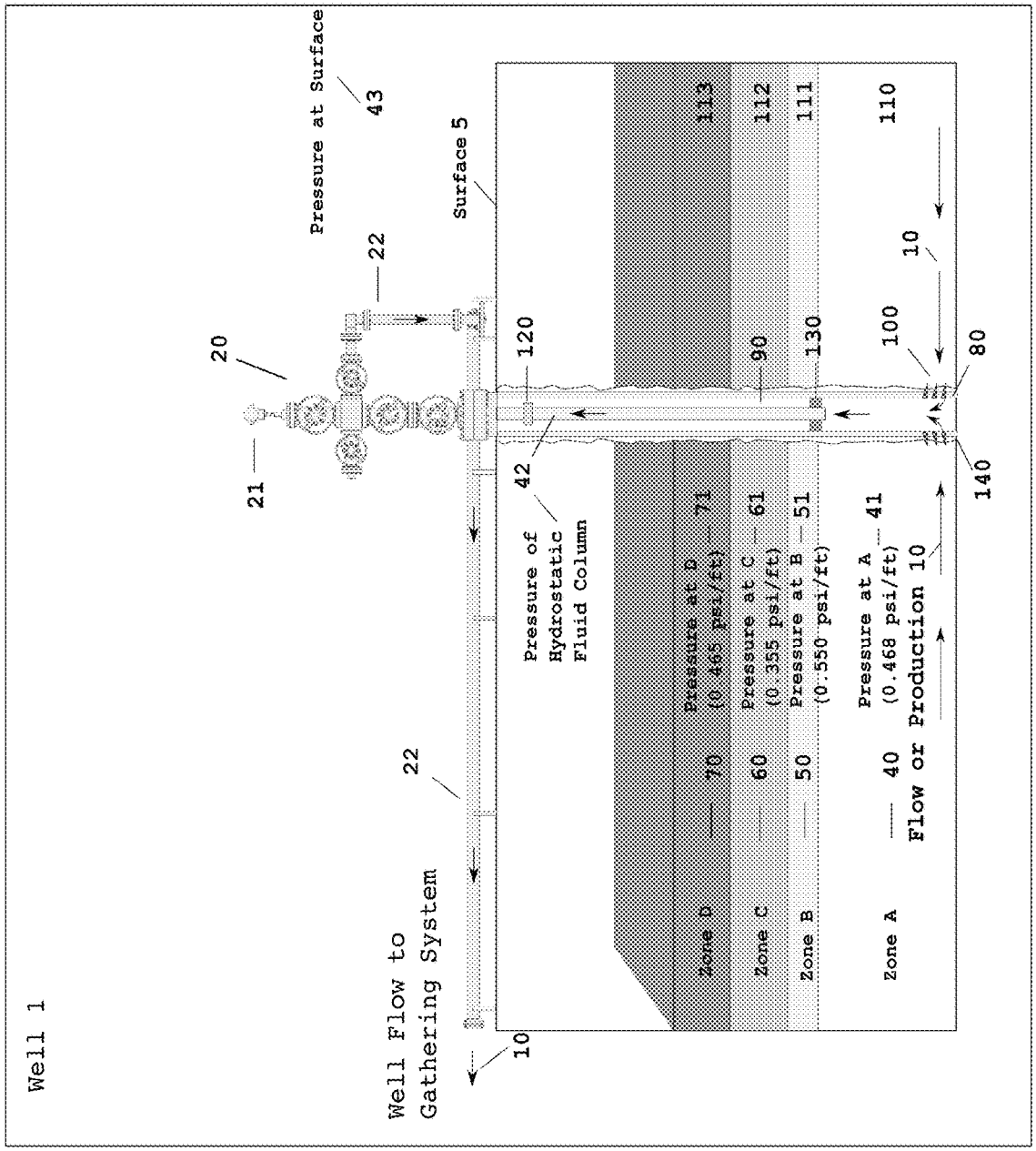
FIG. 1E depicts a side view of a normal or geo-pressured cased well according to an embodiment of the present disclosure.

FIG. 1E depicts a side view of a normal or geo-pressured cased well according to an embodiment of the present disclosure. Well 1 penetrates multiple subterranean zones, strata or reservoirs, 40, 50, 60, and 70, with perforations, 100, to permit fluid entry into well 1. When drilled below surface 5, well 1 can penetrate multiple zones, strata, or reservoirs, each with varying pressures that can be hydropressured, geopressured or pressure-depleted and can be fluid-bearing and contain water alone or any combination of gas, oil, and water. In the depicted embodiment wellbore 140 of well 1 penetrates fluid-bearing Zone A 40, Zone B 50, Zone C 60 and Zone D 70, each which may have varying pressures represented by a pressure gradient based upon true vertical depth and contain different fluids or fluid combinations. For example, zone or reservoir pressure 41 in Zone A 40 contains fluid 110, pressure 51 in Zone B 50 contains fluid 111, pressure 61 in Zone C 60 contains fluid 112 and pressure 71 in Zone D 70 contains fluid 113. Zones A 40 and D 70, with hydrostatic pressure gradients of 0.468 psi/ft. and 0.465 psi/ft., respectively, are examples of normal or hydropressured reservoirs. Zone B 50, with a hydrostatic pressure gradient of 0.55 psi/ft., is an example of a geopressured reservoir and Zone C 60, with a pressure gradient of 0.355 psi/ft., is an example of a subnormal or pressure-depleted reservoir. When well 1 is completed, casing can be installed in wellbore 140 and cemented, referred to as cemented casing or casing 80, to maintain the integrity of wellbore 140 by preventing it's collapse or to isolate each penetrated zone, and its respective pressure from each other penetrated zone. Penetrations or perforations 100 through cemented casing 80 permit reservoir fluids 110 to flow into the inlet pipe or production tubing 90 in well 1. Inlet pipes could be cemented casing 80 without production tubing 90, or production tubing 90 inside casing 80 of well 1. Due to Zone A 40 pressure 41 that may exist from a completed zone, production packer 130 may be set in cemented casing 80, usually close to Zone A 40 perforations 100 to minimize exposure of Zone A 40 pressure 41 to cemented casing 80. Surface controlled subsurface safety valve 120 is typically installed close to the surface to isolate well 1 from well Zone A 40 pressure 41 and production fluid 110 in the event of a failure of surface safety control equipment, well tree 20 or surface inlet line or production flow line 22, for example. Zone A 40 fluid flow or production 10, when contained within inlet pipe or production tubing 90 inside cemented casing 80, result in hydrostatic pressure 42 due to the weight of the fluid and the height of the fluid column. The differential pressure between Zone A 40 pressure 41 and hydrostatic pressure 42 is displayed as surface pressure 43 on surface pressure gauge 21, typically located on the wellhead or well tree 20. To initiate and sustain Phase 1—Fluid Flow or Production 10 with reservoir fluid 110 flowing to the surface, pressure 41 in Zone A 40 must be greater than hydrostatic pressure 42 in production tubing 90. Typically, the greater the differential pressure between Zone A 40 pressure 41 and hydrostatic pressure 42 in production tubing 90, the higher the fluid production rate from well fluids 110 flowing in production flow line 22 at the surface.

FIG. 1A depicts a side view of a normal or geo-pressured cased well according to an embodiment of the present disclosure. Well 2 is a normal or geo-pressured non-cased or open hole well example showing the well penetrating multiple subterranean zones, strata, or reservoirs. There is no cemented well casing 80 covering or restricting fluid entry from the subterranean zone, strata, or reservoir into well 2 with well fluid flowing unobstructed directly into well 2. Well 2, when drilled below surface 5, can penetrate multiple zones, strata, or reservoirs, each with varying pressures that can be hydropressured, geopressured or pressure-depleted and can be fluid-bearing and contain water alone or any combination of gas, oil, and water. For example, well 2 penetrates Zone A 40 with reservoir pressure 41 and contains fluid 110, Zone B 50 with reservoir pressure 51 contains fluid 111, Zone C 60 with reservoir pressure 61 contains fluid 112 and Zone D 70 with reservoir pressure 71 contains fluid 113. Zones A 40 and D 70, with hydrostatic pressure gradients of 0.468 psi/ft. and 0.465 psi/ft., respectively, are examples of normal or hydropressured reservoirs. Zone B 50, with a hydrostatic pressure gradient of 0.55 psi/ft., is an example of a geopressured reservoir, and Zone C 60, with a pressure gradient of 0.355 psi/ft., is an example of a sub-normal or pressure-depleted reservoir. When well 2, known as an openhole completion, is completed, casing 80 is not run to the total depth of the well. The zone or reservoir, Zone A 40, is exposed directly to the drilled hole or wellbore 140. Zone A 40 does not have casing that restricts flow and therefore, can produce reservoir fluids 110, directly into well 2. Casing 80 may be installed at a shallower depth to isolate an abnormal, geopressured Zone B 50, or pressure-depleted Zone C 60, or to maintain integrity of the well by preventing collapse of wellbore 140, for example. For an openhole well, well 2, to produce Zone A 40 fluids 110 into the inlet pipes, which could be casing 80, higher in the well without production tubing 90 or production tubing 90 inside casing 80 of well 2, as depicted in FIG. 1A, reservoir fluids 110 flow directly into well 2 unobstructed by casing 80. To permit Zone A 40 fluids 110 to flow to the surface an inlet pipe, production tubing 90, or casing 80 without production tubing 90, is required. Due to the Zone A 40 pressure 41, which may exist from a completed zone, production packer 130 may be set in casing 80, usually close to productive Zone A 40. Surface controlled subsurface safety valve 120 is typically installed close to the surface to isolate well 2 from the well Zone A 40 pressure 41 and Zone A 40 production fluid 110 in the event of a failure of surface safety control equipment, the wellhead or well tree 20 or the surface inlet line or production flow line 22, for example. Zone A 40 fluids 110 when contained within well casing 80 alone or production tubing 90 inside well casing 80, result in hydrostatic pressure 42 due to the weight of the fluid and the height of the fluid column. The differential pressure between Zone A 40 pressure 41 and hydrostatic pressure 42 is displayed as surface pressure 43 on surface pressure gauge 21, typically located on the wellhead or well tree 20. To initiate and sustain Phase 1—Fluid Flow or Production 10 from well 2, Zone A 40 fluids 110 to the surface and into inlet flow line 22, pressure 41 in Zone A 40 must be greater than hydrostatic pressure 42 in casing 80 or production tubing 90 and is dependent upon the well completion design. Typically, the greater the differential pressure between Zone A 40 pressure 41 and hydrostatic pressure 42 in production tubing 90, the higher the fluid production rate from well fluids 110 flowing in production flow line 22 at surface 5.

FIG. 1B depicts a side view of a subnormal or pressured-depleted cased well according to an embodiment of the present disclosure. Well 3 is a subnormal or pressured-depleted cased well example requiring artificial lift equipment for fluid production. The artificial lift equipment shown is known as an electric submersible pump (ESP) 32 and utilized for fluid production into well 3. Well 3, when drilled below surface 5, can penetrate multiple zones, strata, or reservoirs, each with varying pressures that can be hydropressured, geopressured or pressure-depleted and can be fluid-bearing and contain water alone or any combination of gas, oil and water. In FIG. 1B, wellbore 140 penetrates only Zone D 70 and Zone C 60 with hydrostatic pressure gradients of 0.465 psi/ft. for Zone D 70 pressure 71 and 0.355 psi/ft. for Zone C 60 pressure 61, respectively. The embodiment depicted is an example of a well completion in a pressure-depleted zone requiring artificial lift equipment for production of Zone C 60 fluids 112. Well 3 type completions can have casing 80 across Zone C 60, as depicted, or can produce into the wellbore without casing as described in FIG. 1A, above. Many factors beyond the scope of this discussion are required to determine if the zone requires casing or not. In the embodiment depicted, well 3 is a cased completion requiring penetrations or perforations 100 which are necessary to permit Zone C 60 fluids 112 to flow into the well. Zone C 60 reservoir pressure 61 does not exceed the hydrostatic tubing pressure of the static fluid column in production tubing 90 required to permit Zone C 60 fluid 112 to flow into production tubing 90, and into production flow line 22 at the surface 5. Artificial lift equipment, known as an electric submersible pump (ESP) 32, has motor 30 that is required to operate pump 31. Supplied from surface 5, is electrical cable 29, originating from junction box 24. Electric power supply 26 provides electricity 27 to control panel 25 that sends electricity and operating control signals 28 to junction box 24 and is conveyed down electric cable 29 to pump motor 30, necessary to operate pump 31. In the depicted embodiment, Phase 1—Fluid Flow or Production 10 occurs when ESP 32 is utilized to pump Zone C 60 fluid 112 into production tubing 90, and into production flow line 22 at surface 5. Fluid 112 flows through perforations 100, into annular space 33 between pump motor 30 and casing 80, into pump section 31, into production tubing 90, and into production flow line 22 at surface 5. The pump design, based upon the well and reservoir parameters, is used to determine the maximum flow possible for Zone C 60 fluid 112.

FIG. 1C depicts a side view of a subnormal or pressured-depleted cased well according to an embodiment of the present disclosure. Well 4 is a subnormal or pressured depleted cased well example requiring artificial lift equipment for fluid production. The artificial lift method shown is known as gas lift 37 utilizing gas lift valves 36 for fluid flow into well 4. Well 4, when drilled below surface 5, can penetrate multiple zones, strata, or reservoirs, each with varying pressures that can be hydropressured, geopressured or pressure-depleted and can be fluid-bearing and contain water alone or any combination of gas, oil, and water. Wellbore 140 penetrates only Zone D 70 and Zone C 60 with hydrostatic pressure gradients of 0.465 psi/ft. and 0.355 psi/ft. for Zone D 70 pressure 71 and for Zone C 60 pressure 61, respectively. The embodiment depicted is another example of a well completion in a pressure-depleted zone requiring artificial lift equipment for production of Zone C 60 fluids 112, known as Gas Lift 37. Well 4 type completions can have casing 80 across Zone C 60, as depicted, or can produce into the wellbore without casing as an openhole completion as described in FIGS. 1A and 1B above; however, gas lift 37 completions must contain packer 130, casing 80 and production tubing 90 above the completion interval, depicted as Zone C 60 in this embodiment, for production of Zone C 60 fluids 112. In the embodiment, well 4 is a cased completion requiring penetrations or perforations 100 which are necessary to permit Zone C 60 fluids 112 to flow into the well. Zone C 60 reservoir pressure 61 is lower than the pressure of hydrostatic fluid column 62 in production tubing 90. Reservoir pressure 61 in Zone C 60, determines the subsurface depth, or the elevation or true vertical depth (TVD) above Zone C 60 of a static fluid column 38 located within production tubing 90. One or more gas lift valves 36 installed in gas lift mandrels 35 are placed in production tubing 90, at pre-determined design depths, below static fluid column 38 in production tubing 90. Natural gas source 34, supplied from surface 5, is injected into casing 80, filing annular space 33 between casing 80 and production tubing

90. First or upper most gas lift valve 36 opens to permit gas supply 34 into static fluid column 38 contained within production tubing 90. The injected gas aerates the fluid column, much like carbonated gas injected into a soda, to lighten the fluid column and permit fluid flow from the valve location to inlet line or production flow line 22 at surface 5. As hydrostatic pressure 62 of fluid column 38 decreases, the next lower gas lift valve 36 opens and the valve above closes, and the process continues until hydrostatic fluid column 38 is at the deepest design location in production tubing 90. By lowering the fluid column in production tubing 90, through this process, Zone C 60 reservoir pressure 61 now exceeds hydrostatic fluid pressure 62 of static fluid column 38, permitting flow. In the depicted embodiment, Phase 1—Fluid Flow or Production 10 occurs when static fluid column 38 is at the depth in production tubing 90 designed for optimum or maximum differential pressure of fluid column 62 required for maximum flow for the reservoir fluid 112 in Zone C 60.

FIG. 1D depicts a side view of a well producing from more than 1 subterranean zone, strata, or reservoir according to an embodiment of the present disclosure. Well 5 is known as a dual-well completion illustrating simultaneous production 10 and 10*a* from two alternate zones. This is an example showing the variability that exists for well production. Production can originate from one or any number of zones within a well. Well 5, when drilled below surface 5, can penetrate multiple zones, strata, or reservoirs, each with varying pressures that can be hydropressured, geopressured or pressure-depleted and can be fluid-bearing and contain water alone or any combination of gas, oil, and water. In FIG. 1D, wellbore 140 penetrates Zone A 40 with reservoir pressure 41 and contains fluid 110, Zone B 50 with reservoir pressure 51 contains fluid 111, Zone C 60 with reservoir pressure 61 contains fluid 112 and Zone D 70 with reservoir pressure 71 contains fluid 113. Zones A 40 and D 70, with hydrostatic pressure gradients of 0.468 psi/ft. and 0.465 psi/ft., respectively, are examples of normal or hydropressured reservoirs. The embodiment depicted is an example of a dual-well completion illustrating production from more than one zone simultaneously. In the embodiment depicted, wellbore 140 penetrates Zones A 40 thru D 70 with completions in both Zone A 40 and in Zone D 70. The completion in Zone A 40, known as the long-string (LS) completion, with inlet line or production tubing 90, is an openhole completion, similar to the embodiment described as well 2, above. In the LS completion, for Zone A 40, there is packer 130 set in cemented casing 80 to isolate Zone A 40 from Zone D 70. The completion in Zone D 70, known as the short-string (SS) completion, also has an inlet line or production tubing 91 and dual packer 131, installed on both the inlet lines or production tubing, 90 and 91 for the SS and LS completions, and is installed to isolate Zone D 70 and to prevent Zone D 70 pressure 71 from exposure to the cemented casing 80, above the zone. In the embodiment depicted, well 5, Zone A 40 can flow directly into wellbore 140, unobstructed by casing 80 but, Zone D 70 requires penetrations or perforations 100 which are necessary to permit Zone D 70 fluids 113 to flow into the well. Zones A 40 and D 70 reservoir pressures 41 and 71, respectively, are higher than the pressures of the hydrostatic fluid columns 42 and 72, respectively, in the production tubing 90 and 91, respectively. In the depicted embodiment, Phase 1—Fluid Flow or Production 10 from Zone A 40 and 10*a* from Zone D 70 occurs from both zones simultaneously. The reservoir pressures, 41 in Zone A 40, and 71 in Zone D 70, are higher than the hydrostatic fluid column pressure 42 for Zone A 40 and 72 for Zone D 70, in production tubing 90 for Zone A 40 and production tubing 91 for Zone D 70, respectively, permitting flow to the inlet line or production flow line 22 for Zone A 40 and production flow line 23 for Zone D 70, respectively, at the surface 5.

FIGS. 2-2BB illustrate embodiments of an apparatus, when assembled, that provide a fluid conduit, generally with a tubular or cylindrical configuration with a bore centrally located within the body to permit fluid flow through the body, however body shape may not be restricted to a tubular or cylindrical configuration as other body shapes may be joined together to form a conduit for fluid flow, and the present disclosure encompasses operations and processes whereby subsurface conditions and fluids are variable, and as such, the material composition of the embodiment may vary depending upon anticipated subsurface fluid, fluid composition and pressure exposure to the embodiments described.

Figures 2A, 2J:
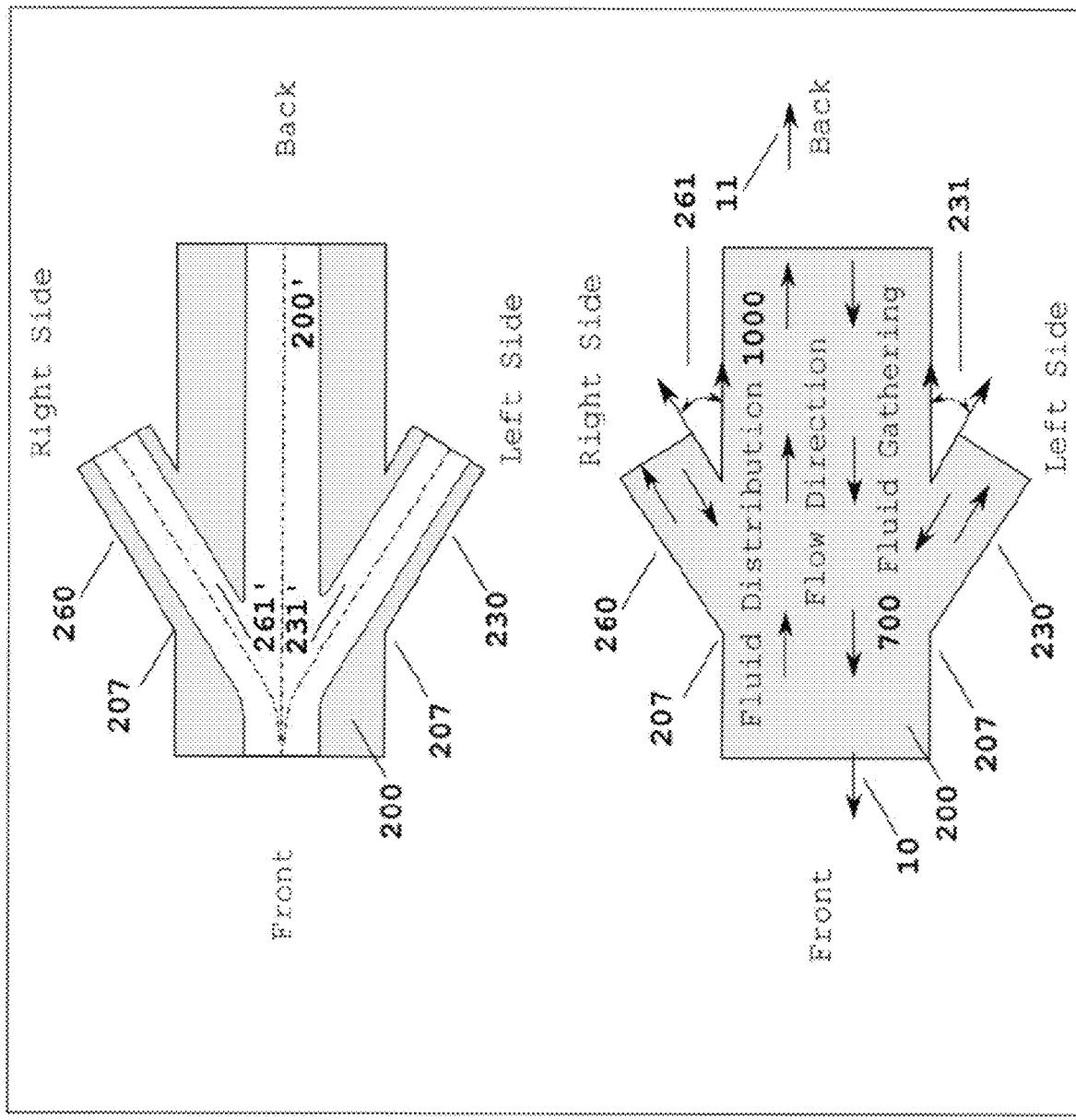
FIG. 2A depicts a cross-sectional view of FIG. 2JJ according to an embodiment of the present disclosure.
FIG. 2J depicts an elevation view of the lateral body section assembly according to an embodiment of the present disclosure.
Figure 2J:
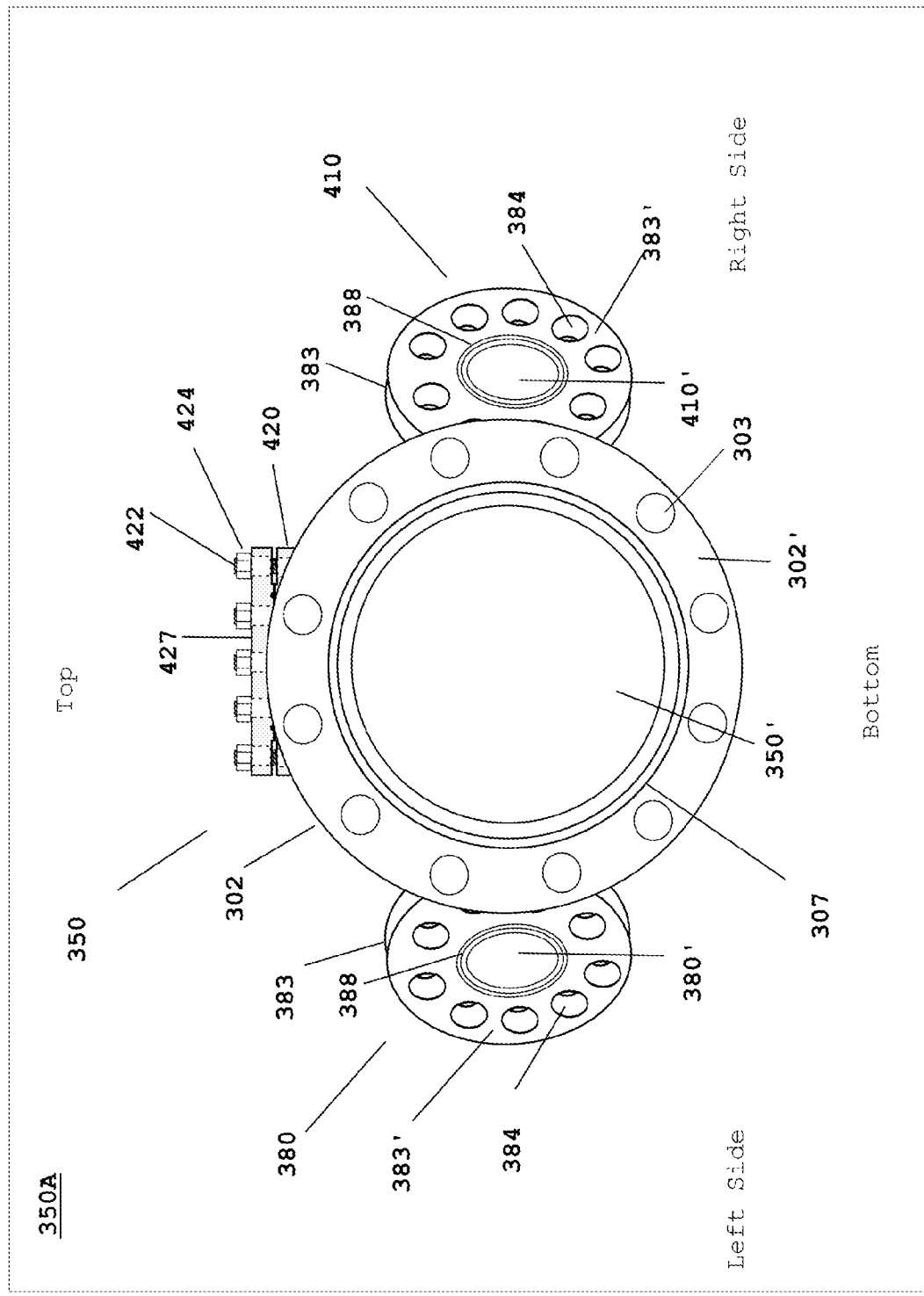

FIG. 2JJ depicts a main body section 200 of a fluid gathering and fluid distribution system according to an embodiment of the present disclosure. This view shows the left and right-side lateral body section inlets or outlets, 230 and 260, respectively, depending upon the intended direction of flow, either production, 10, or injection, 11, and provided is the descriptive flow path when the flow direction is intended for fluid gathering/combination system 700, and when used for fluid pumping/distribution/injection system 1000. The embodiment shown in FIG. 2JJ is a plan view of a tubular fluid flow conduit apparatus, with generally an elongated cylindrical configuration, wherein direction of fluid flow is shown represented by arrows in alternating direction. Fluid flow or production 10 through main body section 200, with a back to front orientation, is considered flow consistent with system 700, and fluid flow or injection 11 through main body section 200, with a front to back orientation, is considered flow consistent with system 1000. A plurality of pipe members forming such connection are secured together at an oblique angle with respect to each other, consisting of tubular main body section 200, left side cylindrical lateral body section 230, and right side cylindrical lateral body section 260, and when connected permit unobstructed fluid flow through the apparatus. Left side cylindrical lateral body section 230, extending axially of and secured to the surface of main body section 200 is in substantially a straight-line contact therewith and is fused together with main body section 200 by means of heat, pressure or both forming a join as the parts cool, referred to as welded joint or connection 232. Welded joint 232 extends around the circumference of left side lateral body section 230 and is attached to main body section 200 at oblique angle 231. Right side lateral body section 260 extending axially of and secured to the surface of main body section 200 is in substantially a straight-line contact therewith, in a position parallel to and 180-degrees axially across from left lateral body section 230 on tubular main body section 200 and secured by means of welded joint 262. Welded joint or connection 262 extends around the circumference of right-side lateral body section 260 and is attached to main body section 200 at oblique angle 261. Oblique angles 231 and 261 are based upon design calculations to determine optimum fluid flow and flow resistance for various pipe diameters and geometries under constraint for anticipated total fluid volumes.

FIG. 2A depicts a cross-sectional view of FIG. 2JJ according to an embodiment of the present disclosure. This view shows an elongated cylindrical central body with bores, 200', 231' and 261', through main body, 200, cylindrical left side lateral body section 230, and cylindrical right side lateral body section, 260, respectively. Lateral junctions referred to as left side lateral body section 230 and right-side lateral body section 260 may be referred to as an offset "lateral" cross junction in that their feed bores 231' and 261', respectively, intersect with primary feed bore 200' at angles 231 and 261, respectively, and not at a normal or 90-degree angle, more or less, as compared to a tee body with a 90-degree intersection angle. Feed bore 200' is the primary conduit through which fluid passes and extends between opposing flat faces of main body 200, with feed bores 231' and 261' being secondary bores extending from the face of each lateral body section, 230 and 260, respectively, extending to the mid-point of main body bore 200', as fluid is conveyed either into or out of main body section 200.

FIG. 2B depicts a plan view of main body assembly 200A according to an embodiment of the present disclosure. This view shows front, back, left, and right-side lateral sections, 230 and 260, of main body section 200 with connection unions attached, 201 and 233, respectively. Left side lateral body section 230 and right-side lateral body section, 260, are connected to main body 200. On the front face and back face of main body 200, connection union 201, with union face 201', is shown attached or welded to main body 200 with welded joint 207 joining connection union 201 to the front and back of main body 200 and joined circumferentially around the perimeter of each face and connection union 201 extending radially out from the center axis feed bore 200' of main body 200 with bolt holes 202, seal groove 206 and seal 206' extending annularly around union face 201'. Bolt hole 202 is sized accordingly to accept bolt 203, together with bolt nuts 204 and 205, and are collectively utilized to join opposite and opposed similar connection unions 201, one to the other joining component bodies together to form a contiguous conduit of components forming a concentric bore used to transport fluid. On the top of main body 200, is top main body radial bore 210' extending through main body 200, between the inner and outer surface of main body 200, being defined as the thickness of the material utilized for construction, and surrounding the perimeter of top main body radial bore 210', is top main body connection union 211, attached or fused together to the surface of main body 200 with welded connection 217 (not shown) and is used for attachment to main body 200, an opposing component body with a similar welded connection union 217 attached, to permit joining two bodies together or to provide access to main body 200 feed bore 200' and/or for installation of other apparatus for measurement of internal bore thermodynamic and kinematic fluid properties, as for example, pressure, temperature, density and fluid velocity, and other similar measurement components utilized for measurement of fluid parameters contained within main body 200. Connected or attached to top main body connection union 211, is top main body blind connection union 218 joined to top main body connection union 211 with bolt 213 and nuts 214 and 215, respectively. The apparatus illustrated and described above in FIG. 2B, with connective unions attached or welded to main body 200 is referred to as main body assembly 200A.

Figure 2C:
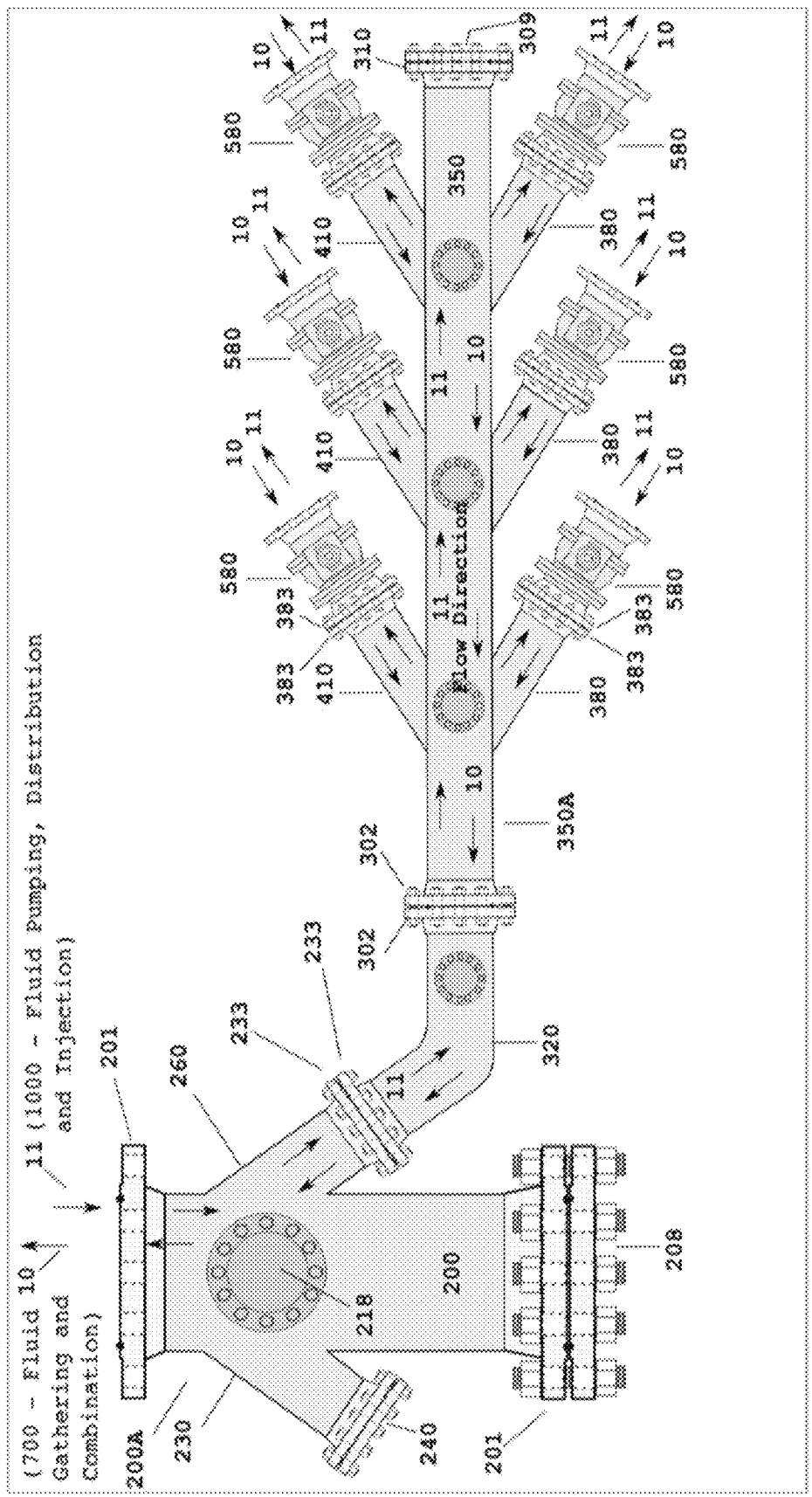
FIG. 2C depicts a side view of the main body assembly according to an embodiment of the present disclosure.

FIG. 2C depicts a side view of main body assembly 200A according to an embodiment of the present disclosure. This view shows front side connection 201, left side lateral body connection 233, top connection union 211 with blind connection union 218 attached and back connection union 201 with back blind connection union 208 attached. FIG. 2C is a left side cross-section view of FIG. 2B and extending laterally and axially along main body 200 is the left side lateral section 230 with feed bore 230' attached to the side center axis of main body 200, with welded joint 232, and in a similar fashion described above in FIG. 2B, connection union 201 with union face 201', is attached to the front and back face of main body 200 and connection union 233, with union face 233', is attached or welded with welded joint 239 to the face of left side lateral section 230, with union connection 233 and union face 233', extending radially out from center axis bore 230', with bolt holes 234 and seal groove 238 extending annularly around union face 233'. Front connection union 201 includes union face 201' and is provided with bolt holes 202 and annular seal groove, 206, extending annularly around union face 201', and is appropriately sized consistently with main body 200, main body feed bore 200' and union connection 201. Main body back connection union 201 includes union face 201' and is provided with bolt holes 202 extending annularly around union face 201', with annular seal 206' inserted in seal groove 206. Seal 206', and in general all seals discussed relevant to the present disclosure, are generally required to avoid leakage of contained pressure and/or pressurized fluid within main body 200 or in general any and all bodies discussed herein, utilized for fluid conduit construction by joining similar bodies at joined union faces, similarly sized and attached, one to the other, and as illustrated by example of main body union connection 201 joined to main body blind union connection 208, seal 206' within seal groove 206 is utilized to contain said pressure and/or pressurized fluid when bolt 203 and combined with nuts 204 and 205, respectively, secure main body blind connection union 208 to main body connection union 201 creating said seal. On the top side of main body 200 is top main body radial bore 210' extending through main body 200, between the inner and outer surface of main body 200, being defined as the thickness of the material utilized for construction, positioned axially opposed 90° to both the left and right-side lateral connections 230 and 260, respectively, and axially centered on the top side of main body section 200. Surrounding the perimeter of top main body radial bore 210', is top main body connection union 211, attached or fused together to the surface of main body 200 with welded connection 217 and is used for attachment to main body 200, an opposing component body with a similar welded connection union 217 attached, to permit joining two bodies together for fluid conduit extension or to provide access to main body 200 feed bore 200' and/or for installation of other apparatus for measurement of internal bore thermodynamic and kinematic fluid properties, as for example, pressure, temperature, density and fluid velocity, and other similar measurement components utilized for measurement of fluid parameters contained within main body 200. Connected or attached to top main body connection union 211 is top main body blind connection union 218, joined to top main body connection union 211 with bolt 213 and nuts 214 and 215, respectively. Blind connection union 208 and blind connection unions described for subsequent discussed embodiments, do not include a bore opening and are utilized to isolate an opposing, similarly sized and constructed connection union bore opening. Main body blind connection union 208 may be connected to the opposing main body connection union 201, as shown, or may be removed if the main body assembly 200A is attached to another main body assembly 200A or other component similarly constructed. Typically, union connections with union faces, seal grooves and seals, as described, will be provided with a metal seal and/or seal of elastomeric composition. The selection of seal type will vary depending upon anticipated fluid, fluid composition and pressure exposure to the embodiment described. For ease of subsequent discussion of relevant embodiments, when describing a union connection joined to another like union connection, it is understood that the union connection is attached or fused, for example, by welded joint to the body discussed, and opposing union connections similarly sized and described, include a seal face, a seal groove and a seal, joined by one or more bolts with opposing fastening bolt nuts, necessary to join the opposing body union connection and opposing body together for the purpose of constructing a fluid conduit designed to contain both pressure and the pressurized fluid within the body and/or conduit. It is further understood that, due to the number of similar components relevant to the embodiments discussed, necessary for construction of a fluid conduit applicable to the present disclosure, reference numbers for said components may or may not be illustrated in the foregoing diagrams and may or may not be specifically referenced in the component discussion that is a primary embodiment applicable to system 700 and system 1000 to be discussed in the subsequent description of illustrative embodiments.

FIG. 2D depicts an elevation view of main body assembly 200A according to an embodiment of the present disclosure. This view provides a perspective from back to front showing main body assembly, left and right-side lateral body section bores 200', 230' and 260', respectively, and connection unions 201 and 233, respectively with top blind connection union 218 attached to top connection union 211, with connection union bolts and nuts removed, wherein back main body connection union 201 with union face 201', bolt holes 202 and seal groove 206 extend annularly around main body feed bore 200'. Extending laterally from each opposing side of main body 200 are left lateral side section 230 and right lateral side section 260, respectively, with union connection 233 shown attached to each lateral side section and shown with bolt hole 234 and seal groove 238 extending annularly around body feed bores 230' and 260', respectively. On the top side and attached to main body 200 is main body connection union 211 with main body blind connection union 218, joined together with bolt 213 and bolt nuts 214 and 215.

Figure 2E:
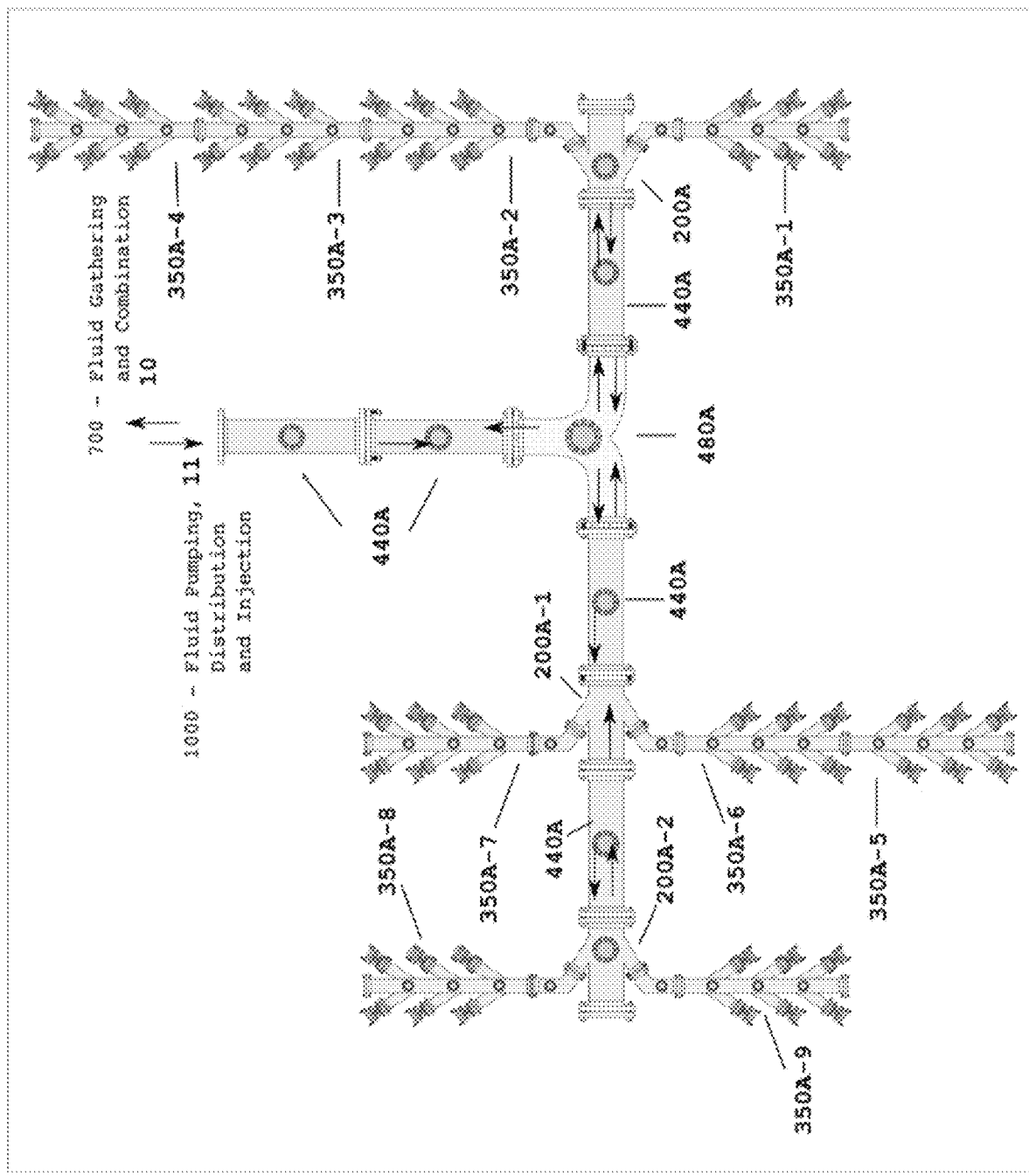
FIG. 2E depicts an elevation view of the main body assembly according to an embodiment of the present disclosure.

FIG. 2E depicts an elevation view of the main body assembly according to an embodiment of the present disclosure. This view shows main body blind connection union 208, left and right side lateral blind connection unions 240, joined to main body connection 201 and left and right-side connection unions 233, respectively, with top side blind connection union 218 joined to top side connection 211.

Figure 2F:
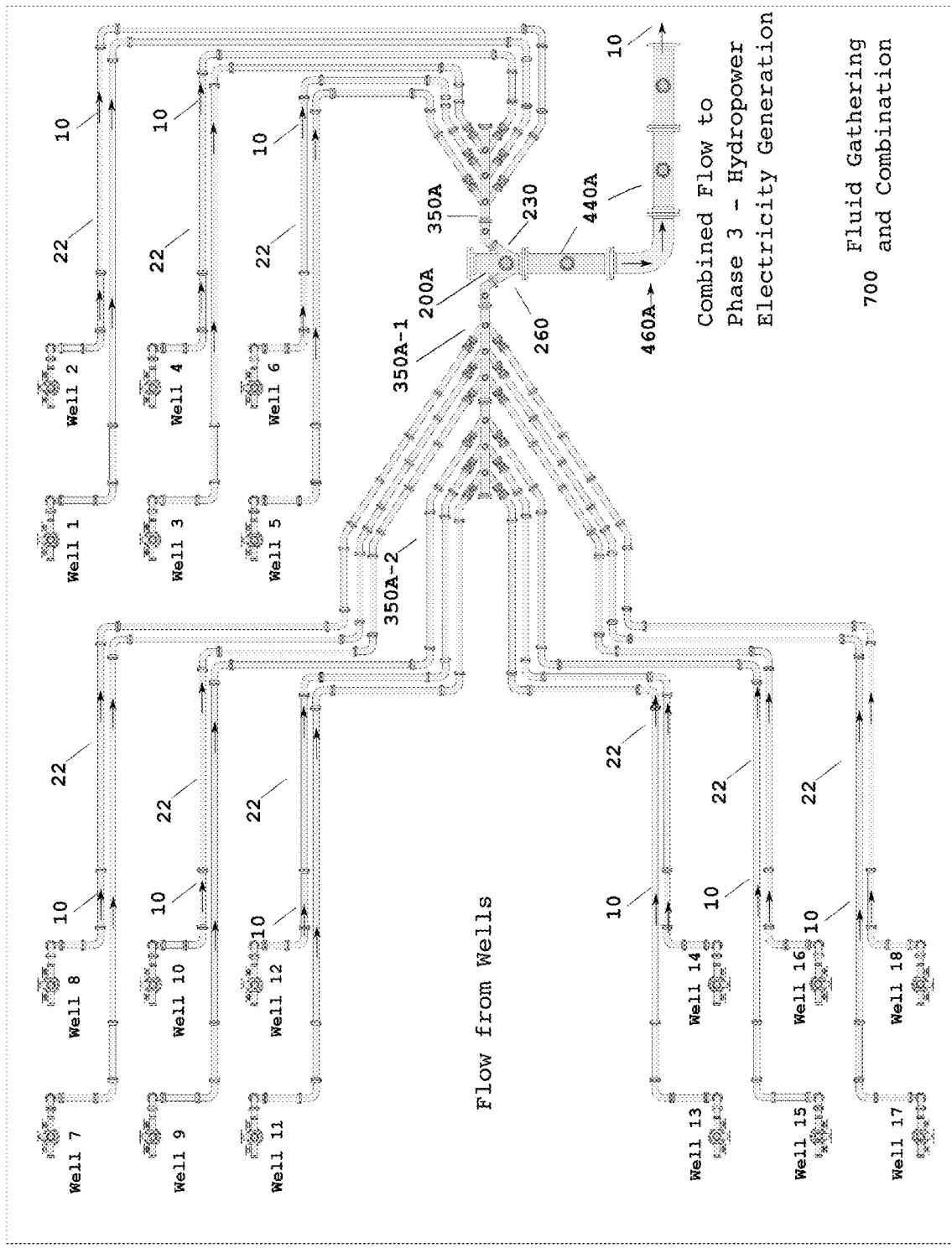
FIG. 2F depicts a plan view of the lateral body section of the fluid gathering and fluid distribution system according to an embodiment of the present disclosure.

FIG. 2F depicts a plan view of lateral body section 350 of the fluid gathering and fluid distribution system according to an embodiment of the present disclosure. This view shows left side 380 and right side 410 well inlets or outlets, depending on the intended direction of flow. Three left side 380 and right side 410 well inlets or outlets are shown for convenience, and it is understood that any number of left side 380 and right side 410 well inlets or outlets may be attached to lateral body section 350 of the fluid gathering and fluid distribution system according to an embodiment of the present disclosure. This view also shows the descriptive flow path when the flow direction is intended for fluid gathering/combination 700 and when used for fluid distribution/injection 1000. This depicts a plan view of a tubular fluid flow conduit apparatus, with generally an elongated cylindrical configuration, wherein direction of fluid flow is shown represented by arrows in alternating direction. Fluid flow or production 10 through secondary body section 350, with a back to front orientation, is considered flow consistent with system 700 and fluid flow or injection 11 through secondary body section 350, with a front to back orientation, is considered flow consistent with system 1000. A plurality of pipe members forming such connection are secured together at an oblique angle with respect to each other, consisting of tubular secondary body section 350, secondary left side cylindrical lateral section 380 and secondary right side cylindrical lateral body section 410, and when connected permit unobstructed fluid flow through the apparatus. Secondary left side cylindrical lateral body section 380, extending axially of and secured to the surface of secondary body section 350 is in substantially a straight-line contact therewith and is fused together with secondary body section 350 by means of heat, pressure or both forming a join as the parts cool, referred to as welded joint or connection 382. Welded joint 382 extends around the circumference of secondary left side lateral body section 380 and is attached to secondary body section 350 at oblique angle 381. Secondary right side lateral body section 410 extending axially of and secured to the surface of secondary body section 350 is in substantially a straight-line contact therewith, in a position parallel to and 180-degrees axially across from secondary left lateral body section 380 on tubular secondary body section 350 and secured by means of welded joint 412. Welded joint or connection 412 extends around the circumference of right-side lateral body section 410 and is attached to secondary body section 350 at oblique angle 411. Oblique angles 381 and 411 are based upon design calculations to determine optimum fluid flow and flow resistance for various pipe diameters and geometries under constraint for anticipated total fluid volumes.

Figures 2G, 2H:
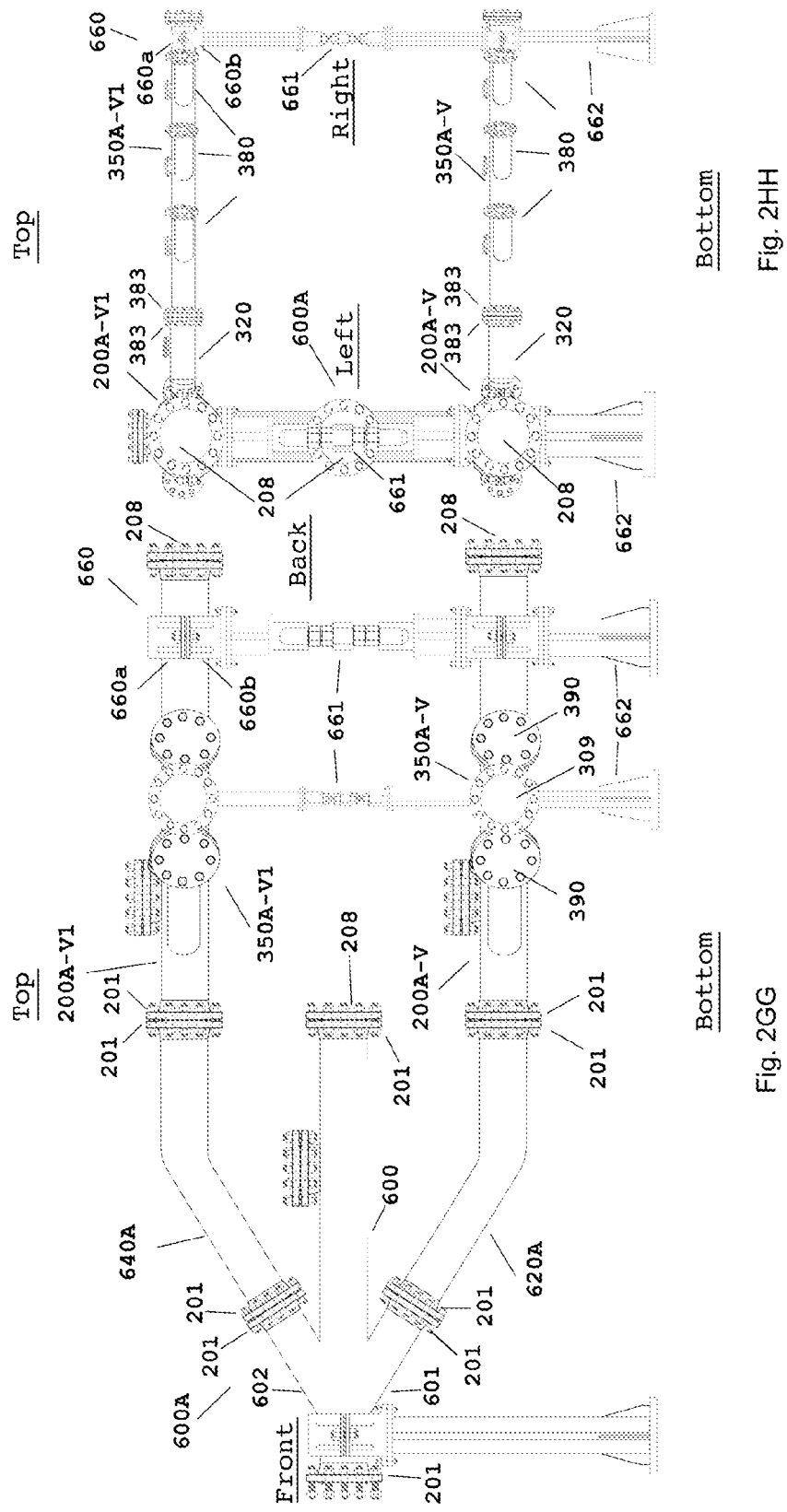
FIG. 2G depicts a cross-sectional view of FIG. 2F according to an embodiment of the present disclosure.
FIG. 2H depicts a plan view of the lateral body section assembly according to an embodiment of the present disclosure.

FIG. 2G depicts a cross-sectional view of FIG. 2F according to an embodiment of the present disclosure. This view shows bores 350', 380' and 410', through lateral body 350, left side well inlet 380 and right side well inlet 410 sections, respectively, of the lateral y body section of the fluid gathering and distribution system. This view shows an elongated cylindrical central body with bores 250', 380' and 410', through secondary body section, 350, joined together with cylindrical secondary left side lateral body 380 and cylindrical secondary right side lateral body 410, respectively, forming a y body configuration. Lateral junctions referred to as secondary left side lateral body section 380 and secondary right side lateral body 410 may be referred to as an offset "lateral" cross junction in that feed bores 380' and 410', respectively, intersect with primary feed bore 350', of secondary y body section 350, at angles 381 and 411, respectively, and not at a normal or 90-degree angle, more or less, as compared to a tee body with a 90-degree intersection angle. Feed bore 350' is the primary conduit through which fluid passes within secondary body section 350 and extends between opposing flat faces of secondary body section 350, with feed bores 380' and 410' being secondary bores extending from the face of each secondary lateral body, 380 and 410, respectively, extending to the mid-point of body bore 350', as fluid is conveyed either into or out of secondary body section 350.

FIG. 2H depicts a plan view of lateral body section assembly 350A according to an embodiment of the present disclosure. This view shows front, back, left, and right side well inlet sections 380 and 410 of lateral body section 350 with connection unions 302 and 383, respectively, attached. Secondary left side lateral body section 380, and secondary right side lateral body section 410, are connected to body section 350 consistent with the description provided by FIGS. 2F and 2G above. On the front face and back face of y body 350, connection union 302, with union face 302', is shown attached or welded to secondary body section 350 with welded joint 308 joining connection union 302 to the front and back of secondary body section 350 and joined circumferentially around the perimeter of each face and connection union 302 extending radially out from the center axis feed bore 350' of secondary body 350 with bolt holes 303, seal groove 307 and seal 307' extending annularly around union face 302'. Bolt hole 303 is sized accordingly to accept bolt 304, together with bolt nuts 305 and 306, and are collectively utilized to join opposite and opposed similar connection unions 302, one to the other joining component bodies together to form a contiguous conduit of components forming a concentric bore used to transport fluid. On the top of secondary body section 350, is secondary top body radial bore 390' extending through body section 350, between the inner and outer surface of body section 350, being defined as the thickness of the material utilized for construction, and surrounding the perimeter of top main body radial bore 390', is top secondary body connection union 420, attached or fused together to the surface of secondary body section 350 with welded connection 426 and is used for attachment to body section 350, an opposing component body with a similar welded connection union 420 attached, to permit joining two bodies together or to provide access to body section 350 feed bore 350' and/or for installation of other apparatus for measurement of internal bore thermodynamic and kinematic fluid properties, as for example, pressure, temperature, density and fluid velocity, and other similar measurement components utilized for measurement of fluid parameters contained within secondary body section 350. Connected or attached to top secondary body connection union 420, is top secondary body blind connection union 427 joined to a top secondary body connection union with bolt 422 and nuts, respectively. The apparatus illustrated and described above in FIG. 2H, with connective unions attached or welded to secondary body section 350 is referred to as lateral body section assembly 350A.

FIG. 2I depicts a left-side view of lateral body section assembly 350A according to an embodiment of the present disclosure. This view shows front side connection 302, left side well inlet connection 383 of left side well inlet 380, top connection union 420 with blind connection union 427 attached, and back connection union 302 with back blind connection union 309 attached. Extending laterally and axially along secondary body 350 is secondary left side lateral section 380 with feed bore 380' attached to the side center axis of secondary body 350, with welded joint 382, and connection union 302 with union face 302', is attached to the front and back face of secondary body section 350 and connection union 383, with union face 383', is attached or welded with a welded joint to the face of left side lateral section 380, with union connection 383 and union face 383', extending radially out from center axis bore 380', with bolt holes 384 and seal groove 388 extending annularly around union face 383'. Front connection union 302 includes a union face and is provided with bolt holes 303 and an annular seal groove, 307, extending annularly around the union face, and is appropriately sized consistently with secondary body section 350, secondary body feed bore 350' and union connection 302. The secondary body section back connection union 302 includes a union face and is provided with bolt holes 303 extending annularly around the union face, with annular seal 307' inserted in seal groove 307. Secondary body union connection 302 is joined to main body blind union connection 309 with seal 307' within seal groove 307 and is utilized to contain said pressure and/or pressurized fluid when bolt 304 combined with nuts 305 and 306, respectively, secure secondary body blind connection union 309 to secondary body connection union 302 creating said seal. On the top side of secondary body 350, is top secondary body radial bore 390' extending through secondary body section 350, between the inner and outer surface of secondary body 350, being defined as the thickness of the material utilized for construction, positioned axially opposed 90° to both the left and right-side lateral connections, 380 and 410, respectively, and axially centered on the top side of secondary body section 350. Surrounding the perimeter of top secondary body radial bore 390' is top secondary body connection union 420, attached or fused together to the surface of secondary body 350 with welded connection 426 and is used for attachment to secondary body 350, an opposing component body with a similar welded connection union 420, and attached to permit joining two bodies together for fluid conduit extension or to provide access to secondary body section feed bore 350' and/or for installation of other apparatus for measurement of internal bore thermodynamic and kinematic fluid properties, as for example, pressure, temperature, density and fluid velocity, and other similar measurement components utilized for measurement of fluid parameters contained within secondary body section 350. Connected or attached to top secondary body section connection union 420, is top secondary body blind connection union 427, joined to top secondary body connection union 420 with bolt 422 and nuts 423 and 424, respectively.

FIG. 2J depicts an elevation view of lateral body section assembly 350A according to an embodiment of the present disclosure. This view also shows left and right side well inlet section feed bores 350', 380' and 410', respectively, and connection unions 302 and 383, respectively with top blind connection union 427 attached to top connection union 420. This view shows secondary body section 350 with primary feed bore 350' and with connection union 302 attached by a welded connection to the face of secondary body section 350, left and right side well inlet sections with secondary feed bores 380' and 410', respectively, with connection union 383 attached by a welded connection with top blind connection union 427 attached to top connection union 420. Lateral body section assembly 350A is a fluid gathering apparatus, generally with an elongated cylindrical shape with protruding lateral side sections 380 and 410, respectively, with elongated cylindrical shape joined together and attached, joined or otherwise welded to secondary body section assembly 350 for the purpose of connecting individual well inlet lines or production flow lines and combining fluid originating from one or more wells together into a single fluid stream within the fluid conduit formed by bore 350' within lateral body section assembly 350A. Lateral body section assembly 350A will be appropriately sized based upon the total anticipated fluid volume estimated to be received by individual wells joined to the body. Combined with main body section assembly 200A which is also a fluid gathering apparatus, generally with an elongated cylindrical shape with protruding lateral side sections 230 and 260, respectively, joined together for the purpose of providing a connection device and inlet conduit for fluid gathered by lateral body section assembly 350A. Main body section assembly 200A with left and right lateral side sections 230 and 260, respectively, each may receive a lateral side section assembly 350A joined together by union connection 233 on each respective lateral side of main body section assembly 200A and main body section assembly 200A serves as a junction body to receive and combine fluid flow received and gathered by lateral body section assembly 350A. Main body section assembly 200A will be appropriately sized based upon the total fluid volume estimated to be received by the total number of lateral body section assemblies 350A attached to main body section assembly 200A via lateral side section inlets 230 and 260, respectively, whereby the cylindrical body size of each respective body section 350A and 200A will be appropriately sized based upon the total fluid estimated to be received by each body and thus, most likely, each respective body will be sized proportionally larger than the preceding body with secondary lateral body section inlets 380 and 410 sized for individual well fluid flow, lateral body section assembly 350A sized for the total fluid volume received by each well, main body lateral side sections 230 and 260, respectively, will be sized for the total fluid volume received by each lateral side section assembly 350A and main body section assembly 200A will be sized based upon the total fluid volume estimated to be received for the cumulative total estimated volume resulting from the lateral body section assemblies connected to the body.

FIG. 2K depicts a cross-sectional view of main body left lateral side junction 290 according to an embodiment of the present disclosure. Junction 290 joins main body left lateral side, 230, of main body assembly 200A to lateral body section assembly 350A when connective unions are attached to the body, showing long sweep feed bore 290', through the junction and flow direction when utilized for fluid gathering and combination system 700, and fluid pumping, distribution, and injection system 1000.

FIG. 2L depicts a side view of main body left lateral side junction 290 according to an embodiment of the present disclosure. This view shows front-right junction connection union 233, with junction feed bore 290', connection union seal groove 238, left side connection union 302, top connection union 420, with blind connection union 427 attached.

FIG. 2M depicts a plan view of FIG. 2L according to an embodiment of the present disclosure. This view shows left side connection union 302, front-right side connection union 233 and top blind connection union 427. Lateral body section assembly 350A is appropriately sized for the total fluid volume received by individual wells and main body section assembly 200A is appropriately sized based upon the total fluid volume estimated to be received by each respective lateral body section assembly 350A connected, thus, the size of each body may not be the same. Main body left lateral side junction adapter 290 is a concentric body with the purpose of joining bodies of varying size together whereby left lateral side junction adapter 290 internal body dimension is sized based upon the total fluid volume estimated by lateral body section assembly 350A with connection union 302 being sized dimensionally based upon the concentric size of lateral body section assembly 350A and opposed connective union 233, will be dimensionally sized based upon the size of left side lateral section 230 being consistent with the internal dimensional size of main body 200A determined by the cumulative fluid volume estimated for that body.

FIG. 2N depicts a cross-sectional view of main body right lateral side junction 320 according to an embodiment of the present disclosure. Junction 320 joins main body right lateral side 260 of main body 200 to lateral body section 350, showing long sweep feed bore 320', through the junction and flow direction when utilized for fluid gathering and combination system 700, and fluid pumping, distribution, and injection system 1000.

FIG. 2O depicts a side view of main body right lateral side junction 320 according to an embodiment of the present disclosure. This view shows front-left junction connection 233, with junction feed bore 320', connection union seal groove 238, right side connection union 302, top connection union 420, with blind connection union 427, attached.

FIG. 2P depicts a plan view of FIG. 2O according to an embodiment of the present disclosure. This view shows front-left side connection union 233, right connection union 302, and top blind connection union 427. Also included is top side bore 390', consistent with the description provided previously for lateral body section assembly 350A and main body right lateral side junction adapter 320, internal body dimension is sized based upon the total fluid volume estimated by right side lateral body section assembly 350A with connection union 302 being sized dimensionally based upon the concentric size of lateral body section assembly 350A and opposed connective union 233 will be dimensionally sized based upon the size of right side lateral section 260 being consistent with the internal dimensional size of main body 200A determined by the cumulative fluid volume estimated for that body.

FIGS. 2Q-2X depict cross-sectional and plan views of apparatus components for fluid gathering and combination system and a pumping, distribution, and injection system according to an embodiment of the present disclosure. The system(s) may be used with main body section 200, or lateral body section 350, for system expansion or fluid flow direction modification. The FIGURES reference union connection 201, sized appropriately for main body section 200; however, union fittings 302 or 383 may be utilized in place of union connection 201 if the component is appropriately sized for lateral body 350. FIG. 2Q is a cross-section view of straight body 440 with feed bore 440'. FIG. 2R is a plan view of straight body 440 with front and back connection union 201 attached. FIG. 2S is a cross-section view of a curved, directional body, permitting fluid flow entering from one side and exiting from the opposed 90° side, referred to as a 90° elbow 460, which provide a 90° turn in a line with feed bore 460'. FIG. 2T is a plan view of 90° elbow fitting 460, with connection union 201 attached to each side. FIG. 2U is a cross-section view of a curved, directional body, permitting fluid flow entering from two opposite directions to be combined into one feed bore at an opposed 90° angle or fluid flow entering from one feed bore and exiting from two opposite directions, referred to as Tee 480 with feed bore 480'. FIG. 2V is a plan view of tee body 480 with connection union 201 shown attached to each side and top blind connection union, 218 attached to top connection union 211 (not shown). FIG. 2W is a cross-section view of a curved, directional body with four sides, each opposed at a 90° angle to the other, permitting flow from three opposite directions to be combined and exit in one direction, referred to as cross body 500 with feed bore 500'. FIG. 2X is a plan view of cross body 500 with connection union 201 attached to each side.

FIGS. 2Y-2AA depict side views of fluid control apparatus components for fluid gathering and combination system and pumping, distribution, and injection system components according to an embodiment of the present disclosure. These systems may be used with main body section 200, or lateral body section 350, for system fluid flow control, restriction and/or isolation. These FIGURES reference connection unions 201 and 383, sized appropriately for main body section 200 and/or lateral body 350; however, connection unions fittings 201, 302 or 383 may be utilized if the component is appropriately sized for the respective body. The fluid flow control component may be a globe or gate-type apparatus that are linear motion components utilizing a closure member referred to as a disc, irrespective of shape, for the globe-type apparatus, or a wedge-shaped plate or gate to obstruct or control fluid flow, for the gate-type apparatus, or a ball-type apparatus that is a rotational motion component utilizing a pivoting ball with a hollow bore to obstruct or control fluid flow, or a butterfly-type apparatus that is a rotational motion component consisting of a disk rotating on an axis across the diameter of the component body with orientation of the disk in relation to body bore for flow control, for example.

The control valve may be manually controlled utilizing a handle connected to a stem connected to the linear or rotational control component, for position modification utilized for flow control, or the component may be self-actuated, or controlled automatically by a positioner device whereby the linear or rotational control component position, is modified by a device, component or instrument, that converts an electronic signal from a controller, or computer, into an air signal sent or transmitted to a receiver utilized to control the flow control component. FIG. 2Y is a side view of primary control valve 520, and generally has three interactive components; valve body subassembly 521, actuating device 522, typically a spring or diaphragm component, and valve positioner 523, that can be manual and/or self-actuating as described above, shown with connection union 201 attached to valve body subassembly 521, and is generally utilized for combined fluid flow within main body assembly 200A components.

FIG. 2Z is a side view of check valve 540, also referred to as a non-return or one-way valve and is utilized to permit fluid flow in only one direction. Check valves are typically two-port valves with two openings in valve body 541, one for fluid entry into the valve body and the other for fluid exit out of the body with fluid flow direction identified by arrow 542, defining the direction of one-way flow through the valve, function automatically and are typically not controlled by any external means. There are various types of check valves utilized for various applications but typically the fluid control apparatus is either a swing-type component or a T-Pattern lift-type component utilized for fluid flow control. Access to the fluid control apparatus 543, is typically provided through a top access connection 544, and valve body 541 is shown with front and back connection union 201 attached.

FIG. 2AA is a side view of tubular piping expansion joint 560 used for axial movement compensation due to forces exerted within bodies containing confined and/or pressurized fluid flow within fluid gathering and distribution system 700 which includes body section joint 561 for connection to a pipe or conduit with connection union 201 attached, and having inner annular recess 562 for receiving seal ring 562', and injectable packing material 563 and the joint further includes inner conduit slip section joint 564 for connection to another pipe with connection union 201 attached, and is received or slides in the body portion 561 to permit axial movement compensation. Packing rings 562' provide the main sealing function between body section joint 561 and inner conduit slip section joint 564, and the injectable packing material 563 exerts force on the receiving seal rings 562' to maintain the sealing function thereof.

FIG. 2BB depicts a side view of secondary control valve 580 according to an embodiment of the present disclosure. Valve 580 may include valve body subassembly 581, actuating device 582, typically a spring or diaphragm component, and valve positioner 583, that can be manual and/or self-actuating as described above, shown with connection union 383 attached to each side of valve body subassembly 581, and is generally utilized for combined fluid flow or fluid distribution at well inlets 380 and 410 of lateral body assembly 350A.

FIG. 2CC depicts a plan view of fluid gathering and combination system 700 and fluid pumping, distribution, and injection system 1000 according to an embodiment of the present disclosure. Main body assembly 200A may be joined with lateral body section assembly 350A utilizing right side main body adapter 320, with connection union 233, attached to main body right lateral section 260 with connection union 233 attached, and connection union 302 attached to the right side of right side main body adapter 320 and connection union 302 attached to the left side of lateral body section 350, with arrows representing the direction of fluid flow and fluid combination if utilized for fluid gathering and combination system 700, or fluid distribution into one or more wells if utilized for pumping, distribution and injection system 1000. Lateral body section assembly 350A is illustrated with secondary fluid control valve 580, connected by union connection 383 to each secondary lateral side section 380 and 410, respectively, of lateral body section assembly 350A to permit fluid flow control from individual well fluid streams received into lateral body section assembly 350A.

FIG. 2DD depicts a plan view of a well system according to an embodiment of the present disclosure. The well system may include well 1 and well 2, each including well tree 20 and inlet line or production flow line 22 originating at each respective well. The illustration describes fluid path of flow or production 10, with direction shown by the included arrows in the illustration, from the well(s), into inlet line or production flow line 22, and further into the lateral body assembly 350A, whereby fluid flow from individual wells are gathered and combined, flowing further into main body assembly 200A, and the combined fluid stream flowing through straight body assembly 440A, making a directional turn in 90° elbow assembly 460A, and continuing further to Phase 3.

FIG. 2EE depicts a plan view of variability provided for a fluid gathering and combination system 700 and pumping, distribution, and injection system 1000 according to an embodiment of the present disclosure. This view depicting well inlet flow or production 10, may be gathered and combined from one or any number of wells and outlet flow or fluid injection 11, may be distributed to and injected into one or any number of wells utilizing lateral assembly 350A, main body assembly 200A, and interconnection components, previously described, whereby some, straight section assembly 440A and tee section assembly 480A, are shown.

FIG. 2FF depicts a plan view of variability provided for fluid gathering and combination system 700 and pumping, distribution, and injection system 1000 according to an embodiment of the present disclosure. This view depicts 18 wells with fluid flow or production 10 originating from each well 1-18 and flowing through inlet line or production flow line 22 to lateral body assembly 350A where flow from each individual well is gathered and combined in main body assembly 200A and combined flow continues for further processing.

FIG. 2GG depicts a side elevation view of fluid gathering and combination system 700 and pumping, distribution, and injection system 1000 according to an embodiment of the present disclosure. This view illustrates the versatility of component application whereby main body assembly 200A and lateral body assembly 350A are configured vertically as opposed to horizontally. When utilized in a vertical configuration, reference made to an assembly component body is specified by "A-V" added after the reference numeral, whereby for example, main body section assembly 200A is referenced as vertical main body section assembly 200A-V when configured vertically as opposed to horizontally. A vertical configuration may be required in locations of limited space, for example, an offshore platform fixed to the subsea surface, a floating offshore platform facility or a land location that is geographically confined. Illustrated in FIG. 2GG is vertical merge assembly 600A, with connection union 201 attached to vertical merge body, 600, bottom merge body section 601 and top merge body section 602 whereby bottom merge body section 601 and top merge body section 602 are joined together axially and 180° opposed to one another on vertical merge body 600. Bottom merge body section 601 with connection union 201 attached is joined to bottom merge adapter assembly 620A, and bottom merge adapter assembly 620A is connected to vertical main body section assembly 200A-V whereby, illustrated with a perspective view of vertical lateral body section assembly 350A-V from back to front, vertical main body section assembly 200A-V is connected to vertical lateral body section assembly 350A-V. Top merge body section 602 with connection union 201 attached is joined to top merge adapter assembly 640A and top merge adapter assembly 640A is connected to vertical main body section assembly 200A-V1 whereby, illustrated with a perspective view of vertical lateral body section assembly 350A-V from back to front, vertical main body section assembly 200A-V1 is connected to vertical lateral body section assembly 350A-V1. Illustrated is vertical adjustable support system 660 with upper support mechanism 660a, lower support mechanism 660b, adjustable body 661, and adjustable support base 662. Vertical adjustable support system 660 may be appropriately sized for both vertical main body section assembly 200A-V and vertical lateral body section assembly 350A-V components.

FIG. 2HH depicts a side elevation view of FIG. 2GG according to an embodiment of the present disclosure. Extending from vertical main body assembly 200A-V and connected to a main body right lateral side section is main body right side adapter 320 attached via connection union 383 to vertical lateral body assembly 350A-V. As illustrated, the modular design of system 700 and system 1000 component configuration, by horizontal or vertical component configuration, permits flow from or injection into one or any number of wells necessary for system utilization.

A hydropower turbine is a hydraulic machine device, well known to those familiar with prior art, used in hydroelectric power plants that transfer the energy of moving water, by impulse or reaction means, to a turbine runner assembly attached to a rotating shaft used to generate electricity. In impulse turbines, the pressure of the fluid does not change in the turbine itself. Pressure changes occur only in the nozzles that direct fluid flow to the turbine while the turbine operates at atmospheric pressure. These turbines are composed of a jet nozzle type device or a series of nozzles that direct fluid to the blades of a turbine. The action of the fluid force on one side of the blade, similar to an airfoil in an airplane, creates the energy resulting in rotation. Multiple nozzles are usually used where a large wheel-type rotating device is not feasible. When fluid strikes the blade, designed specifically to reduce drag, it changes velocity. This leads to a change in momentum, exerting a force on the turbine blades. These turbines rely on the ability to take kinetic energy from the fluid to have high efficiency. Unlike reaction turbines, impulse turbines do not need to be submerged in fluid. Types of impulse turbines include Pelton, Turgo, and Cross-Flow turbines.

In reaction turbines, being a special type of turbine used in hydropower plants, the pressure of the fluid changes as it moves through the blades of the turbine. Unlike an impulse turbine, a reaction turbine generates power from the combined forces of pressure and fluid velocity whereby the reaction turbine requires submersion in fluid for proper function. Reaction turbines account for approximately 60% of turbines used for hydropower electricity generation around the world. A reaction turbine is constructed of rows of fixed blades affixed to a body connected to a rotating shaft, referred to as a turbine runner, and is composed of a runner cone, a runner crown, band and bucket for Francis-type turbines or a runner hub and blade for Kaplan-type turbines. A reaction turbine utilizes Newton's third law of motion; action and reactions are equal and opposite, with the system generating torque in response to fluid pressure and weight. The sum of potential and kinetic energy of fluid due to pressure and velocity, respectively impart a force on the turbine blade resulting in rotation. With the body fully immersed in fluid the change in fluid pressure combined with the kinetic energy of the fluid result in a power exchange. Additionally, components of reaction turbines must be designed to withstand high pressure inside the turbine body. For a reaction turbine, fluid velocity and reduction of fluid pressure result in a reaction on the turbine blades, resulting in a force upon the blade, resulting in blade rotation. Two of the most popular types of reaction turbines include Kaplan and Francis turbines.

FIG. 3F depicts a side elevation view of hydraulic turbine machine 801 according to an embodiment of the present disclosure. Machine 801 may include turbine rotor assembly 804 attached to turbine shaft 808, illustrating an improved seal, seal groove and flange configuration for stay ring assembly 803, head cover 805, main guide bearing assembly 806, an improved turbine shaft seal assembly, pressure-balanced seal assembly 807, and bottom ring assembly 809.

Modifications described herein may control and/or contain pressurized fluid that may exceed the pressure realized in surface-sourced water. For example, the turbine may be modified to include flanged components with ring/seal grooves for component seals that meet API 6A certification for use in the oil and gas industry. Guide vanes may be removed for fluid control. The wicket gate operating ring assembly (shift ring) with the wicket gate servomotors, gate links and gate arm assemblies that controls the guide vanes also may be removed. Guide vanes are different than stay vanes. Stay vanes are fixed and create laminar fluid flow entering the turbine runner assembly. Guide vanes rotate using the wicket gate operating ring assembly. For conventional hydropower technology control of the flow rate entering the turbine runner assembly is performed by the guide vane assembly. If, for example, a river is moving slowly, the guide vanes can be fully open to allow as much fluid flow as possible through to the runner assembly. If a river is moving swiftly, the guide vane can close partially to restrict fluid flow and rate through the runner assembly. If the guide vanes are fully closed, all flow is restricted through the runner assembly. For subsurface-sourced fluid this equipment is not necessary as flow is controlled by other means (i.e., surface chokes, valves, and submersible pumps in wells). The head cover assembly has been redesigned due to the removal of guide vanes and the wicket gate operating ring assembly. The shaft seal assembly also has been improved to provide a pressure-balanced seal assembly. This component can also be utilized in the existing surface water-sourced industry as existing technology does not sufficiently contain pressure and fluid. The pressure-balanced seal assembly may address turbine shaft leakage.

Referring to FIG. 3F, major components of reaction turbines include spiral casing 802, stay ring assembly 803, runner assembly 804 and bottom ring assembly, 809 connected to a turbine exit conduit for further processing. Spiral Casing 802 is of a tubular shaped design with a uniformly decreasing cross-section area along the circumference. The decreasing cross-section area ensures a uniform velocity of fluid striking runner assembly 804. There is a cylindrical or tubular shaped opening that serves as an inlet or entry point for fluid flow into spiral casing 802 and further into the body cavity to runner assembly 804. As fluid enters the inlet of spiral casing 802, fluid pressure decreases as it travels along to runner assembly 804 within the turbine spiral casing inner cavity. The reduction of cross-sectional area along its circumference results in uniform pressure within the body, permitting uniform momentum or velocity striking the runner blade assembly to generate the required energy for runner blade assembly rotation. Stay Vanes 803h are mounted in spiral casing 802 to ensure fluid striking runner assembly 804 have direction along the length of the axis of the turbine, otherwise, the fluid flow would be highly swirling or turbulent as it moves through spiral casing 802, resulting in sufficient loss of efficiency, that could prevent runner assembly, 804, rotation. Stay vanes 803h are required to maintain non-turbulent laminar flow as fluid strikes and passes through runner assembly 804. Runner Assembly 804 is a primary component of reaction turbines and is considered "the heart" of the machine. The shape of runner blade or bucket 804d uses the pressure energy of fluid to "run" the machine. In some reaction-type turbines, the runner blades can pitch about their axis, thus, the pressure force acting on them can be variable according to the load and available pressure. Bottom Ring Assembly 809 connects the runner assembly exit to a fluid outlet conduit to permit continuous fluid flow or fluid movement through runner assembly 804 and typically has an increasing cross-sectional area along its length permitting lower pressured fluid exiting runner assembly 804, as it enters the larger conduit area, to recover pressure lost within runner assembly 804. Due to the variability of fluid flow from open or free flowing sources of fluid motion relying on gravity for motion is the variability of flow and the necessity for fluid flow control within the hydraulic machine. A typical hydraulic machine, such as a hydraulic turbine, utilized to produce energy from conventional open or free flowing water sources, utilize a series of adjustable guides or guide vanes known to those familiar with prior art. Guide vanes like stay vanes 803h are similar in that guide vanes are arranged about the machine in a circular cascade supported by upper and lower structural members however, stay vanes remain in a fixed position but guide vanes are rotatably adjustable to permit control of the fluid flow as it enters from spiral casing 802 into runner assembly 804. Guide vanes have an upper spindle and a lower spindle; rotatably supported on an upper guide vane bushing and an intermediate bearing, which are provided on head cover 805. The lower spindle is rotatably supported on a lower bearing provided on the bottom cover. The angle of the circular cascade of guide vanes surrounding the rotor assembly relative to the direction of fluid flow can be modified accordingly, using a hydraulic control system for rotation, to permit maximum design flow for the machine or completely isolate the flow of fluid through the machine, thus stopping flow completely. This device, common in traditional hydraulic turbines, is referred to as a wicket gate assembly, and is considered the primary fluid flow control device for the machine. With fluid flow applicable to subsurface wells, flow control may be accomplished by other means that may include subsurface and or surface flow control devices to regulate fluid flow, whereby for example, the use of electric submersible pumps (ESP) as a subsurface flow control component, surface manual or pneumatic control valves or surface or subsurface flow restriction devices may be utilized for fluid flow control. Accordingly, fluid flow control within the machine, in the form of an adjustable guide vane, may not be required. Additional improvements directed toward improved seal mounting, seal arrangement and turbine shaft sealing of hydraulic machines, particular to hydraulic turbines, and applicable to the present disclosure will be understood more fully from the detailed description given herein with respect to FIGS. 3-3E.

FIG. 3F is a cross-sectional side elevation view of an improved hydraulic machine device 801, modified for the purpose of containing pressurized hydrocarbon-based fluid that may contain oil, gas, water and/or any combination of these fluids. Improved hydraulic machine device 801 is a hydraulic machine such as a hydraulic turbine comprising spiral casing 802, shown in partial view, connected to a conduit, of typically a cylindrical elongated shape, used as a fluid conduit or passage member, completely surrounding hydraulic machine device 801, providing a uniform distribution of fluid flow to hydraulic machine device 801, which introduces pressurized fluid confined within the conduit, through vaned intake ring or stay ring assembly 803, being a structural member with two annular rings having upper annular section 803a with upper connection union 803b that includes seal groove 803c and seal ring 803c', lower annular section 803g with lower connection union 803b that includes seal groove 803c and seal ring 803c', and streamlined stationary member or stay vane, 803h, which connect to upper and lower annular ring sections, 803a and 803g, respectively, of stay ring 803, and form a circular cascade between and around upper and lower ring sections 803a and 803g, respectively, providing a rigid connection for the top and bottom structures. Collectively, stay ring assembly 803 consisting of upper annular ring section 803a, lower annular ring section 803g and stay vane 803h, with a generally cylindrical shape, are referred to as the turbine distributor with the purpose of guiding a laminar flow of fluid as it enters or leaves spiral case 802 guiding fluid flow, 10, toward runner assembly 804. On stay ring 802, head cover 805 having upper connection union 803b that includes seal groove 803c with seal ring 803c' and secured to stay ring 802 by means of bolt 803e with nut 803f inside bolt hole 803d and head-cover lower connection union 805a, that includes seal groove 805b with seal ring 805b' is connected to main guide bearing assembly 806 by means of bolt 805d with nut 805e inside bolt hole 805c with the purpose, when head cover 805 is connected to stay ring 802 and main guide bearing assembly 806 to provide a sealed cover to contain the pressurized fluid flowing within the body. Main guide bearing assembly 806 with an elongated cylindrical "donut-shaped" body with a central bore is positioned circumferentially about turbine shaft 808, permitting circumferential engagement of turbine shaft 808, includes inner recess, 806a, to permit acceptance of turbine shaft bearing, 806b, consistent with turbine shaft bearing assemblies presently in use with hydraulic turbines to those familiar with the art, and upper and lower connection union 806c that includes seal groove 806d, which is consistent with head cover seal groove 805b and will accept seal ring 805b'. Connected to lower annular ring section 803g of stay ring assembly 803 is bottom ring assembly 809, which is of typically a cylindrical elongated shape having upper and lower connection union 803b that includes seal groove 803c with seal ring 803c' and is connected to lower annular ring section 803g by means of bolt 803e and nut 803f inside bolt hole 803d with the purpose of, when bottom ring assembly 809 is connected to lower annular ring section 803g, providing a sealed cylindrical conduit to contain the pressurized flowing fluid exiting runner assembly 804. Within the elongated cylindrical area contained within spiral case 802, stay ring assembly 803, head cover 805 and bottom ring assembly 809, is runner assembly 804, attached to turbine shaft 808 by means of bolt 804f, nut 804g inside bolt hole 804e. Runner assembly 804 is the rotating element of hydraulic machine device 801 which converts hydraulic energy into mechanical energy and is composed of runner cone 804a, runner crown 804b, runner band 804c and runner bucket 804d. Connected to main guide bearing assembly 806 is pressure-balanced seal assembly 807 with an elongated cylindrical "donut-shaped" body with a central bore is positioned circumferentially about turbine shaft 808 permitting circumferential engagement of turbine shaft 808, including seal assembly body 807a attached by welded connection 807b to body base 807c and connected to main guide bearing assembly 806 with connection union 806c that includes seal groove 806d, which is consistent with head cover seal groove 805b and will accept seal ring 805b'.

Figure 3A:
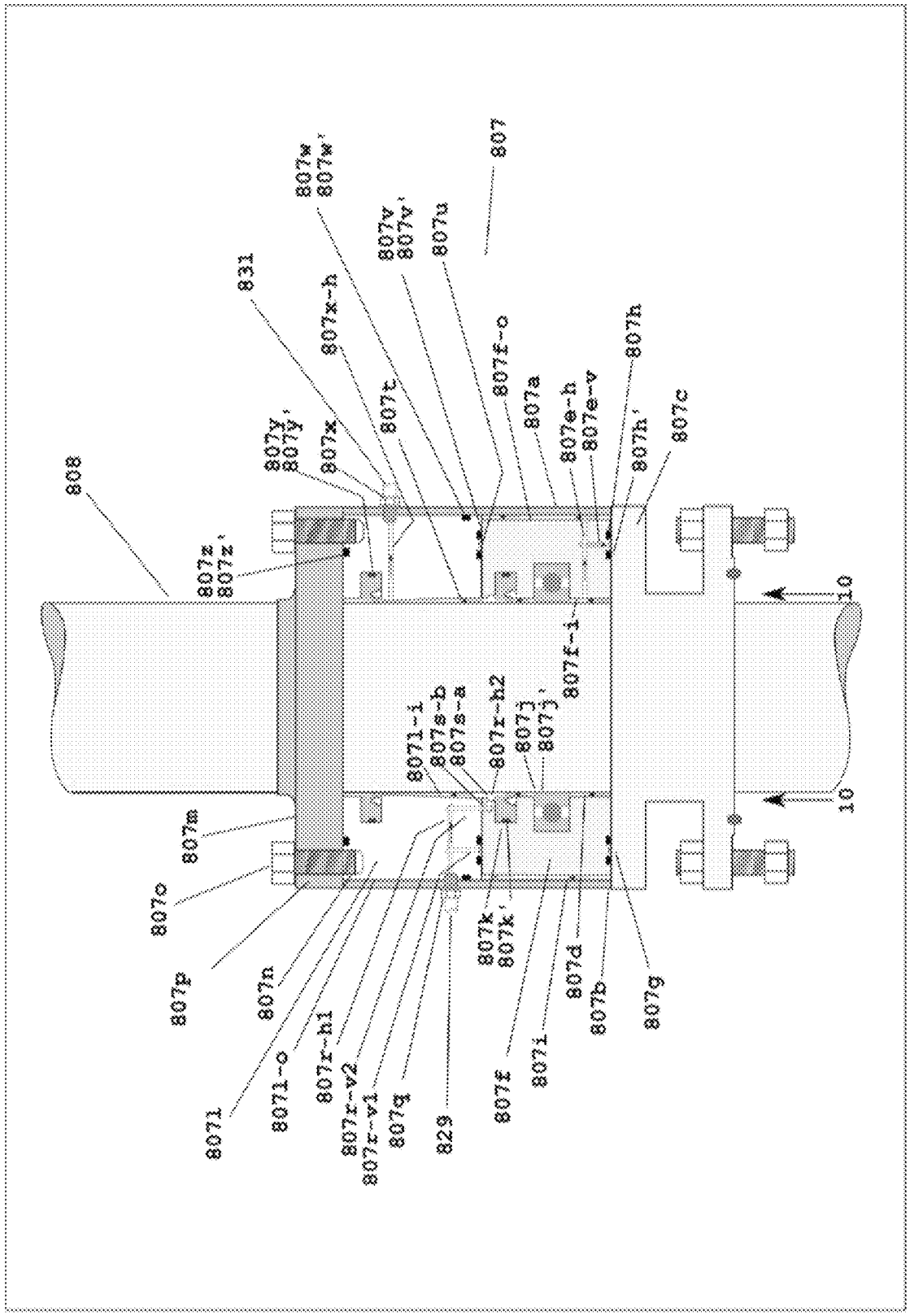
FIG. 3A depicts an expanded side elevation cross-sectional view of a turbine shaft seal assembly and pressure-balanced seal assembly according to an embodiment of the present disclosure.

FIG. 3A depicts an expanded side elevation cross-sectional view of a turbine shaft seal assembly and pressure-balanced seal assembly according to an embodiment of the present disclosure. This view depicts pressure-balanced seal assembly 807, illustrating turbine shaft 808 through the assembly, whereby primary sealing components floating piston assembly secondary bearing seal 807j' and floating piston assembly primary seal 807k', contained within floating piston seal assembly 807f, are axially aligned and in contact with the face of turbine shaft 808. Static sleeve seal assembly 807l is the fluid transmission body for supply of pressure-balancing viscous fluid is pumped into the assembly through inlet line 829 and out of outlet line 831.

Pressure-balanced seal assembly 807 is a circumferential body positioned circumferentially about turbine shaft 808 permitting circumferential engagement and shown in operative relationship with turbine shaft 808 which projects through main shaft bearing assembly 806 and pressure-balance seal assembly 807. Pressurized fluid flow or production 10, entering a spiral casing, traveling through a stay ring assembly and continuing through a runner assembly, being contained within the runner assembly body as previously described, travels up along annular space 807d, around the circumference of turbine shaft 808, created by a main guide bearing bore and pressured-balanced seal assembly bore and the outer surface of turbine shaft 808. Fluid enters horizontal feed bore 807e-h that extends from inner axial face 807f-i to outer axial face 807f-o of floating piston assembly 807f and into vertical feed bore 807e-v, that is perpendicular to horizontal feed bore 807e-h and connects to circular groove 807g at the base of floating piston assembly 807f bound on each side by circular seal groove 807h containing seal 807h'. Pressurized fluid fills circular groove 807g and annular space 807i, and is contained within annular space 807i by seal ring 807h' within seal groove 807h, floating piston assembly secondary bearing seal 807j' contained with seal groove 807j and terminates at floating piston assembly primary seal 807k' contained within seal groove 807k on floating piston assembly 807f and seals 807v' and 807w' contained within seal grooves 807v and 807w on stationary piston block, 807l, respectively and within circular groove 807g by bounding seals 807h' within seal groove 807h. Pressurized fluid from fluid production 10 resides on the bottom face of primary seal 807k', contained by contact of primary seal 807k' with axial face of turbine shaft 808. Floating piston assembly 807f is balanced axially with annular pressure in annular spaces 807d and 807i, respectively, and vertically with pressure contained within circular groove 807g as floating piston assembly 807f slides axially from side-to-side with turbine shaft 808 oscillation. Shaft oscillation could be random axial, lateral and canting movement during normal operation; however, contact of primary seal 807k' to the axial face of turbine shaft 808 is maintained resulting from axially sliding from side-to-side permitted by floating piston seal assembly 807f. The determination of annular space 807d and 807i dimension is calculated based upon average turbine shaft oscillation values consistent with normal turbine shaft operation. Above floating piston assembly 807f is static sleeve seal assembly 807l, which remains fixed within floating piston assembly body 807a, held in place by pressure-balanced seal assembly cover 807m secured with bolts 807o in bolt hole 807n through cover plate hole 80'7p and consists of a circular, cylindrical body, containing inlet threaded port 807q through pressure-balanced seal body 807a, positioned directly above floating piston assembly 807f, inlet threaded port 807q is connected to horizontal feed bore 807r-h1 which extends from the outer axial face 807l-o in a straight line and perpendicular to outer axial face 807l-o to a position inside the body of static sleeve seal assembly 807l to a distance close to, but not penetrating, inner axial face 807l-i, of static sleeve seal assembly 807l. Intersecting horizontal feed bore 807r-h1 are two inlet vertical feed bores 807r-v1 and 807r-v2, respectively, whereby intersection is perpendicular to and in a straight line with respect to horizontal feed bore 807r-h1. Positioned directly below static sleeve seal assembly 807l and contained within the body of floating piston assembly 807f, in a position extending parallel to the upper face of floating piston assembly 807f and directly above seal groove primary seal bore 807k, is horizontal feed bore 807r-h2 extending from the inner face of annular recess 807s-a of floating piston assembly 807f and intersecting inlet vertical feed bore 807r-v2 in a straight line and parallel to horizontal feed bore 807r-h1. Annular recess cavity 807s-a is an annular cavity positioned below the upper face of floating piston assembly 807f extending radially about and circumferentially around the interior face of floating piston assembly 807f and intersecting the top face of primary seal groove 807k serving as a cavity or passageway to supply pressurized viscous fluid to the top face of primary seal 807k'. Inlet vertical feed bore 807r-v1 is positioned in a location directly above and in a perpendicular straight line from circular groove 807u connecting with both horizontal feed bore 807r-h1 and circular groove 807u at the base of static sleeve seal assembly 807l and bound on each side by seal groove 807v containing seal 807v'. Positioned parallel to inlet vertical feed bore 807r-v1 and in a position directly above but not penetrating primary seal bore 807k, inlet vertical feed bore 807r-v2 intersects both horizontal feed bores 807r-h1 and 807r-h2 in a straight line and perpendicular to both 807r-h1 and 807r-h2, respectively. On the top face of floating piston assembly 807f is vertical feed bore fluid transmission cavity 807s-b, positioned from the center point of the diameter defining inlet vertical feed bore 807r-v2 and extending radially out from that center point to a radial distance essentially equal to and slightly larger than the maximum distance of permissible axial side-to-side movement of floating piston assembly 807*f*, whereby the maximum distance is determined by measurement of the distance between the floating piston assembly outer face 807*f-o* and the inner face of pressure balanced seal assembly body 807*a* with the floating piston assembly inner face 807*f-i* being positioned axially against the outer axial surface of turbine shaft 808 and with the purpose of vertical feed bore fluid transmission cavity 807*s-b* providing a continuous flow path between inlet vertical feed bore 807*r-v*2 contained within static seal assembly 807*l* and inlet vertical feed bore 807*r-v*2 contained within floating piston seal assembly 807*f*, whereby floating piston assembly 807*f* moves axially side-to-side with turbine shaft 808 oscillation, having the possibility of random axial, lateral and canting movement, vertical feed bore fluid transmission cavity 807*s-b* permits continuous fluid transmission to vertical feed bore 807*r-v*2, continuing to horizontal feed bore 807*r-h*2 and into annular space 807*t* during normal operation.

Referring to FIG. 3A, pressurized viscous fluid supplied by a pump at a pressure slightly larger than or at least equivalent to the fluid pressure exerted inside the turbine assembly from combined pressurized well fluid production 10 flows through inlet line or pump discharge line 829 into threaded inlet port 807*q*, through horizontal feed bore 807*r-h*1, into intersecting vertical feed bore 807*r-v*1, filling circular groove 807*u*, filling vertical feed bore 807*r-v*2, intersecting and filling horizontal feed bore 807*r-h*2, filling annular recess cavity 807*s-a* and filling annular space 807*t*, formed between the outer circumference of turbine shaft 808 and inner axial surface 807*l-i*, longitudinally through static sleeve assembly 807*l*, and onto the top face of floating piston assembly primary seal 807*k'*, contained within seal groove 807*k*. Pressurized viscous fluid flows from horizontal feed bore 807*r-h*2, into annular recess cavity 807*s-a*, up longitudinally and circumferentially around turbine shaft 808, within annular space 807*t* flowing into horizontal outlet feed bore 807*x-h*, through threaded outlet port 807*x* and into fluid return outlet line 831 returning to a cooler, and further to a supply tank. Pressurized viscous fluid supplied by a pump with a pressure slightly greater than or at least equal to pressurized fluid 10, within spiral casing 802, measured by pressure sensor 810 (not shown), and contained within annular spaces 807*d* and 807*i*, respectively, now fills circular groove 807*u*, contained on the bottom face of static sleeve seal assembly 807*l*, and acting on the top face of floating piston assembly 807*f*, fills the annular space 807*t* and is present on the top face of floating piston assembly primary seal 807*k'*. The downward force acting on the top face of both floating piston assembly primary seal 807*k'* and the top face of floating piston assembly 807*f*, resulting from pump pressure is now equal to and opposite the force acting up on the bottom face of floating piston assembly primary seal 807*k'* and the bottom face of floating piston assembly 807*f*, resulting from an equally applied force originating from flowing fluid 10 filling circular groove 807*g* at the base of floating piston assembly 807*f* and acting up. Effective sealing is maintained by floating piston assembly primary seal 807*k'*, resulting from oscillation compensation effective by continuous contact of the seal surface to the axial face of turbine shaft 808, resulting from an equal and opposite force applied to the inner face 807*f*-I and the outer face 807*f-o* of floating piston assembly 807*f*, balancing the pressure and permitting axial movement, side-to-side consistent with turbine shaft normal oscillation.

Directly below inlet threaded port 807*q* on the outer axial face 807*l-o* of static sleeve seal assembly 807*l* is annular seal groove 807*w* containing seal 807*w'* and on the opposing axial face, 180-degrees opposed to inlet threaded port 807*q*, and below pressure-balanced seal assembly cover 807*m*, is outlet threaded port 807*x*, inserted through pressure-balanced seal body 807*a* and connected to horizontal feed bore 807*x-h* extending from the outer axial face 807*l-o* to the inner axial face 807*l-i* of static sleeve seal assembly 807*l*. Positioned directly above horizontal feed bore 807*x-h* and directly below pressure-balanced seal assembly cover 807*m* on inner axial face 807*l-i* is upper primary seal-groove 807*y* with primary seal 807*y'* and directly below pressure-balanced seal cover 807*m* on the upper face of static seal assembly 807*l* is cover seal groove 807*z* with cover seal 807*z'*.

FIG. 3B depicts a top view of floating piston assembly 807*f* according to an embodiment of the present disclosure. Seal grooves 807*j*, 807*k*, 807*h*, annular recess cavity 807*s-a*, circular groove 807*g* and horizontal feed bore 807*e-h* are displayed as projections with perspective from the top of floating piston assembly 807*f* through the body to the bottom.

FIG. 3C depicts a top view of static sleeve seal assembly 807*l* according to an embodiment of the present disclosure. Seal grooves 807*y*, 807*v*, circular groove 807*u*, horizontal feed bores 807*r*-h1, 807*x-h*, inlet port 807*q* and outlet port 807*x* are displayed as projections with perspective from the top of static sleeve seal assembly 807*l* through the body to the bottom.

Figure 3D:
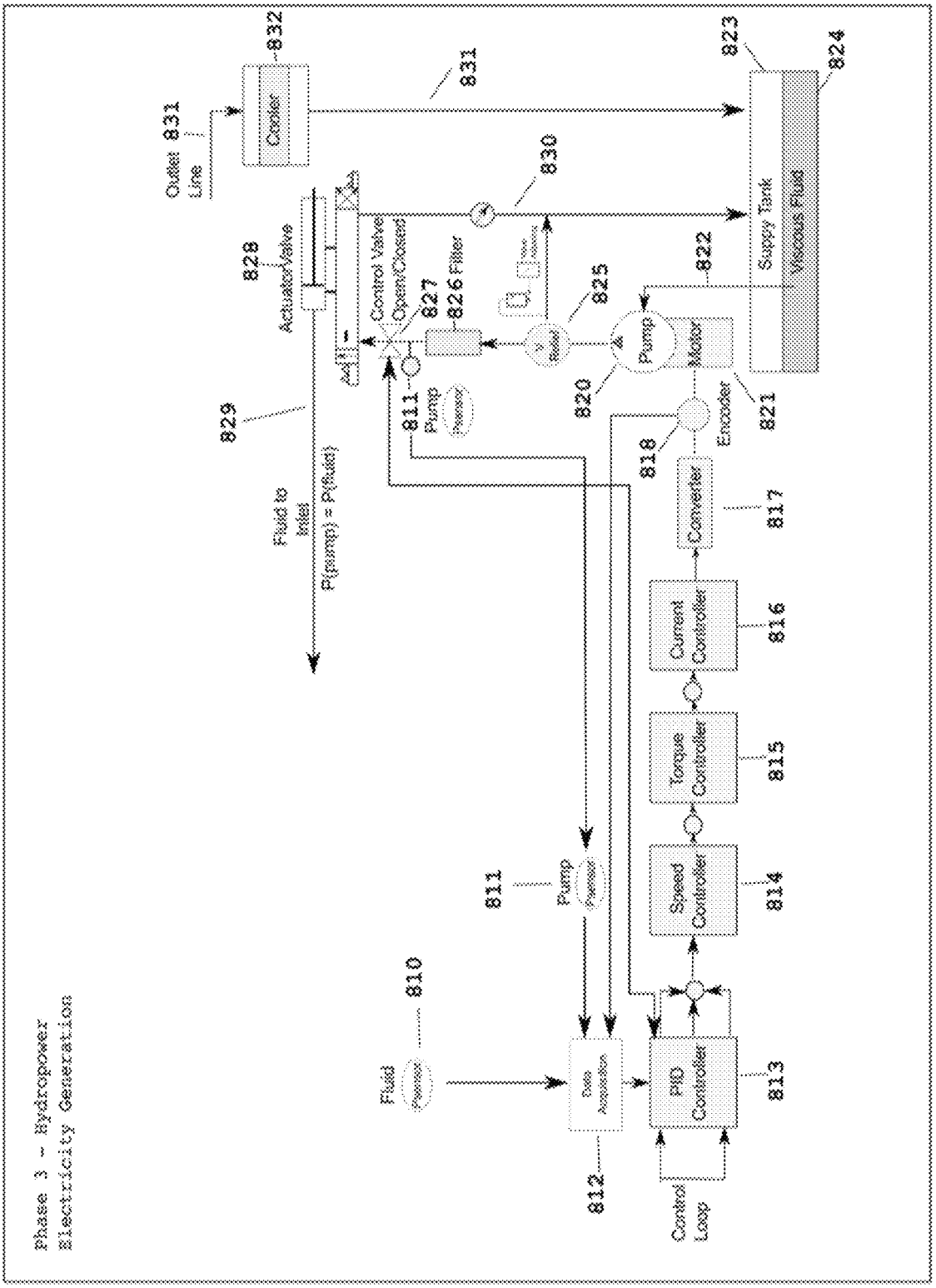
FIG. 3D depicts a schematic view of a hydraulic circuit configuration according to an embodiment of the present disclosure.

FIG. 3D depicts a schematic view of a hydraulic circuit configuration according to an embodiment of the present disclosure. This illustrates the interaction of components required to supply pump pressure 811 slightly larger than or equal to fluid pressure 810 for pressure-balanced seal assembly 807 function. The hydraulic circuit includes constant displacement pump 820, of any suitable type, which delivers viscous fluid 824, from supply tank 823 through suction line 822 to pump discharge line 825 through filter 826 and to automatic control valve 827 at a pressure, at least equivalent to or slightly larger than, a pressure measured by pressure sensor 810 for fluid flow or production. Fluid pressure sensor 810 and pump pressure sensor 811 monitor respective pressures continuously, sending pressure data to data acquisition device 812. Motor encoder 818 monitors data from pump motor 821 continuously and sends motor operation data to data acquisition device 812. Data is evaluated continuously through a control loop by PID controller 813 and based upon the pressure responses and motor control responses, received by fluid pressure sensor 810, pump pressure sensor 811 and motor encoder 818, respectively, PID controller 813 sends signals to speed controller 814, torque controller 815, and current controller 816, which in turn is converted by signal converter 817, to a signal processed by motor encoder 818, which in turn sends a signal to motor 821, with operating parameters necessary for the proper motor function, required for pump 820 to supply pump pressure 811, sufficiently equivalent to or slightly higher than, fluid pressure 810. When pressures are equivalent, a signal is sent from PID controller 813 to automatic control valve 827 to open, permitting supply of viscous fluid 824, at pump pressure 811, slightly larger than or at least equivalent to, fluid pressure 810, to actuator valve 828. Actuator valve 828 receives a signal indicating automatic control valve 827 is open or closed, and if an open signal is received, actuator valve 828 pumps viscous fluid through inlet line 829 connected to an inlet threaded port located on a seal body assembly. If actuator valve 828 receives a signal that automatic control valve 827 is closed, then viscous fluid 824, bleeds into return line 830 and back to supply tank 823.

Relief valve 825 is also provided for emergency release of excessive pressure that, when activated, bleeds into return line 830 and back to supply tank 823. Viscous fluid exiting a seal body assembly from a threaded port connected to outlet line 831 returns to cooler 832, whereby return fluid, that may be heated from the foregoing process, is cooled and then subsequently returned to supply tank 823.

Figure 3E:
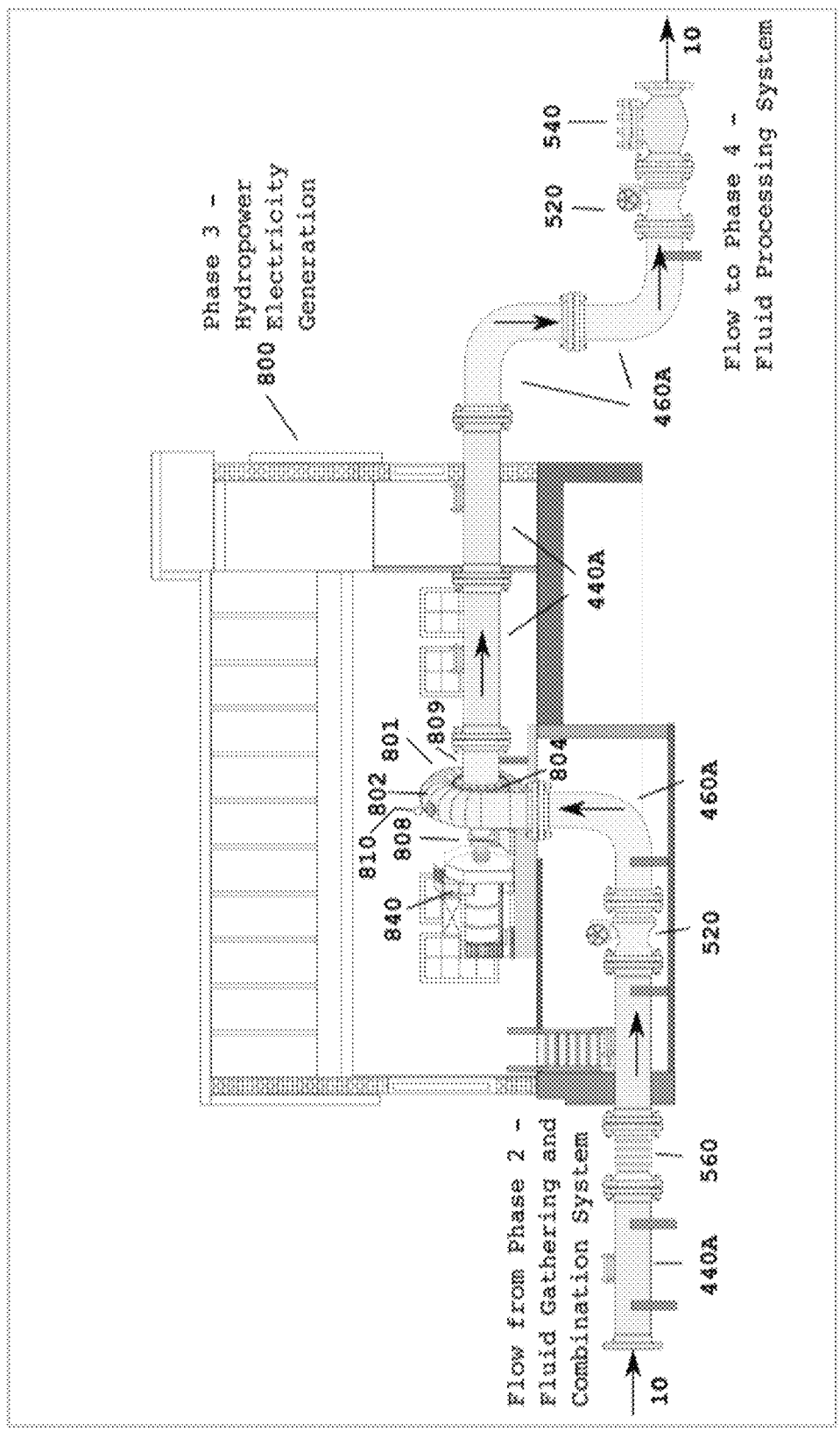
FIG. 3E depicts a side view of hydropower electricity generation according to an embodiment of the present disclosure.
Figure 3:
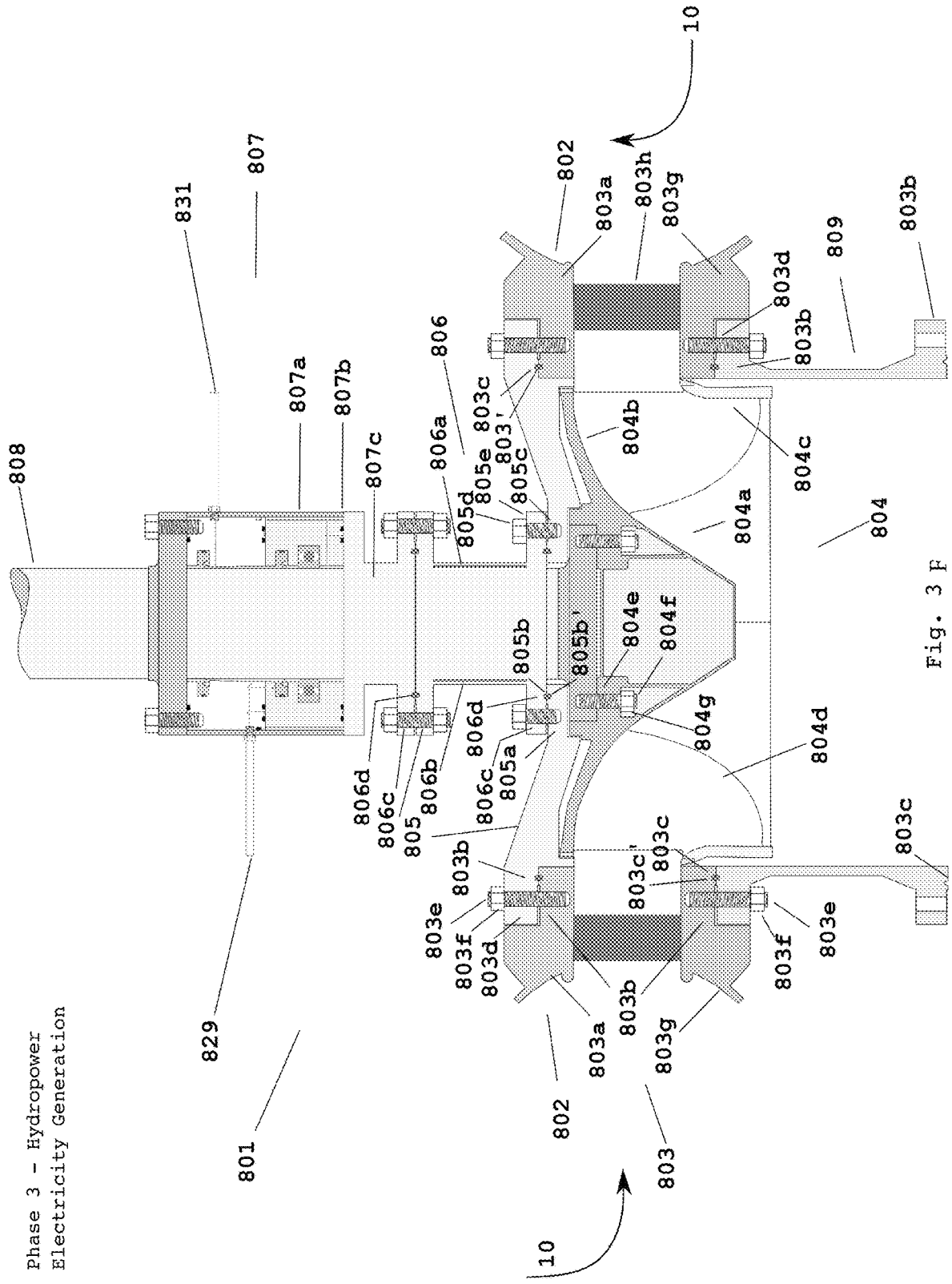
FIG. 3B depicts a top view of a floating piston assembly according to an embodiment of the present disclosure.
FIG. 3C depicts a top view of a static sleeve seal assembly according to an embodiment of the present disclosure.
FIG. 3F depicts a side elevation view of a hydraulic turbine machine according to an embodiment of the present disclosure.

FIG. 3E depicts a side view of hydropower electricity generation (Phase 3) according to an embodiment of the present disclosure. Hydropower electricity generation 800 is facilitated by the combined inlet fluid flow or production 10 flowing through conduit straight section assembly 440A, through expansion joint 560, through primary control valve 520 into hydraulic turbine scroll casing 802 where combined fluid flow or production 10 flows through turbine runner assembly 804 and connected to turbine shaft 808 operates generator 840 to produce electricity. Hydropower electricity generation 800 is facilitated by the combined inlet fluid flow or production 10 gathered into a single body by component lateral body section assembly 350A, whereby flow is gathered together from one or more lateral body section assemblies 350A, and combined into a singular fluid stream by component main body section assembly 200A whereby through the use of interconnection components, fittings and control and check valves that may include straight body section assemblies 440A, expansion joint 560 control valve 520 flowing through conduit straight section assembly 440A, through expansion joint 560, through primary control valve 520, 90-degree elbow assembly 460A, for example, the combined, pressurized fluid stream is guided into hydropower turbine spiral casing 802 whereby combined fluid flow or production 10 flows through turbine runner assembly 804, (inside spiral casing) connected to turbine shaft 808 that turns a armature assembly inside a stator of generator 840 to produce electricity. Combined fluid flow or production 10 exits turbine runner assembly 804 entering bottom ring assembly 809, continuing on to Phase 4—Fluid Processing.

Produced fluid processing from subsurface wells, particularly related to fluid processing of fluids originating from subsurface zones or reservoirs containing a combination of components generally consisting of oil, gas and water and/or oil-water emulsions, requires surface processing of those fluids. Processing equipment is designed for the purpose of handling these fluids and/or fluid emulsions and generally include, for example, separators, heater treaters, free-water knockout and/or other fluid separation vessels designed to separate combined fluids into individual components. Several mechanisms that include heat, gravity segregation, chemical additives and electric current for fluid processing are utilized for this purpose. Equipment may be vertical and/or horizontal, typically, with elongated cylindrical shapes, consisting of internal compartments of varying size, to permit the separation process.

FIG. 4 depicts a side view of a fluid separation processing system, referred to as separator 906, according to an embodiment of the present disclosure. This view illustrates combined fluid flow or production 10, with the fluid including gas 906b, oil 906c and water 906d enters inlet 901 into main compartment 906a, where gas 906b is separated from a fluid emulsion composed of oil 906b and water 906d. Production 10 falls into emulsion compartment 906f, whereby oil and water separate with oil 906c rising to the top and spilling over oil bulkhead 906g into oil compartment 906h, water settling to the bottom and spilling over water bulkhead 906k into the water compartment 906m and each respective separated fluid being discharged from the vessel.

Combined fluid flow or production 10 enters inlet 901 of horizontal longitudinal shell, referred to as a separator 906, entering into main primary separation section 906a whereby gas 906b, being lighter than oil 906c and water 906d, gravitates to the top of main primary separation section 906a discharging at outlet 903. Main primary separation section 906a is divided into compartments consisting of emulsion compartment 906f, oil compartment 906h, free-water compartment 906j and water collection compartment 906m. Emulsion compartment 906f and oil compartment 906h are separated by oil bulkhead 906g that constitutes a fixed weir. The height of the emulsion compartment 906f is equal to the height of oil bulkhead 906g. Free-water 906d, which gravitates within emulsion chamber 906f, passes under the oil compartment 906h and up into the free-water compartment 906j with fluid within the emulsion compartment 906f and free-water compartment 906j functioning as a U-tube. Water bulkhead 906k with adjustable weir 906l separates free-water compartment 906j, and water collection compartment 906m. Utilizing retention time, defined as the amount of time a liquids stays in a vessel to permit equilibrium between the combined fluids, combined with one or more of the mechanisms of heat, gravity segregation, chemical additives and electric current, permit separation due to the fluids physical property differences, with free-water 906d being heavier than oil 906c, free-water 906d settles to the bottom of emulsion compartment 906f and spills over adjustable weir 906l into water collection compartment 906m. Emulsion interface 906e is the separation interface dividing oil 906c from free-water 906d. Oil 906c rises to the top spilling over oil bulkhead 906g into oil compartment 906h within primary separation section 906a. Gas 906b gravitates to the top of main primary separation section 906a discharging through outlet 903 with oil discharging through outlet 904 and water discharging through outlet 905, respectively.

Figure 4A:
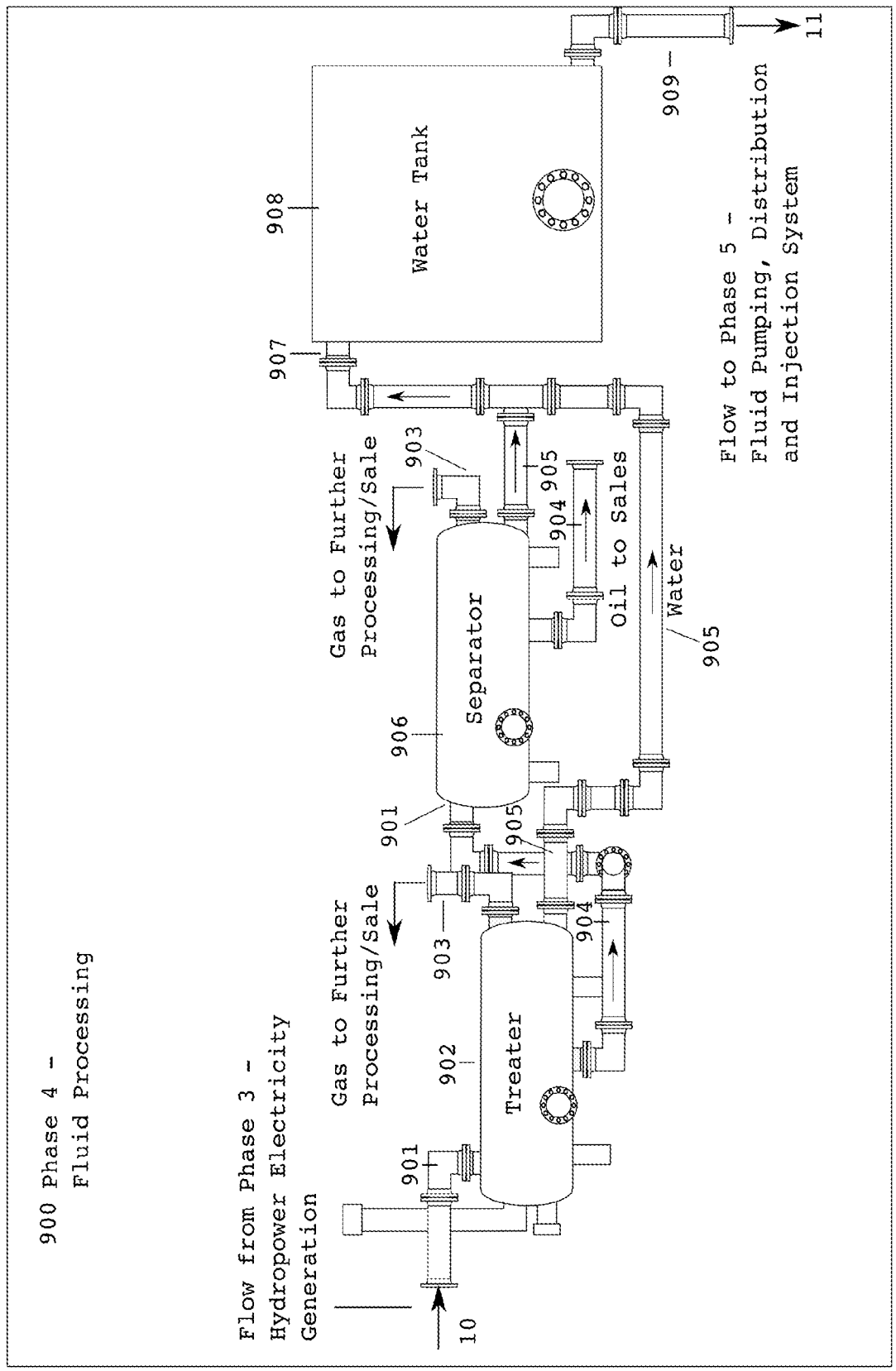
FIG. 4A depicts a side view of a fluid processing system for multi-phase fluid separation according to an embodiment of the present disclosure.

FIG. 4A depicts a side view of a fluid processing system for multi-phase fluid separation according to an embodiment of the present disclosure. This view illustrates fluid flow 10 including a combination of oil, gas, and water flow into inlet 901 of initial or first stage fluid separation processing equipment, referred to as treater 902, whereby heat is utilized to assist with fluid separation. Treated fluid discharged from outlet line 904 of treater 902, flows into inlet line 901 of separator 906, whereby additional fluid processing takes place with free gas rising to the top of the vessel and exiting at outlet line 903, for additional processing or sale. Oil is separated from free water with oil discharging into oil outlet line 904 and flowing further into second stage fluid processing equipment, referred to as separator 906. Free water is discharged through water outlet 905 entering water inlet line 907, and into holding tank 908. Water is then discharged to outlet pump suction line 909, downstream of the processing equipment and further on to Phase 5—Pumping, Distribution and Injection system processing.

FIG. 5B depicts a plan view of well component configuration according to an embodiment of the present disclosure. This is an 18-well example illustrating the flow path of fluid exiting Phase 4—Fluid Processing, being discharged from tank 908 into outlet suction line 909, flowing through pump 1001, being pumped further into main body assembly 200A where it is discharged into lateral body assembly 350A and further on into individual wells. As described in FIG. 2FF, the modular design of system 1000 permits unlimited variability of system configuration to accommodate fluid flow and distribution, either horizontally or vertically, into one or any number of injection wells necessary for system utilization.

Figure 5A:
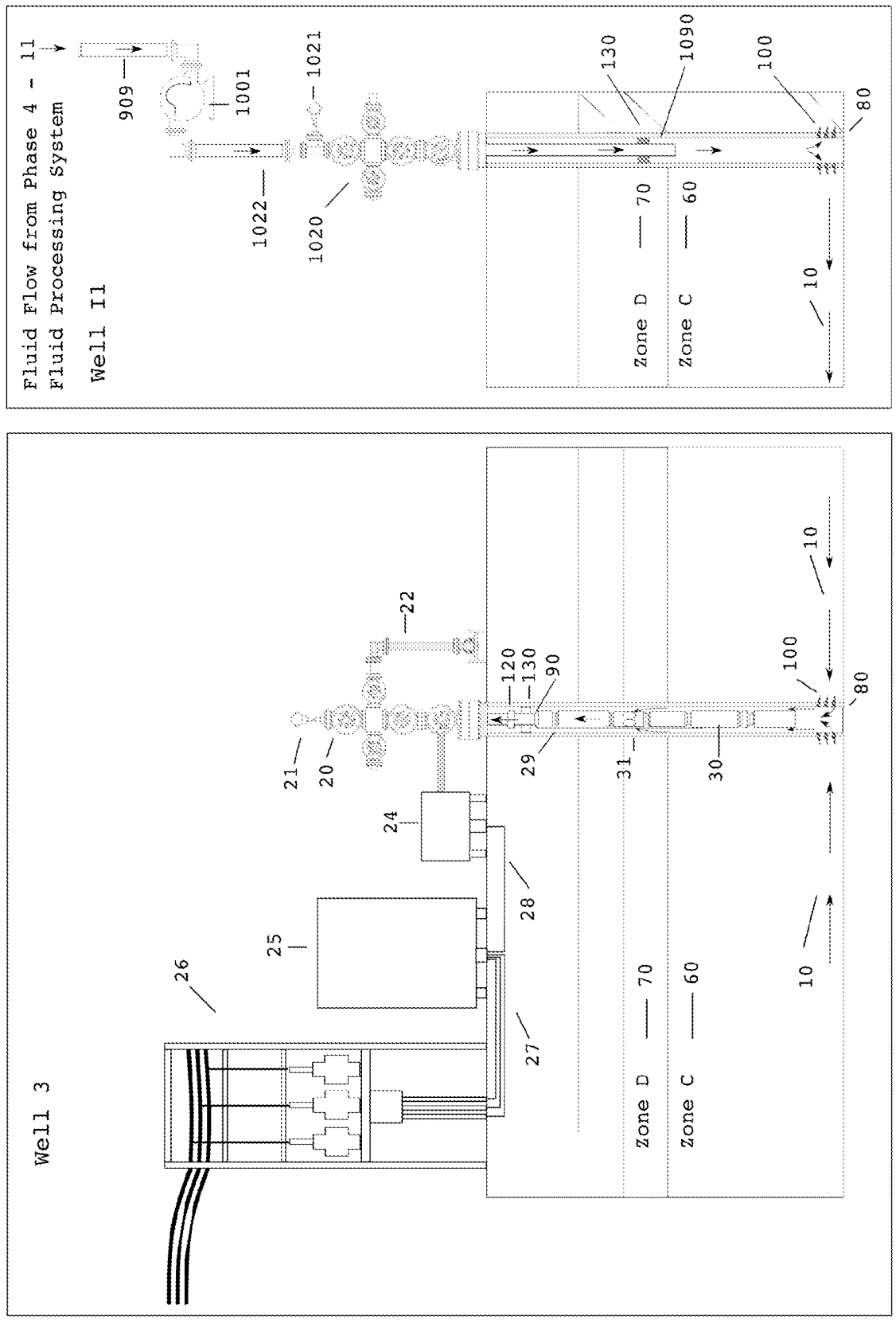
FIG. 5A depicts a side view of an injection well receiving fluid from a fluid pumping, distribution, and injection system according to an embodiment of the present disclosure.
Figure 5:
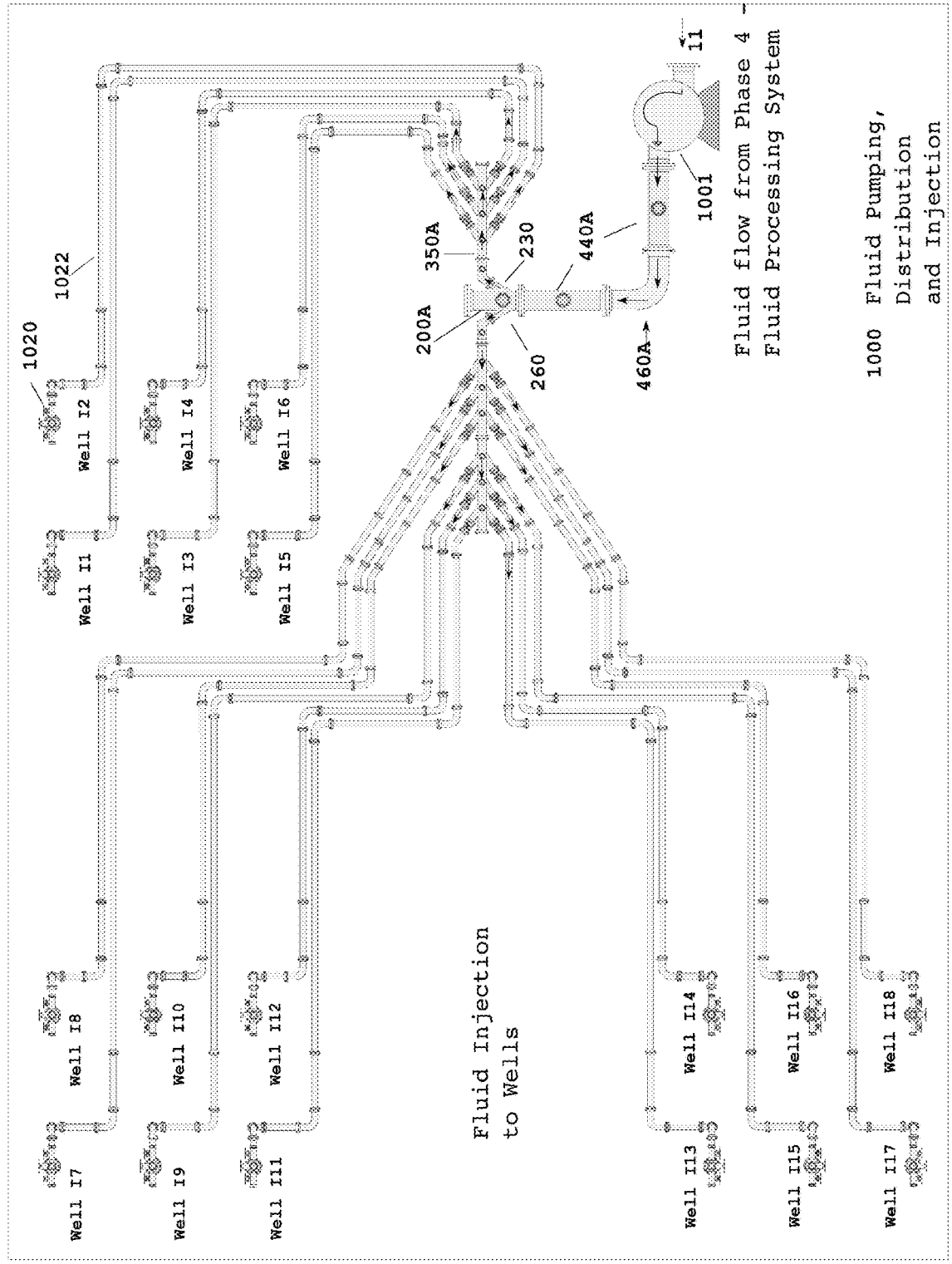
FIG. 5B depicts a plan view of well component configuration according to an embodiment of the present disclosure.

FIG. 5A depicts a side view of injection well I1 receiving fluid from a fluid pumping, distribution, and injection system according to an embodiment of the present disclosure. The illustration describes the fluid path, shown by the included arrows in the illustration, of injection fluid 11 from Phase 4—Fluid Processing outlet suction line 909 through fluid injection pump 1001, through injection flow line 1022, through well tree 1020, into injection tubing 1090, through perforations 100 into one or more subterranean injection zones, strata, or reservoir, Zone C 60, for example, permitting the injected fluid to flow through the zone and be produced again to continue the renewable energy production process.

Embodiments of the present disclosure may provide for the manufacture of components and/or apparatus by utilizing materials that increase corrosion resistance to potentially corrosive aqueous or gaseous components that may originate from subsurface wells. Accordingly, use of corrosion resistant materials for applications whereby fluid exposure from highly corrosive components is anticipated, a preferred material utilized for component manufacture may contain primarily Ni—Fe—Cr—Mo—Cu—W alloy composition or specific combinations of these components, whereby certain combinations provide optimized and/or improved corrosion resistance. Austenitic Ni-base alloys grouped together as Ni—Cr—Mo alloys offer outstanding corrosion-resistance in a range desired for severe corrosive environments. Table 1 below defines alloys within this group.

Furthermore, it is very resistant to sulfide stress cracking and stress corrosion cracking in sour $H_2S$ environments. INCONEL® alloy 686 is a single-phase, austenitic Ni—Cr—Mo—W alloy offering outstanding corrosion-resistance in a range of severe environments. Its high Ni and Mo provide good resistance to reducing conditions, and high Cr resists oxidizing media. Mo and W aid resistance to localized corrosion such as pitting whereby resistance to general pitting and crevice corrosion increases with alloying Cr+Mo+W. Low carbon helps minimize grain boundary precipitation to maintain corrosion-resistance in the heat-affected zones of welded joints. Ni-base alloys, such as HASTELLOY® C-276 and INCONEL® alloy 686, combine high strength and corrosion resistance in highly corrosive environments consistent with some environments whereby fluids originate from subsurface wells and may be comprised primarily of carbon dioxide, hydrogen sulfide, saltwater and/or other salt-based corrosive components or any combination of these components. As subsequently stated, for apparatus and/or component anticipated exposure to fluids containing highly corrosive elements, Ni-base alloys, primarily HASTELLOY® C-276 and/or INCONEL® alloy 686 are preferred materials; however, fluids originating from subterranean zones are diverse, whereby some zones may contain highly corrosive fluids and others may not, whereby each application is unique and will require investigative analysis for determination of the presence of and/or severity of potentially corrosive fluids that may be contained therein.

TABLE 1

| | | Composition wt. % (values denoted with * are maxima, and ** minima) | | | | | | | | | | |
|---|---|---|---|---|---|---|---|---|---|---|---|---|
| Group | Alloy | Ni | Cu | Mo | Cr | Fe | W | Mn | Si | C | Al | Ti | Other |
| Ni—Cr—Mo | C-4 | 65 | 0.5* | 16 | 16 | 3* | — | 1* | 0.08* | 0.01* | — | 0.7* | — |
| | C-22 | 56 | 0.5* | 13 | 22 | 3 | 3 | 0.5* | 0.08* | 0.01* | — | — | V 0.35* |
| | C-22HS | 61 | 0.5* | 17 | 21 | 2* | 1* | 0.8* | 0.08* | 0.01* | 0.5** | — | — |
| | C-276 | 57 | 0.5* | 16 | 16 | 5 | 4 | 1* | 0.08* | 0.01* | — | — | V 0.35* |
| | C-2000 | 59 | 1.6 | 16 | 23 | 3* | — | 0.5* | 0.08* | 0.01* | 0.5* | — | — |
| | 59 | Bal. | — | 16 | 23 | 1.5* | — | 0.5* | 0.01* | 0.01* | 0.25 | — | — |
| | 686 | Bal. | — | 16 | 21 | 5* | 3.7 | 0.75* | 0.08* | 0.01* | — | 0.15 | — |
| | CW-2M | Bal. | — | 16.25 | 16.25 | 2* | 1* | 1* | 0.8* | 0.02* | — | — | — |
| | CW-6M | Bal. | — | 18.5 | 18.5 | 3* | — | 1* | 1* | 0.07* | — | — | — |
| | CW-12MW | Bal. | — | 17 | 16.5 | 6 | 4.5 | 1* | 1* | 0.12* | — | — | V 0.3 |
| | CX-2MW | Bal. | — | 13.5 | 21.5 | 4 | 3 | 1* | 0.8* | 0.02* | — | — | V 0.35* |

To manufacture according to embodiments of the present disclosure including corrosion resistant materials that may contain primarily Ni—Fe—Cr—Mo—Cu—W alloy composition, two such Ni-base alloys are preferred. HASTELLOY® alloy C-276 and INCONEL® alloy 686, respectively, with preferred nickel-base alloy composition containing in percent by weight, 54%-60% nickel, 14.5%-16.5% chromium, 15%-17% molybdenum, 4%-7% iron and a maximum of 0.1% carbon and of 1% silicon for alloy C-276 and at least 19% chromium and at least 14% molybdenum, together with at least 1.5% tungsten with more preferred ranges being about 20%-23% chromium, 14.25%-16% molybdenum and 25%-4% tungsten for alloy 686. HASTELLOY® C-276 was the first wrought, nickel-chromium molybdenum material to alleviate concerns over welding resulting from extremely low carbon and silicon contents. With its high chromium and molybdenum contents, it can withstand both oxidizing and non-oxidizing acids and exhibits outstanding resistance to pitting and crevice attack in the presence of chlorides and other halides.

Embodiments of the present disclosure may include components manufactured with metals comprising carbon steel, corrosive resistant carbon steel, martensitic stainless steel, martensitic ferritic stainless steel, duplex stainless steel, nickel alloys, nickel iron, nickel chrome, nickel copper, nickel molybdenum alloys, titanium and titanium alloys or other metals presently used for components and/or apparatus manufacture and/or to mitigate corrosion, erosion and cavitation component damage specific to the hydropower industry.

Descriptive processes for attachment of secondary components to primary components, attachment of connective unions, and the like, may refer to a singular process, as for example, fusing a body to another by means of heat, pressure or both forming a join as the parts cool, known as a welded joint, does not infer that this is the only means of attachment of one body to another as other connective means are possible, or that assembly requires attachment of one body to another, as manufacturing processes include fabrication means of transforming solid bodies of materials into components with a variety of shapes and sizes, as for example, a solid block fitting with a general polyhedral configuration or elongated, solid rectangular shape, could be transformed into a tubular body with a cylindrical shape, with bores drilled through or into the body for fluid passage, as opposed to component assembly by welded joint attachment.

The embodiment may receive fluid from a plurality of inlets and combine the fluid for further processing of combined fluid flow, as in an example of receiving fluid flow or production from one or more producing wells, if utilized in a Gathering and Combination System, or the embodiment my disburse fluid flow into a plurality of outlets, as in an example of pumped fluid flow into one or more injection wells, if utilized in a Pumping, Distribution and Injection System. The embodiments described are multi-purpose and can be utilized in Phase 2—Fluid Gathering and Combination System and/or Phase 5—Fluid Pumping, Distribution and Injection System.

The fluid conduit system comprises a variety of components that include sections of straight pipe and various fittings such as tees, crosses, laterals and wyes, which provide junctions at which flow is split or combined. In addition to junction fittings, fluid flow components include fittings, which are used to alter the course of fluid flow such as directional fittings that include elbows of various angles, or other such fittings used for flow direction modification.

It should be appreciated that pressured fluid flow requires a continuous conduit to contain the pressure and fluids within the body or conduit, therefore body attachment may be permanent, as in for example, a welded body or connection, or may be by other means, as for example, a connection union with seals to contain the pressure and fluids within the body, and also may include expansion and contraction control components or flexible joints used due to pressurized fluid movement, and gauges and other monitoring equipment, as well as control devices such as shut-off, plug, check, throttle, pressure release, butterfly, ball, and choke valves.

Methods of joining pipe together typically are performed by three main methods which include welding pipe, using screwed connections with a threaded pin connection inserted into a threaded box connection, or through the use of flanged joint connections. One or any combination of these means of attachment may be utilized for the described embodiment. Additionally, means of joining components may refer to welded connections by fusing one body to another and component and apparatus connection may be through attachment or connection by means of a connective union that has been fused or welded to a body to permit the connection union of one body to be attached to or connected to the connection union of another body. Connection unions allow the components to be connected and disconnected relatively quickly whereby that could be viewed as a benefit applicable to assembly time associated with a particular installation and therefore are discussed herein, accordingly, with the understanding that other means of connection by welding, screwing or through the use of flanged-type connections may also be utilized. Though spoken of in terms that may imply unions are discreet components, connection unions are interconnected subassemblies of the components joined by the union. Flange-type unions many be assembled or disassembled with relative ease. The basic design is robust and reliable, and like other fluid flow components, they are manufactured from materials adapted to pressurized fluid flow with pressures ranging from low (1,000 to 2,000 psi), medium pressure (2,000 to 4,000 psi) and high pressure (4,000 to 20,000 psi). Flange-type unions, as implied, typically provide a connection between two flanged components. Annular flanges extend radially outward from each end thus providing the appearance of a spool. The flanges provide flat surfaces or faces which allow two components to mate at their flanges. Though described as "flat" herein, union faces, 201', 211', 302', 383' and 420', as described herein for example, typically will have a very slight annular boss extending upwards around the opening of the bore. The annular boss will help ensure that the abutment between mating union faces is properly loaded when two unions are joined together. The designs and features of union faces, in particular and flange unions in general, are well known, however, the connection unions, as disclosed herein, may be varied in accordance with common practice in the art.

Connection unions are also provided with a number of bolt holes. The holes are arranged angularly around the union face and may be holes that are threaded to accept standing bolts or other threaded connectors or alternately holes may be adapted to receive threaded studs or bolts, depending upon the union component selected for component connection, as shown in the following descriptive embodiments. Each connection union will have an annular groove running concentrically around the pipe opening or union face. An annular metal seal and/or seal of elastomeric composition or any combination thereof, is carried in the groove to provide a seal between joined union faces or connection unions.

Illustrative descriptions herein reference reaction type hydropower turbines within the discussion for ease of discussion. Without limiting the scope of the present disclosure, it is to be understood that the present disclosure is not limited in its application to the details specifically referencing use of reaction type turbines. Use of both impulse and/or reaction type turbines are equally applicable. The foregoing illustrative description is intended for ease of understanding related to a generic fluid processing method and apparatus. Fluid processing is complex and can include multiple stages of separation for liquid fluids separate from multiple stages of processing for gaseous fluids, based upon fluid properties and/or impurities present within the fluid composition.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Also, it is to be understood that phraseology and terminology used herein with reference to the elements (such as, for example, terms like "inlet pipe", could refer to "well casing", "production tubing", "flow line", or "pipeline", "outlet pipe", could refer to "discharge line", "distribution pipe" or "distribution pipeline", "injection flow line", "strata" could refer to "pool", "layer", "zone", "reservoir", and the like), and are only used to simplify description herein, and do not alone indicate or imply that the device or element referred must be limited to those elements. Finally, it is understood the location of each embodiment described in FIGS. 1-1D, 2-2BB and 5-5A, can be located at the surface of earth 5, if on land, or the subsea surface, a fixed structure attached to the subsea surface, or a floating structure, if in or on water and embodiments described in FIGS. 3 and 4 can be located at the surface of earth 5, if on land or a fixed structure attached to the subsea surface or a floating structure, if in or on water. Accordingly, the appended claims are intended to include within their scope such processes, machines, manufacture, compositions of matter, means, methods, or steps.

The invention claimed is:

1. A method for generating hydroelectric power from produced fluids in more than one subterranean zone, strata, or reservoir using subsurface wells that penetrate or terminate in fluid-bearing intervals containing water alone or any combination of gas, oil and/or water, the method comprising:
producing fluids from the more than one subterranean zone, strata, or reservoir to a surface (Phase 1);
gathering the produced fluids from a plurality of wells and combined in a system of interconnected pipes (Phase 2);
generating hydropower electricity (Phase 3);
processing fluid (Phase 4); and
pumping the processed fluids, distributing into a fluid distribution system of one or more lines, and injecting fluid into the more than one subterranean zone, strata, or reservoir (Phase 5).

2. The method of claim 1, the producing step further comprising:
drilling a new well having a main wellbore tubular member that penetrates through or terminates in the more than one subterranean zone, strata, or reservoir;
providing access for fluids contained in the more than one subterranean zone, strata, or reservoir to enter the new well containing one or more inlet pipes; and
producing reservoir fluids to the surface.

3. The method of claim 1, the producing step further comprising:
utilizing an existing well having a main wellbore tubular member that has been drilled, penetrates through, or is terminated in the more than one subterranean zone, strata, or reservoir that contains one or more inlet pipes interconnected to one or more inlet feed lines;
providing access for fluids contained in the more than one subterranean zone, strata, or reservoir to enter the existing well containing the one or more inlet pipes; and
producing reservoir fluids to the surface.

4. The method of claim 3, wherein access is provided from the existing well that is cased, uncased or a combination thereof.

5. The method of claim 3, wherein fluids flow directly from the more than one subterranean zone, strata, or reservoir into the main wellbore tubular member of the well and into the one or more inlet pipes and the one or more inlet feed lines when the well is uncased.

6. The method of claim 3, wherein the one or more inlet pipes include penetrations or perforations through the one or more inlet pipes and through the main wellbore tubular member extending into the more than one subterranean zone, strata, or reservoir to permit fluid entry into the main wellbore tubular member of the well and access to the one or more inlet pipes when the well is cased.

7. The method of claim 3, wherein artificial lifts are used to produce reservoir fluids to the surface in subterranean zones, strata, or reservoirs having subnormal, low, or depleted pressure.

8. The method of claim 2, wherein artificial lifts are used to produce reservoir fluids to the surface in subterranean zones, strata, or reservoirs having subnormal, low, or depleted pressure.

9. The method of claim 1, wherein the gathering step comprises produced fluids entering an interconnected pipe, flow line, or pipeline leading to a gathering system of interconnected pipes connected to a plurality of flowing or producing wells, wherein pressure originating from the more than one subsurface zone, strata or reservoir is sufficient to produce fluids to the surface in the one or more flowing or producing wells to create pressure or head and flow rate required to turn a rotor or impeller for a hydro-turbine.

10. The method of claim 9, the generating hydropower electricity step further comprising:
creating the pressure or head and flow rate resulting from a plurality of wells flowing into the gathering system of interconnected pipes to turn a turbine runner or impeller connected to a shaft connected to an electric generator used to produce electricity.

11. The method of claim 9, the processing fluid step comprising:
discharging the produced fluids from the hydro-turbine into one or more outlet pipes containing apparatus preventing back flow to the hydro-turbine; and
flowing fluids of water, oil, gas, or any combination of same into individual outlet lines for additional processing, storage, and/or sale.

12. The method of claim 1, wherein the gathering step comprises produced fluids entering an interconnected pipe, flow line, or pipeline leading to a gathering system of interconnected pipes connected to a plurality of flowing or producing wells, wherein an induced pressure created from artificial lift equipment inserted in the one or more flowing or producing wells create pressure or head and flow rate required to turn a rotor or impeller for a hydro-turbine.

13. The method of claim 12, the generating hydropower electricity step further comprising:
creating the pressure or head and flow rate resulting from a plurality of wells flowing into the gathering system of interconnected pipes to turn a turbine runner or impeller connected to a shaft connected to an electric generator used to produce electricity.

14. The method of claim 12, the processing fluid step comprising:
discharging the produced fluids from the hydro-turbine into one or more outlet pipes containing apparatus preventing back flow to the hydro-turbine; and
flowing fluids consisting of water alone or oil, water and/or gas, or any combination of these fluids into individual outlet lines for additional processing, storage, and/or sale.

15. The method of claim 1, wherein the fluid distribution system is connected to one or more injection lines leading to one or more wells.

16. The method of claim 1, wherein the injecting step is performed using an injection pump system including one or more pumps connected to a distribution system of one or more interconnected pipes connected to one or more subsurface wells with injection lines or pipes that penetrate or terminate in one or more fluid-bearing zones, strata, or reservoirs.

17. The method of claim 16, wherein fluid injected into one or more zones, strata, or reservoirs is recycled and reproduced to generate hydropower.

18. The method of claim 1, the producing step using a newly drilled well that is cased, uncased, or a combination thereof.

19. A system for generating hydroelectric power from produced fluids in more than one subterranean zone, strata, or reservoir using a plurality of subsurface wells that penetrate or terminate in fluid-bearing intervals containing water alone or oil, water and/or gas, or any combination of same, the system comprising:
- a main body assembly; and
- a lateral body section assembly comprising:
  - a first lateral side section;
  - a second lateral side section; and
  - a secondary fluid control valve is joined with the first lateral side section and the second lateral side section to permit fluid flow control from individual well fluid streams received into the lateral body section assembly,
- wherein the main body assembly is joined with the lateral body section assembly and fluid flows out of the main body assembly when utilized for a fluid gathering and combination system that gathers the produced fluid from a plurality of wells and combined in a system of interconnected pipes and fluid flows into the main body assembly when utilized for fluid distribution into one or more wells for a pumping, distribution and injection system that pumps the processed fluids, distributes into a fluid distribution system of one or more lines, and injects fluid into the more than one subterranean zone, strata, or reservoir.

20. An improved hydraulic turbine that contains hydrocarbon-based fluid including oil, gas, water, and/or any combination of the same, the turbine comprising:
- a casing including a fluid guiding assembly, a runner blade assembly, and a shaft, wherein the casing and fluid guiding assembly provides a conduit for fluid flow directed to the tubine, wherein fluid contact imparted to the runner blade assembly connected to the shaft connected to a generator;
- converts hydraulic energy in a fluid flow into rotational mechanical energy to operate an electric generator;
- wherein the fluid guiding assembly guides a flow of fluid combined from the plurality of wells toward the runner blade assembly as it enters or leaves the casing, the runner blade assembly having blades that interact with the flow of fluid from the plurality of wells and cause the runner blade assembly to rotate and the fluid guiding assembly having two annular rings, each of the two annular rings comprising:
  - an upper annular section with an upper connection union that includes a first seal groove and a first seal ring;
  - a lower annular section with a lower connection union that includes a second seal and a second seal ring; and
  - a fluid guiding assembly that connects to the upper annular section and the lower annular section to form a circular cascade between and around the upper annular section and the lower annular section;
- a turbine shaft having an inner recess to permit acceptance of a turbine shaft bearing;
- a main guide bearing assembly positioned circumferentially about the turbine shaft;
- a head cover assembly connected to the main guide bearing assembly to provide a sealed cover to contain pressurized fluid, the head cover assembly comprising:
- an upper connection union including a third seal groove and a third seal ring; and
- a lower connection union including a fourth seal groove and a fourth seal ring; and
- a pressure-balanced seal assembly connected to the main guide bearing assembly, the pressure-balanced seal assembly positioned circumferentially about the turbine shaft,
- wherein the improved hydraulic turbine receives and contains pressurized produced fluids from more than one subterranean zone, strata, or reservoir that are gathered from a plurality of wells and combined in a system of interconnected pipes to generate hydropower electricity.

* * * * *